United States Patent
Dick et al.

(10) Patent No.: US 9,996,072 B2
(45) Date of Patent: Jun. 12, 2018

(54) GAUGE SYSTEM FOR WORKPIECE PROCESSING

(71) Applicant: Lean Tool Systems, LLC, Vancouver, WA (US)

(72) Inventors: Spencer B. Dick, Portland, OR (US); Stuart R. Aldrich, Portland, OR (US); Brennan J. McClure, Vancouver, WA (US); David L. Lee, Vancouver, WA (US); Brandon J. Vaughn, Gresham, OR (US); Simon A. Soot, Washougal, WA (US); Norman F. Gorny, Portland, OR (US); Matthew T. Harris, Portland, OR (US); Richard R. Gilmore, Portland, OR (US)

(73) Assignee: Lean Tool Systems, LLC, Vancouver, WA (US)

( * ) Notice: Subject to any disclaimer, the term of this patent is extended or adjusted under 35 U.S.C. 154(b) by 483 days.

(21) Appl. No.: 14/337,096

(22) Filed: Jul. 21, 2014

(65) Prior Publication Data
US 2015/0073579 A1 Mar. 12, 2015

Related U.S. Application Data

(63) Continuation of application No. 12/797,581, filed on Jun. 9, 2010, now Pat. No. 8,783,140.
(Continued)

(51) Int. Cl.
*G05B 19/402* (2006.01)
*B23D 45/14* (2006.01)
(Continued)

(52) U.S. Cl.
CPC ........... *G05B 19/402* (2013.01); *B23D 45/14* (2013.01); *B23D 47/025* (2013.01);
(Continued)

(58) Field of Classification Search
CPC .................. G05B 19/402; G05B 19/18; G05B 2219/34286; B23D 45/14; B23D 47/025;
(Continued)

(56) References Cited

U.S. PATENT DOCUMENTS

| 491,307 A | 2/1893 | Gaylord |
| 1,271,473 A | 7/1918 | Johnson |

(Continued)

FOREIGN PATENT DOCUMENTS

| CA | 2793433 A1 | 12/2010 |
| DE | 3941019 C2 | 5/1995 |

(Continued)

OTHER PUBLICATIONS

Canadian Intellectual Property Office, Office Action regarding Canadian Patent Application No. 2,793,433, Aug. 15, 2014, 2 pages.
(Continued)

*Primary Examiner* — Phong Nguyen
(74) *Attorney, Agent, or Firm* — Kolisch Hartwell, P.C.

(57) ABSTRACT

Gauge system, including methods and apparatus, for positioning workpieces according to entered and/or calculated target dimensions and processing the workpieces with a tool to generate products having the target dimensions.

19 Claims, 28 Drawing Sheets

Related U.S. Application Data

(60) Provisional application No. 61/185,553, filed on Jun. 9, 2009, provisional application No. 61/352,259, filed on Jun. 7, 2010.

(51) Int. Cl.
  *B23D 47/02* (2006.01)
  *B23D 59/00* (2006.01)
  *B27B 31/06* (2006.01)
  *G05B 19/18* (2006.01)

(52) U.S. Cl.
  CPC ............ *B23D 59/001* (2013.01); *B27B 31/06* (2013.01); *G05B 19/18* (2013.01); *G05B 2219/34286* (2013.01); *Y10T 83/04* (2015.04); *Y10T 83/148* (2015.04); *Y10T 83/162* (2015.04); *Y10T 83/18* (2015.04); *Y10T 83/5815* (2015.04); *Y10T 83/7593* (2015.04)

(58) Field of Classification Search
  CPC ...... B23D 47/02; B23D 47/04; B23D 59/001; B27B 31/06; B27B 27/00; B27B 27/02; B27B 27/10
  See application file for complete search history.

(56) References Cited

U.S. PATENT DOCUMENTS

| | | |
|---|---|---|
| 2,315,458 A | 3/1943 | Sellmeyer |
| 2,577,766 A | 12/1951 | Johnson et al. |
| 2,602,477 A | 7/1952 | Kniff |
| 2,731,989 A | 1/1956 | Valcourt et al. |
| 2,740,437 A | 4/1956 | Odium et al. |
| 2,852,049 A | 9/1958 | Peterson |
| 3,170,736 A | 2/1965 | Wright |
| 3,186,453 A | 6/1965 | Green |
| 3,329,181 A | 7/1967 | Buss et al. |
| 3,459,246 A | 8/1969 | Ottosson |
| 3,524,708 A | 8/1970 | Rabian et al. |
| 3,552,254 A | 1/1971 | Marczy |
| 3,566,239 A | 2/1971 | Taniguchi |
| 3,584,284 A | 6/1971 | Beach et al. |
| 3,626,792 A | 12/1971 | Eichenhofer |
| 3,736,968 A | 6/1973 | Mason |
| 3,738,403 A | 6/1973 | Schwoch et al. |
| 3,780,777 A | 12/1973 | Davies |
| 3,811,353 A | 5/1974 | Miles |
| 3,814,153 A | 6/1974 | Schmidt |
| 3,841,462 A | 10/1974 | Schmidt |
| 3,854,889 A | 12/1974 | Lemelson |
| 3,886,372 A | 5/1975 | Sanglert |
| 3,910,142 A | 10/1975 | Jureit et al. |
| 3,917,078 A | 11/1975 | Schmidt |
| 3,941,019 A | 3/1976 | Baldwin et al. |
| 3,994,484 A | 11/1976 | Schorr |
| 4,055,097 A | 10/1977 | Ducret |
| 4,111,088 A | 9/1978 | Ziegelmeyer |
| 4,144,449 A | 3/1979 | Funk et al. |
| 4,221,974 A | 9/1980 | Mueller et al. |
| 4,260,001 A | 4/1981 | De Muynck |
| 4,286,880 A | 9/1981 | Young |
| 4,358,166 A | 11/1982 | Antoine |
| 4,410,025 A | 10/1983 | Sicotte |
| 4,434,693 A | 3/1984 | Hosoi et al. |
| 4,445,877 A | 5/1984 | Love et al. |
| 4,453,838 A | 6/1984 | Loizeau |
| 4,454,794 A | 6/1984 | Thornton |
| 4,469,318 A | 9/1984 | Slavic |
| 4,472,783 A | 9/1984 | Johnstone et al. |
| 4,499,933 A | 2/1985 | Thompson |
| 4,541,722 A | 9/1985 | Jenks |
| 4,596,172 A | 6/1986 | Visser |
| 4,628,459 A | 12/1986 | Shinohara et al. |
| 4,658,687 A | 4/1987 | Haas et al. |
| 4,694,871 A | 9/1987 | Jenkner |
| 4,725,961 A | 2/1988 | Pearl |
| 4,736,511 A | 4/1988 | Jenkner |
| 4,791,757 A | 12/1988 | Orlando |
| 4,805,505 A | 2/1989 | Cantlin |
| 4,830,075 A | 5/1989 | Jenkner |
| 4,874,996 A | 10/1989 | Rosenthal |
| 4,878,524 A | 11/1989 | Rosenthal et al. |
| 4,879,752 A | 11/1989 | Aune et al. |
| 4,901,992 A | 2/1990 | Dobeck |
| 4,939,738 A | 7/1990 | Opower |
| 4,939,739 A | 7/1990 | Hobart et al. |
| 5,001,955 A | 3/1991 | Fujiwara |
| 5,014,583 A * | 5/1991 | Webb ................... B23D 47/042 83/276 |
| 5,042,341 A | 8/1991 | Greten et al. |
| 5,048,816 A | 9/1991 | Chun et al. |
| 5,054,938 A | 10/1991 | Ide |
| 5,058,474 A | 10/1991 | Herrera |
| 5,094,282 A | 3/1992 | Suzuki et al. |
| 5,142,158 A | 8/1992 | Craig, Jr. |
| 5,176,060 A | 1/1993 | Thornton |
| 5,196,101 A | 3/1993 | Thakoor |
| 5,197,172 A | 3/1993 | Takagi et al. |
| 5,201,258 A | 4/1993 | Cremona |
| 5,201,351 A | 4/1993 | Hurdle, Jr. |
| 5,251,142 A | 10/1993 | Cramer |
| 5,254,859 A | 10/1993 | Carman et al. |
| 5,266,878 A | 11/1993 | Makino et al. |
| 5,365,812 A | 11/1994 | Harnden |
| 5,418,729 A | 5/1995 | Holmes et al. |
| 5,443,554 A | 8/1995 | Robert |
| 5,444,635 A | 8/1995 | Blaine et al. |
| 5,460,070 A | 10/1995 | Buskness |
| 5,472,028 A | 12/1995 | Faulhaber |
| 5,489,155 A | 2/1996 | Ide |
| 5,524,514 A | 6/1996 | Hadaway et al. |
| 5,663,882 A | 9/1997 | Douglas |
| 5,664,888 A | 9/1997 | Sabin |
| RE35,663 E | 11/1997 | Mori et al. |
| 5,772,192 A | 6/1998 | Hoffmann |
| 5,797,685 A | 8/1998 | Jurik et al. |
| 5,798,929 A | 8/1998 | Stenzel et al. |
| 5,829,892 A | 11/1998 | Groves |
| 5,845,555 A | 12/1998 | Dawley |
| 5,865,080 A | 2/1999 | Jackson |
| 5,933,353 A | 8/1999 | Abriam et al. |
| 5,938,344 A | 8/1999 | Sabin |
| 5,953,232 A | 9/1999 | Blaimschein |
| 5,960,104 A | 9/1999 | Conners et al. |
| 5,964,536 A | 10/1999 | Kinoshita |
| 5,970,830 A | 10/1999 | von Niederhausern |
| 6,058,589 A | 5/2000 | Hakansson |
| 6,062,280 A | 5/2000 | Newnes et al. |
| 6,120,628 A | 9/2000 | Pritelli |
| 6,144,895 A | 11/2000 | Govindaraj et al. |
| 6,196,101 B1 | 3/2001 | Van Den Bulcke |
| 6,216,574 B1 | 4/2001 | Hain |
| 6,240,822 B1 | 6/2001 | Musser |
| 6,263,773 B1 | 7/2001 | McAdoo et al. |
| 6,272,437 B1 | 8/2001 | Woods et al. |
| 6,314,379 B1 | 11/2001 | Hu et al. |
| 6,379,048 B1 | 4/2002 | Brissette |
| 6,390,159 B1 | 5/2002 | Pinske |
| 6,422,111 B1 | 7/2002 | Rousseau |
| 6,463,352 B1 | 10/2002 | Tadokoro et al. |
| 6,470,377 B1 | 10/2002 | Sevcik et al. |
| 6,474,378 B1 | 11/2002 | Ryan et al. |
| 6,480,757 B1 | 11/2002 | Susnjara |
| 6,510,361 B1 | 1/2003 | Govindaraj et al. |
| 6,520,228 B1 | 2/2003 | Kennedy et al. |
| 6,549,438 B2 | 4/2003 | Malone |
| 6,594,590 B2 | 7/2003 | Woods et al. |
| 6,618,692 B2 | 9/2003 | Takahashi et al. |
| 6,631,006 B2 | 10/2003 | Dick et al. |
| 6,662,074 B2 | 12/2003 | Pugh et al. |
| 6,675,685 B2 | 1/2004 | Ceroll et al. |
| 6,690,990 B1 | 2/2004 | Caron et al. |
| 6,698,159 B2 | 3/2004 | Harris et al. |

(56) References Cited

U.S. PATENT DOCUMENTS

| | | |
|---|---|---|
| 6,701,259 B2 | 3/2004 | Dor et al. |
| 6,735,493 B1 | 5/2004 | Chou et al. |
| 6,764,434 B1 | 7/2004 | Volk |
| 6,827,476 B2 | 12/2004 | Lowry et al. |
| 6,880,695 B2 | 4/2005 | Suzuki et al. |
| 6,886,462 B2 | 5/2005 | Dick et al. |
| 6,898,478 B2 | 5/2005 | Dick et al. |
| 6,941,864 B2 | 9/2005 | Dick et al. |
| 7,021,096 B2 | 4/2006 | Barnett |
| 7,036,411 B1 | 5/2006 | Harris et al. |
| 7,073,422 B2 | 7/2006 | Dick |
| 7,080,431 B2 | 7/2006 | Sawyer et al. |
| 7,168,353 B2 | 1/2007 | Dick et al. |
| 7,171,738 B2 | 2/2007 | Dick et al. |
| 7,245,981 B2 | 7/2007 | Dick et al. |
| 7,419,047 B2 | 9/2008 | Cesselli et al. |
| 7,428,443 B2 | 9/2008 | Dick |
| 7,483,765 B2 | 1/2009 | Dick et al. |
| 8,093,842 B2 | 1/2012 | Bergeron et al. |
| 8,783,140 B2 | 7/2014 | Dick et al. |
| 2003/0033920 A1 | 2/2003 | Parks et al. |
| 2004/0027038 A1 | 2/2004 | Gaesser et al. |
| 2004/0154449 A1 | 8/2004 | Parks et al. |
| 2005/0054502 A1 | 3/2005 | Benyovits |
| 2005/0098004 A1 | 5/2005 | Dick et al. |
| 2005/0167000 A1 | 8/2005 | Dick |
| 2005/0268764 A1 | 12/2005 | Hadaway et al. |
| 2006/0006701 A1 | 1/2006 | Wells |
| 2006/0065086 A1 | 3/2006 | Swopes et al. |
| 2006/0104551 A1 | 5/2006 | Schneeberger et al. |
| 2006/0206233 A1 | 9/2006 | Carpenter et al. |
| 2007/0028730 A1 | 2/2007 | Sawyer et al. |
| 2007/0084075 A1 | 4/2007 | Kawano et al. |
| 2007/0084323 A1 | 4/2007 | Parks et al. |
| 2007/0240547 A1* | 10/2007 | Dick ............... B27M 1/08 83/76.1 |
| 2007/0245872 A1 | 10/2007 | Kelly |
| 2008/0009961 A1 | 1/2008 | Dick et al. |
| 2008/0034934 A1 | 2/2008 | Mekkelsen et al. |
| 2009/0299519 A1 | 12/2009 | Dick et al. |
| 2011/0056344 A1 | 3/2011 | Dick et al. |
| 2011/0175273 A1 | 7/2011 | Dick et al. |
| 2013/0036890 A1 | 2/2013 | Dick et al. |
| 2013/0205564 A1 | 8/2013 | Dick et al. |
| 2013/0211576 A1 | 8/2013 | Dick et al. |

FOREIGN PATENT DOCUMENTS

| | | |
|---|---|---|
| EP | 2440356 | 4/2012 |
| JP | 3941019 B2 | 7/2007 |
| WO | 20100144630 A1 | 12/2010 |

OTHER PUBLICATIONS

Precision Automation Inc., "TigerStop Application Guide", Application Guide for PF90 Computer Controlled Saw, 2000, 12 pages.

Tigerstop LLC, TigerStop Catalog, 2008, 32 pages.

Tigerstop LLC, "Motor Replacement / Belt Replacement", TigerStop Instruction Guide, Apr. 2008, 16 pages.

U.S. Patent and Trademark Office, Office Action regarding U.S. Appl. No. 11/711,497, dated Apr. 8, 2008, 24 pages.

Tigerstop LLC., "Sustainable Solutions for Lean Manufacturing", TigerStop Catalog, 2009, 62 pages.

Tigerstop LLC., "The Basic TigerStop", TigerStop Manual 4.72, 2009, 1 page. www.tigerstop.com/tigerstop/The_Basic_TigerStop.htm.

U.S. Patent and Trademark Office, Office Action regarding U.S. Appl. No. 12/360,091, dated Mar. 24, 2010, 23 pages.

The International Bureau of WIPO, "International Search Report and Written Opinion of the International Searching Authority" regarding PCT Application No. PCT/US2010/038047, dated Sep. 10, 2010, 16 pages.

U.S. Patent and Trademark Office, Office Action regarding U.S. Appl. No. 12/889,827, dated Sep. 28, 2011, 8 pages.

The International Bureau of WIPO, "International Preliminary Report on Patentability" regarding PCT Patent Application No. PCT/US2010/038047, dated Dec. 12, 2011, 12 pages.

U.S. Patent and Trademark Office, Office Action regarding U.S. Appl. No. 12/797,581, dated Jan. 18, 2013. 23 pages.

U.S. Patent and Trademark Office, Office Action regarding U.S. Appl. No. 13/544,795, dated Jul. 18, 2013, 31 pages.

U.S. Patent and Trademark Office, Office Action regarding U.S. Appl. No. 13/659,818, dated Oct. 7, 2013, 26 pages.

U.S. Patent and Trademark Office, Office Action regarding U.S. Appl. No. 12/797,581, dated Nov. 8, 2013, 11 pages.

U.S. Patent and Trademark Office, Office Action regarding U.S. Appl. No. 13/755,970, dated Dec. 17, 2015, 31 pages.

U.S. Patent and Trademark Office, Office Action regarding U.S. Appl. No. 13/755,970, dated Aug. 5, 2016, 7 pages.

U.S. Patent and Trademark Office, Office Action regarding U.S. Appl. No. 13/755,970, dated Dec. 27, 2016, 12 pages.

U.S. Patent and Trademark Office, Office Action regarding U.S. Appl. No. 13/755,970, dated Jul. 12, 2017, 9 pages.

* cited by examiner

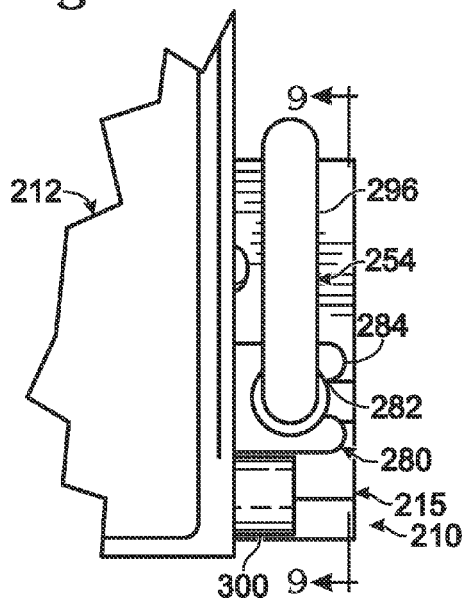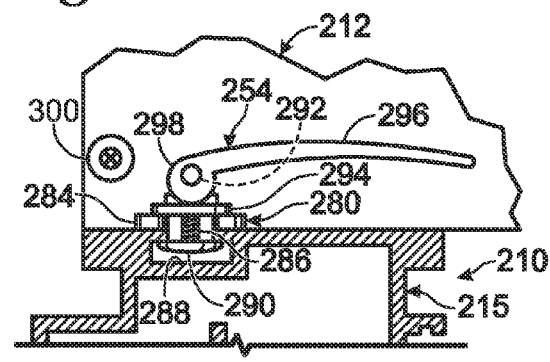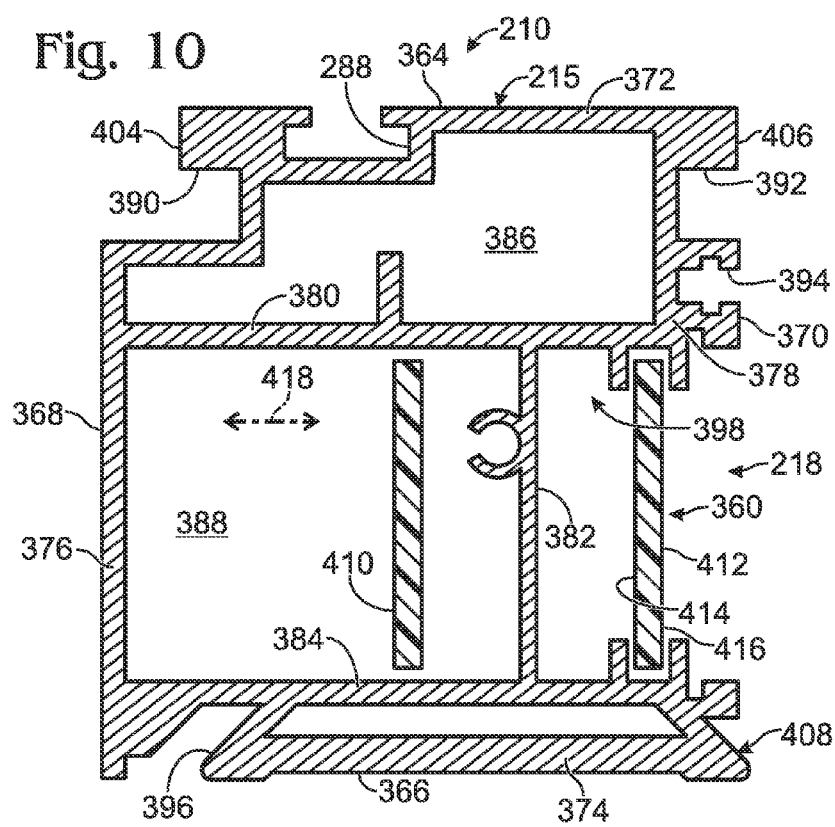

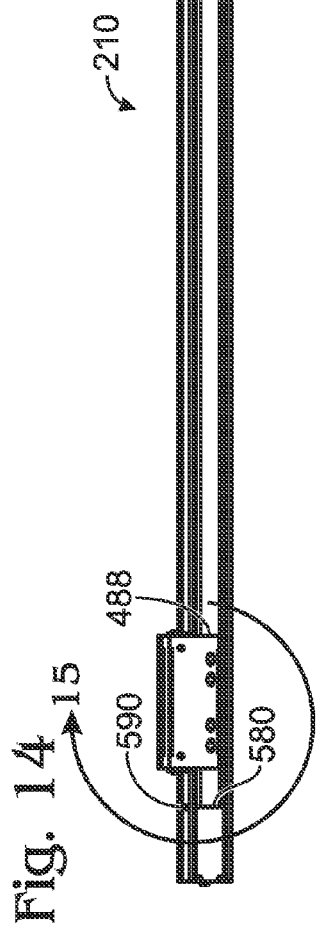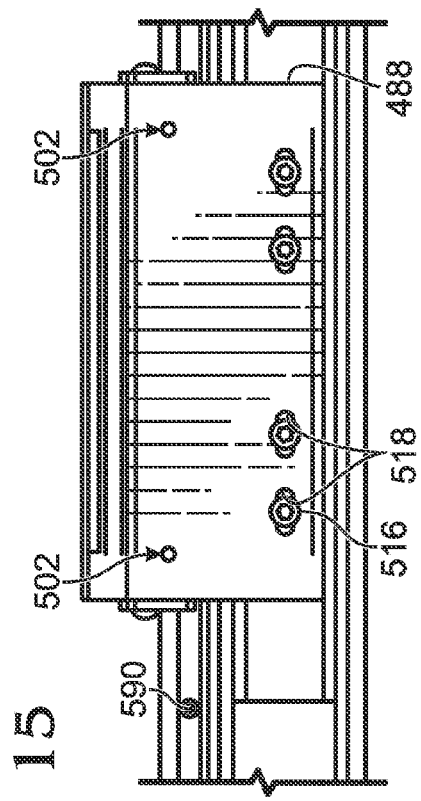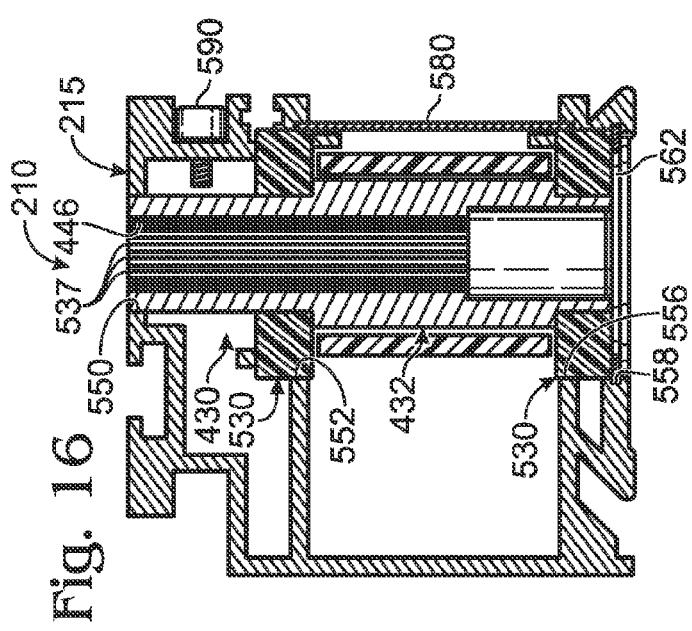

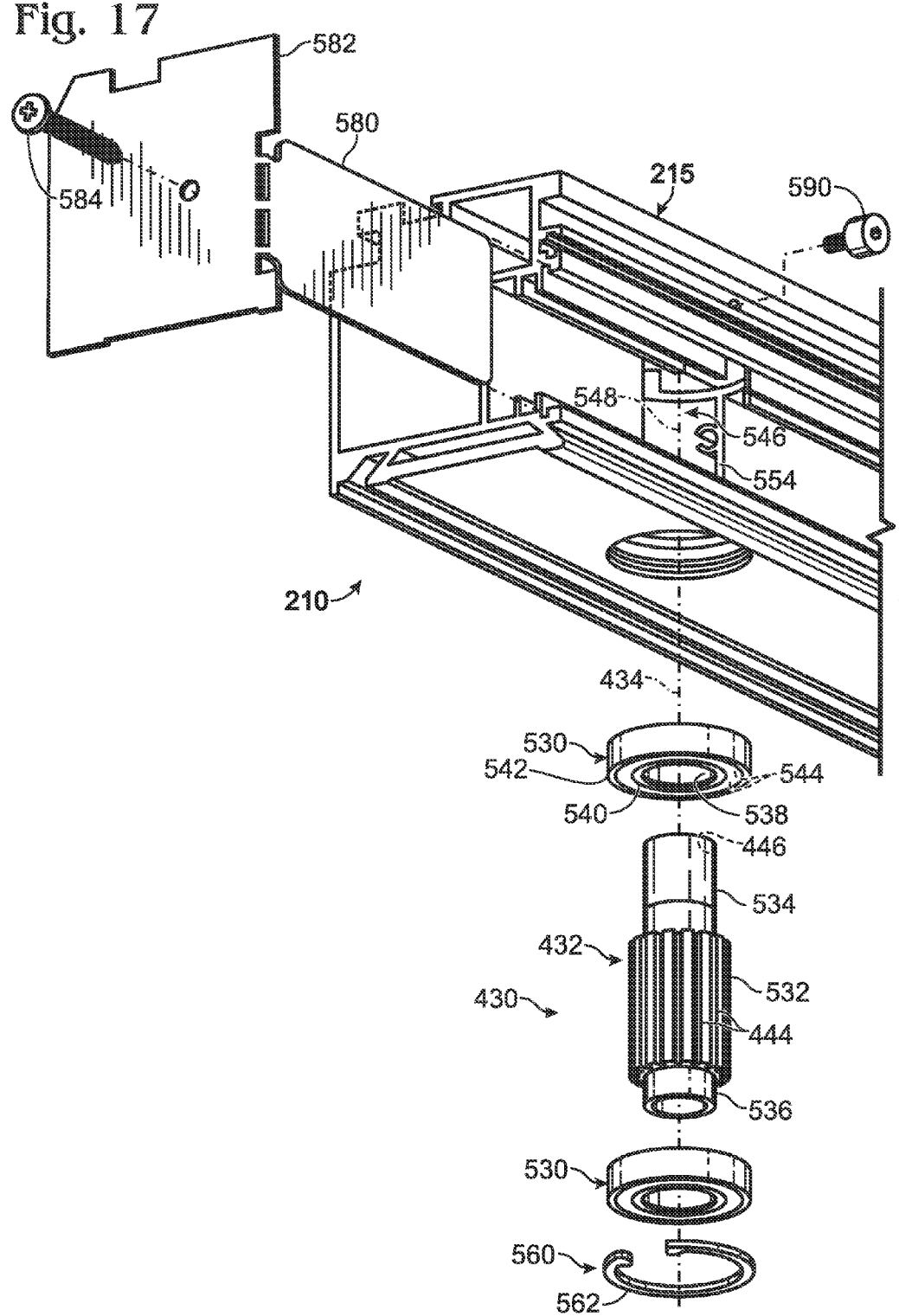

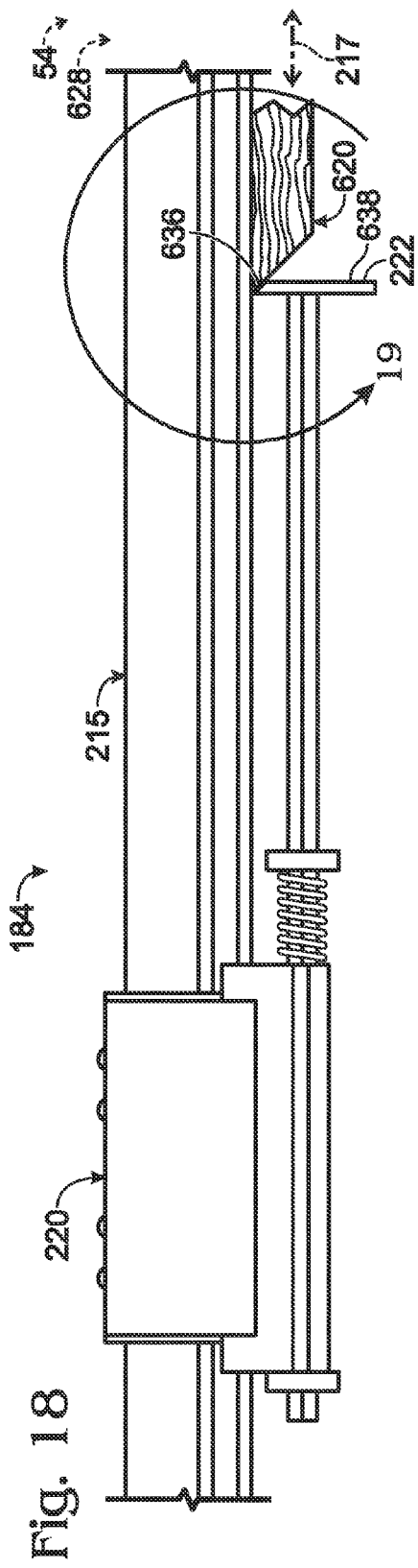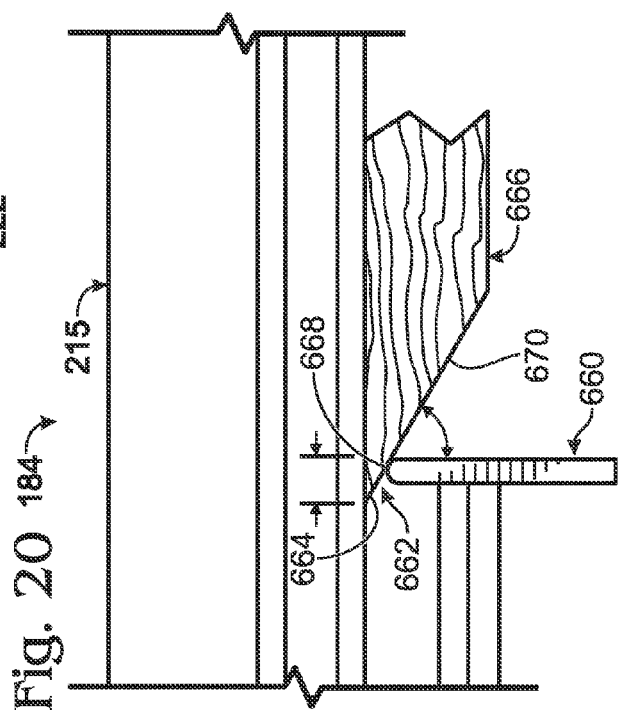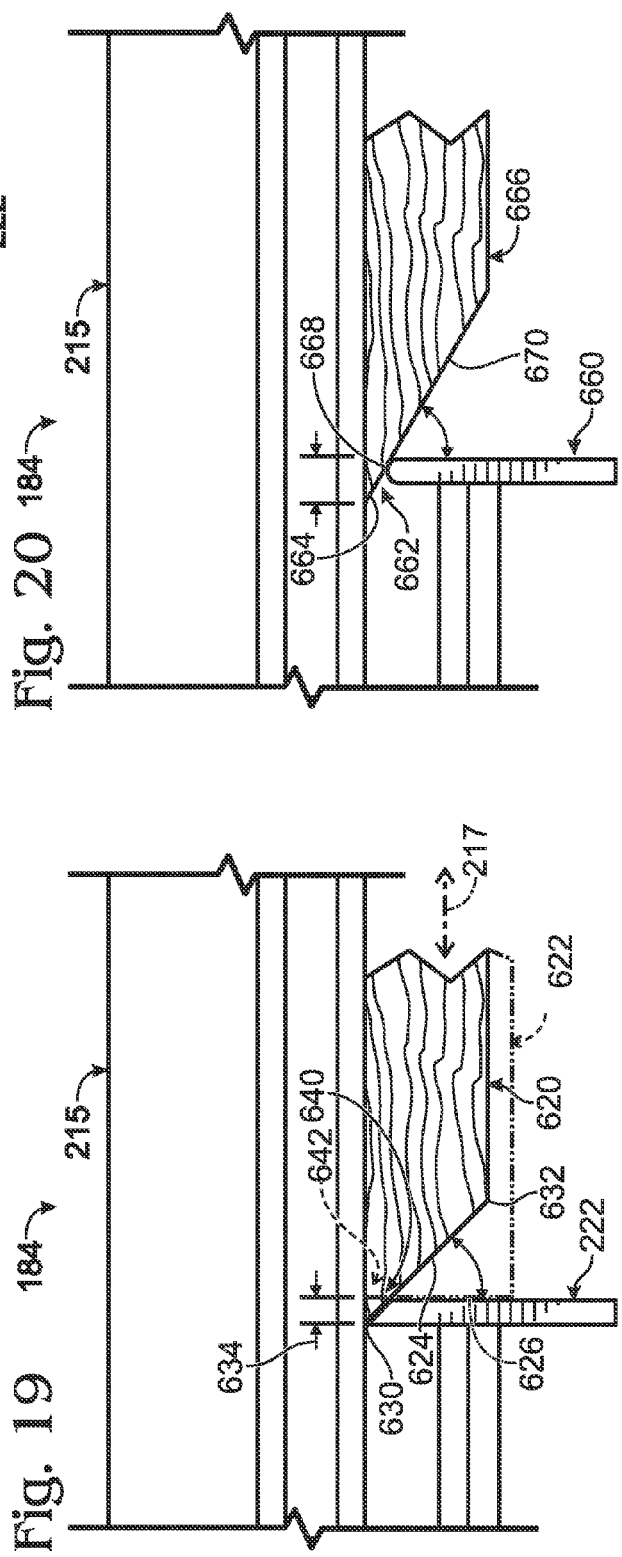

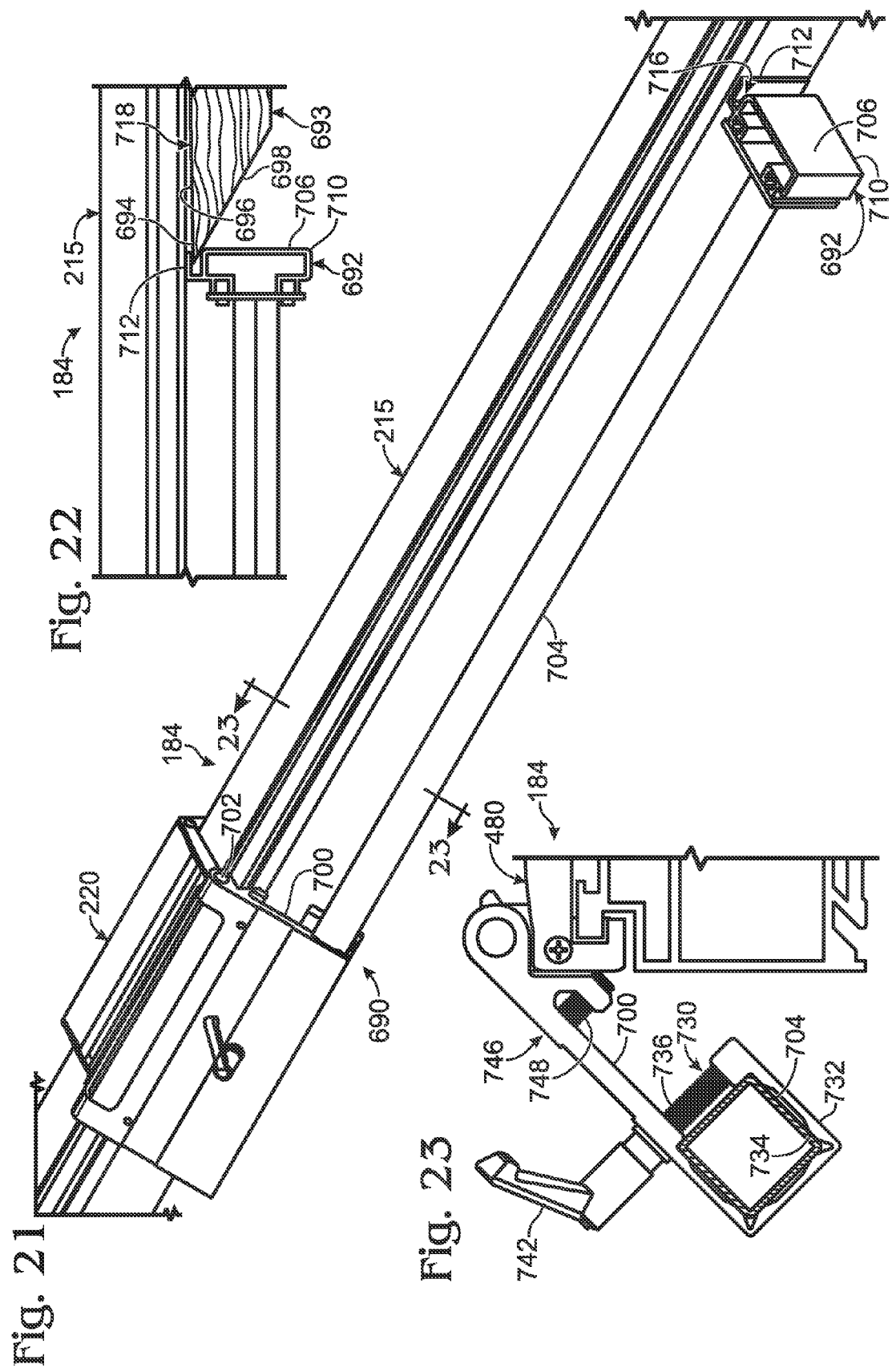

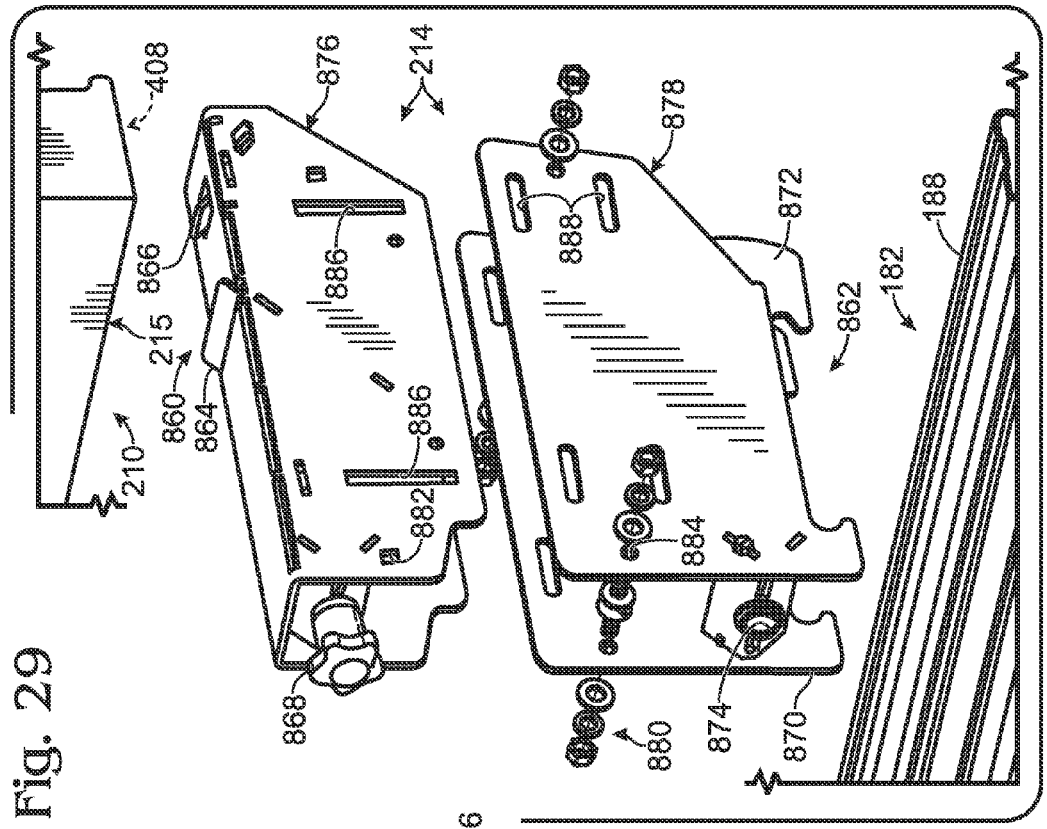
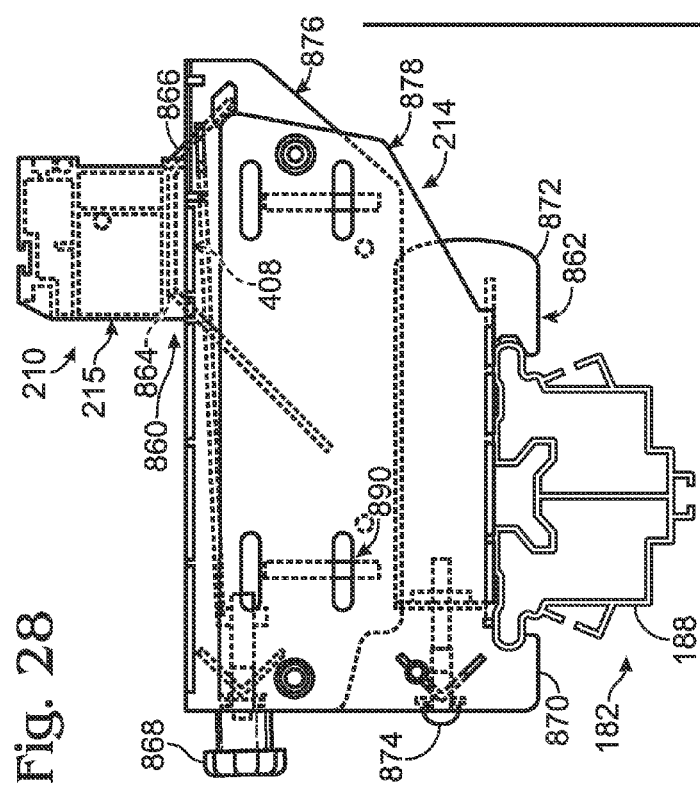

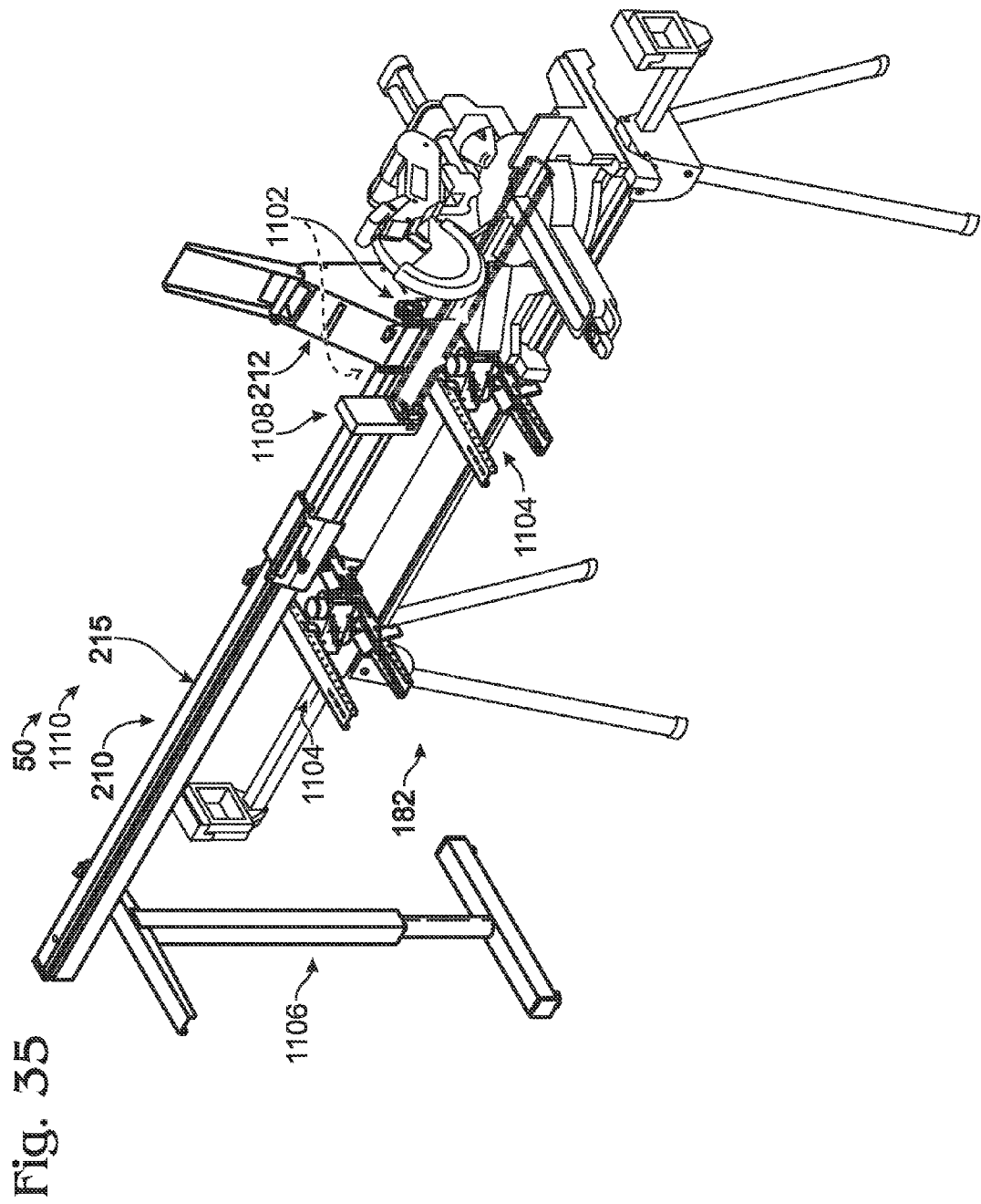

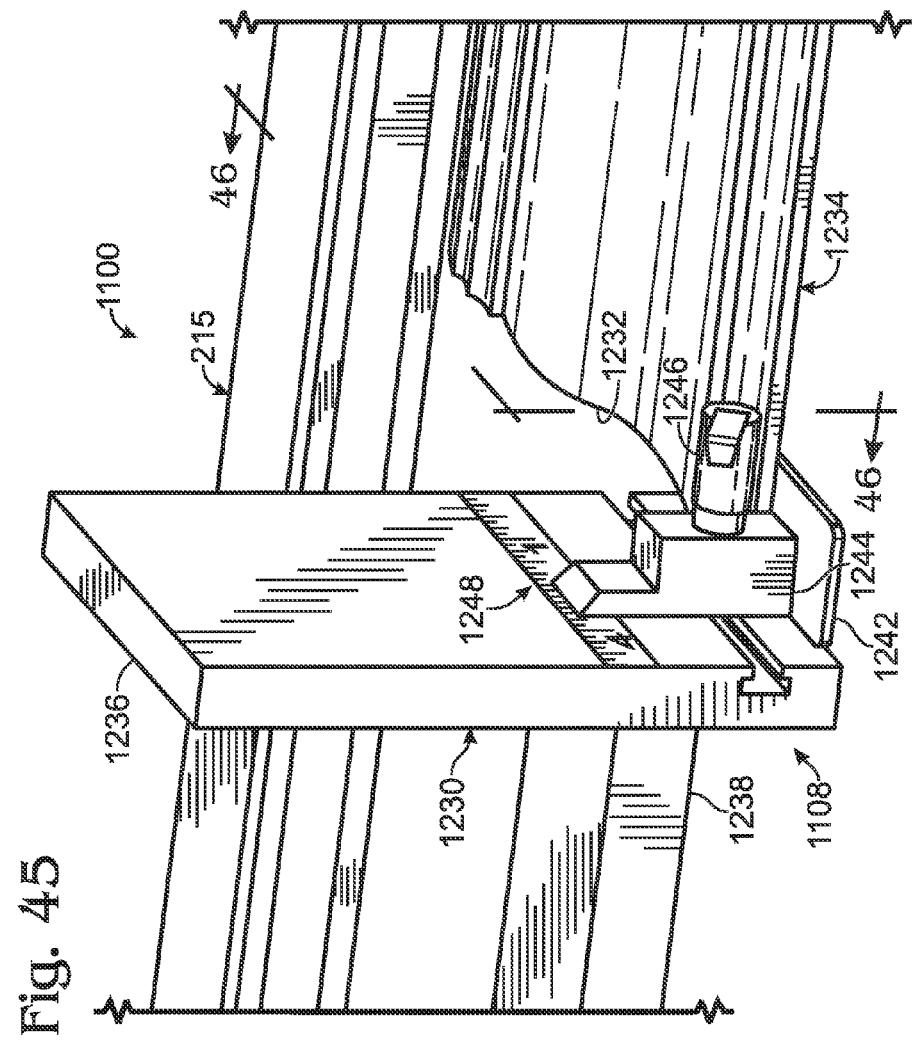
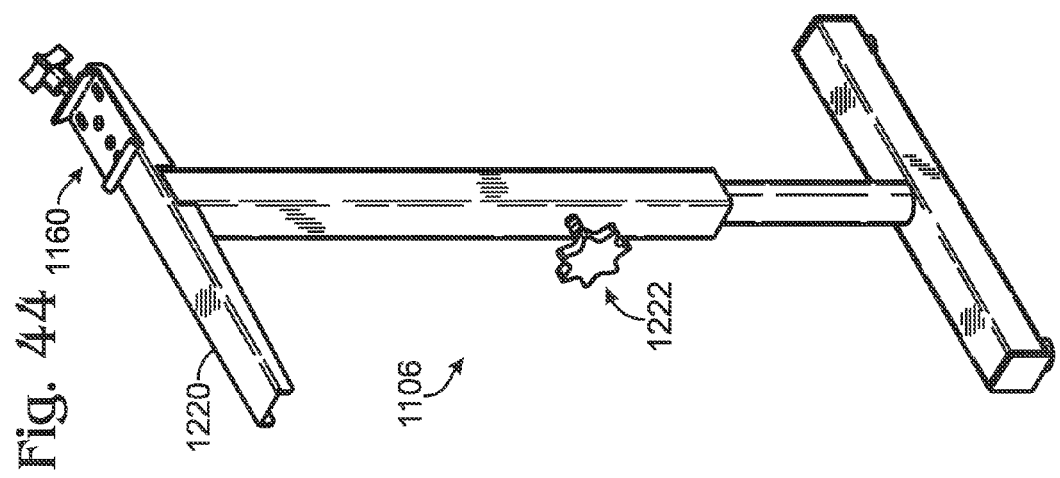

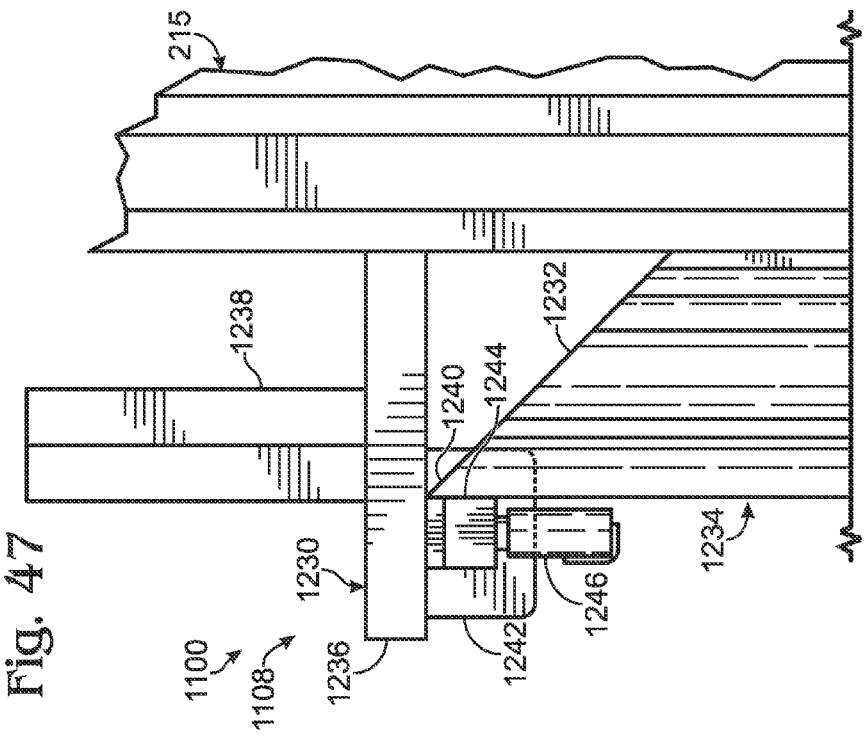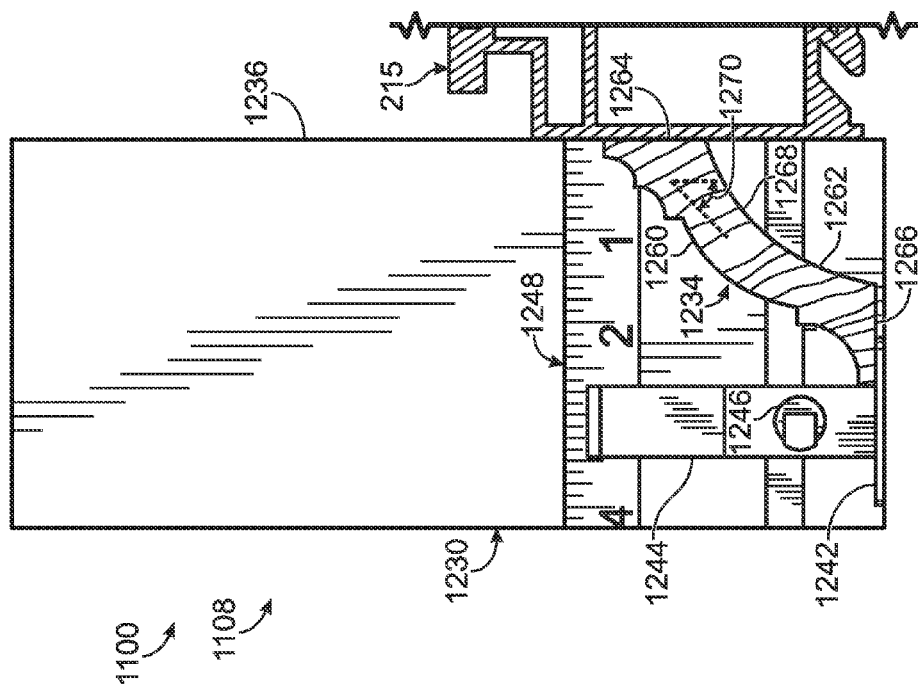

US 9,996,072 B2

GAUGE SYSTEM FOR WORKPIECE PROCESSING

CROSS-REFERENCES TO PRIORITY APPLICATIONS

This application is a continuation of U.S. patent application Ser. No. 12/797,581 filed Jun. 9, 2010, which claims priority from U.S. Provisional Patent Application Ser. No. 61/185,553, filed Jun. 9, 2009, and U.S. Provisional Patent Application Ser. No. 61/352,259, filed Jun. 7, 2010, all of which are incorporated herein by reference in their entirety for all purposes.

BACKGROUND

Computer-controlled positioning systems, also termed gauge systems, are commonly used in manufacturing environments to position workpieces, such as pieces of lumber, pipes, conduits, sheet metal, extrusions, or the like, quickly and accurately relative to a processing tool, such as a saw. In stop-based gauge systems, a stop serves as a movable fence that contacts an end (or other surface) of a workpiece to establish a distance from the end to the processing tool. The stop can be driven along a linear axis (i.e., a measurement axis) to adjust the distance of the stop from the tool according to a target dimension for a product to be formed by processing the workpiece with the tool, such as the length to be cut from a piece of lumber.

Stop-based, linear gauge systems can have various levels of complexity. More sophisticated versions automate control of the tool and use the stop as a pusher to drive movement of the workpiece toward the tool. These pusher-based systems can, for example, drive the end of a workpiece toward the tool to multiple stopped positions at which workpiece processing is performed, to create multiple products automatically from a single workpiece. For example, pusher-based systems can create a set of products of desired length automatically based on a cut list. In contrast, simpler stop-based gauge systems combine (a) a passive stop that does not push the workpiece and (b) manual control of the tool. With these simpler systems, a user manually places a workpiece against the stop after the stop has ceased moving at a location defined by a target dimension, and then manually controls the tool to process the workpiece.

Stop-based, linear gauge systems improve efficiency and accuracy, thereby saving time and money. Accordingly, many craftsmen, such as framers, finish carpenters, cabinet installers, and cabinetmakers, would benefit from use of these gauge systems. However, these craftsmen frequently do not work predominantly in a single facility, but instead may move frequently between different job sites. As a result, craftsmen often opt not to invest in stop-based gauge systems because of these systems' perceived lack of portability, high cost, large size, complexity of use, lack of functionality, and difficulty to assemble and maintain. Therefore, improved stop-based gauge systems are needed that are more portable, less expensive, more compact, safer, less complex, more functional, and/or more user-friendly to assemble, operate, reconfigure, and/or service.

SUMMARY

The present disclosure provides a gauge system, including methods and apparatus, for positioning workpieces according to entered and/or calculated target dimensions and processing the workpieces with a tool to generate products having the target dimensions.

BRIEF DESCRIPTION OF THE DRAWINGS

FIG. 8 is a fragmentary plan view of the positioner of FIG. 4, taken generally at "8" in FIG. 6 around a site of attachment of a power module to the rail module of the positioner.

FIG. 9 is a fragmentary sectional view of the positioner of FIG. 4, taken generally along line 9-9 of FIG. 8, with selected components not shown to simplify the presentation.

FIG. 10 is a cross-sectional view of the positioner of FIG. 4, taken generally along line 10-10 of FIG. 7, with selected components not shown to simplify the presentation.

FIG. 14 is a back elevation view of the rail module of the positioner of FIG. 4, with a carriage of the rail module repositioned relative to FIG. 4.

FIG. 15 is a fragmentary back elevation view of the rail module of FIG. 14, taken generally at "15" in FIG. 14.

FIG. 16 is a cross-sectional view of the positioner of FIG. 4, taken generally along line 16-16 of FIG. 11, with selected components not shown to simplify the presentation.

FIG. 17 is an exploded, fragmentary view of an end region of the rail module of the positioner of FIG. 4, taken from below and behind the rail module, with a belt of the rail module not shown to simplify the presentation.

FIG. 18 is a fragmentary, plan view of the positioner of FIG. 4, with a stop of the positioner abutted with and axially positioning a workpiece having a miter-cut end, in accordance with aspects of the present disclosure.

FIG. 19 is a fragmentary, plan view of the positioner and workpiece of FIG. 18, taken generally at "19" in FIG. 18.

FIG. 20 is a fragmentary, plan view of the positioner of FIG. 4, with a stop of the positioner abutted with and establishing an axial position for a miter-cut workpiece, taken generally as in FIG. 19, but with the positioner including a stop assembly of distinct structure from that of FIG. 19.

FIG. 21 is a fragmentary view of the positioner of FIG. 4 equipped with another exemplary stop assembly.

FIG. 22 is a fragmentary, plan view of the positioner of FIG. 21, with a stop foot of the stop assembly abutted with a workpiece having a miter-cut end.

FIG. 23 is a fragmentary, cross-sectional view of the positioner of FIG. 21, taken generally along line 23-23 of FIG. 21.

FIG. 28 is a side elevation view of an exemplary bracket assembly utilized in the system of FIG. 3 to attach the rail module to a frame beam.

FIG. 29 is an exploded view of the bracket assembly of FIG. 28.

FIG. 35 is a view of another exemplary saw-based embodiment of the gauge system of FIG. 1, in accordance with aspects of the present disclosure.

FIG. 44 is a view of an accessory support leg from the system of FIG. 35, taken in isolation from other system components, in accordance with aspects of the present disclosure.

FIG. 45 is a fragmentary view of the saw system of FIG. 35, taken generally around a stop foot abutted with a miter-cut end of a piece of crown molding, in accordance with aspects of present disclosure.

FIG. 46 is a sectional view of the system of FIG. 35, taken generally along line 46-46 of FIG. 45 through the crown molding and beam and toward the stop foot, with selected components not shown to simplify the presentation.

FIG. 47 is a top view of the stop foot and crown molding of FIG. 45.

DETAILED DESCRIPTION

Figure 1:
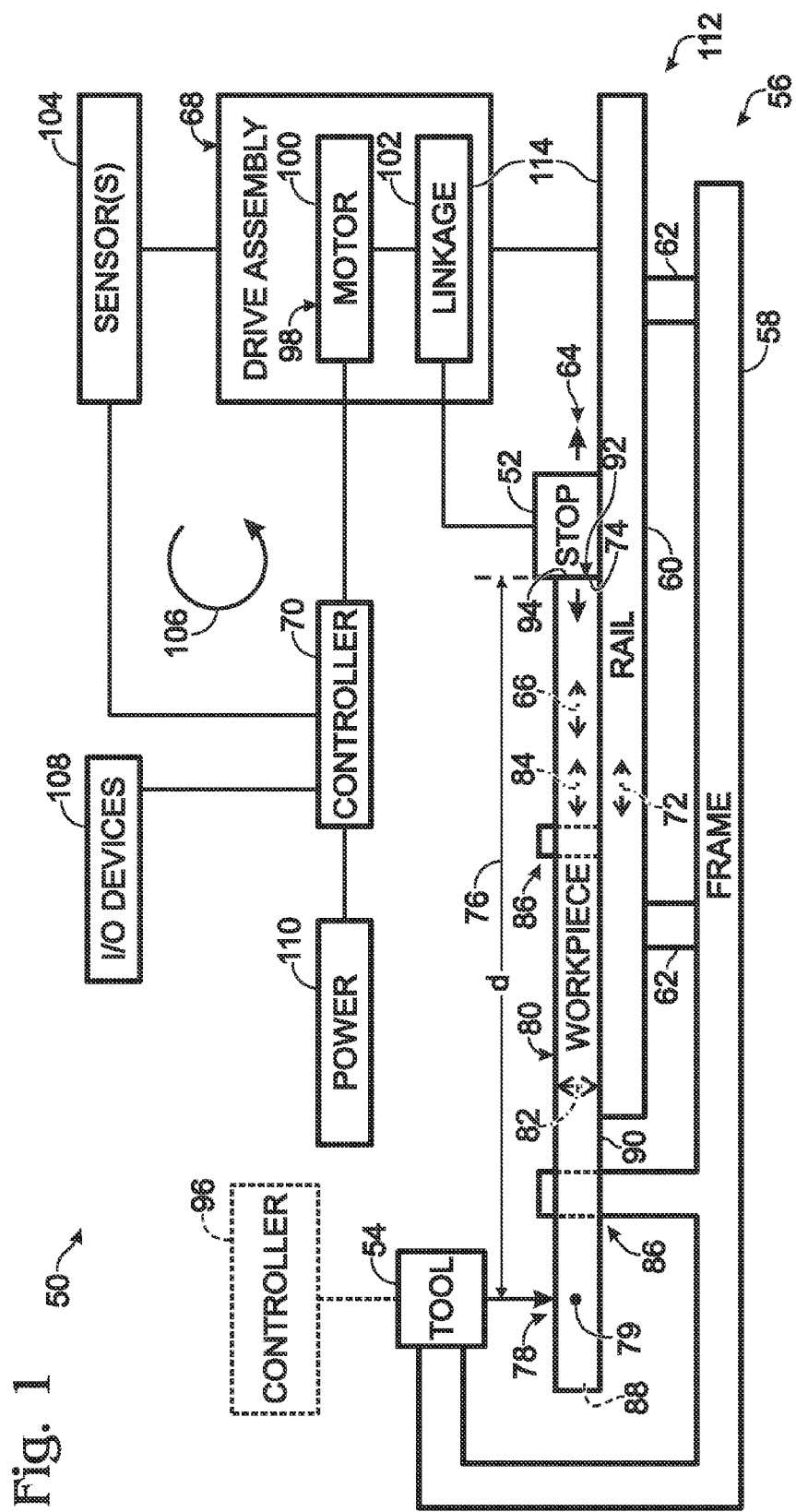
FIG. 1 is a schematic view of selected components of an exemplary gauge system for workpiece processing, with the system including a positioning apparatus in contact with an exemplary workpiece that has been positioned by the apparatus at a target distance from a tool, in accordance with aspects of the present disclosure.

The present disclosure provides a gauge system, including methods and apparatus, for positioning workpieces according to entered and/or calculated target dimensions and processing the workpieces with a tool to generate products having the target dimensions. In exemplary embodiments, the gauge system is more portable; more modular; easier to assemble, reconfigure, and/or service; simpler; and/or less expensive; among others, than gauge systems of the prior art.

The gauge system may be described as a workpiece processing system and may utilize a tool having a site of action. The system may comprise a rail, a stop connected to the rail and configured to be abutted with workpieces, a drive assembly connected to the rail and capable of driving the stop back and forth (e.g., leftward and rightward) along the rail to different separations from the site of action, and a controller. The controller may be programmed to receive a target dimension of a product to be generated from a workpiece with the tool. The controller also may be programmed to control the drive assembly such that the stop is driven to a target position spaced from the site of action according to the target dimension, thereby allowing the workpiece to be modified by the tool, with the workpiece disposed against the stop at the target position, to generate the product.

Cutting workpieces on a miter (i.e., obliquely) with a gauge system can be complicated and problematic. The opposing sides of the product may have different lengths, only one or both ends of the product may be miter-cut, and, if both ends are miter-cut, the cuts may be at least generally parallel, convergent, or divergent. Furthermore, there may be limitations on which side of the workpiece should be placed against the saw fence (e.g., when performing shear cuts in which the acute corner of the miter-cut end of a product is formed after the obtuse corner of the same miter-cut end). Gauge systems of the prior art fail to provide any solution to the problems associated with miter compensation or do so mechanically, instead of with a controller. For example, a particular gauge system of the prior art provides a mechanical solution to miter compensation by utilizing a stop that can be pivoted to a selected angle, for abutment with a miter-cut end of a workpiece that has been pre-cut at the same angle. However, the use of a pivotable stop is too cumbersome if the selected angle needs to be changed frequently, such as when square cuts and miter cuts are interspersed with one another. Also, the pivotable stop does not provide for any miter compensation at the saw, which may be necessary if the saw is oriented to create a miter cut.

The present disclosure offers a controller-based solution to miter compensation. The gauge system may be a saw system that cuts workpieces to produce products, such as for use in miter joints. Accordingly, the tool may be a saw defining a cutting path. The stop may be driven back and forth along a measurement axis that intersects the cutting path to define an origin. The controller may be programmed to receive a target length of a product to be generated from the workpiece. The controller also may be programmed to control operation of the drive assembly based on the target length such that the stop is driven to an adjusted position spaced from the origin by an adjusted length that modifies the target length with at least one miter offset, to compensate for a miter cut at one or both ends of the product. In some embodiments, a miter saw may be in communication with the controller. The miter saw may send signals to the controller, with the signals corresponding to distinct selected angles of the miter saw. The controller may calculate the required offset(s) for each angle and adjust target dimensions accordingly. Also, the controller may provide on-screen instructions (graphical and/or text) to the user for making cuts at the angles selected. Furthermore, the gauge systems disclosed herein may permit all miter cuts for a project to be made while feeding material in one direction.

The gauge system of the present disclosure may include a rail module and a power module that can assembled and disconnected from one another quickly and easily, optionally without the use of tools. The rail module may include a beam that forms the rail and also may include a first member connected to the beam such that rotation of the first member drives the stop back and forth along the beam, to achieve different separations of the stop from the site of action of the tool. The power module may form at least part of the drive assembly and may include a motor and a second member rotated by operation of the motor. The power module may mate detachably with the rail module by fitting the first and second members together such that the operation of the motor transmits motive power to the stop. Accordingly, the rail module and the power module may be assembled with one another much more quickly and easily than in prior art gauge systems, which may substantially enhance the portability of the gauge system (since the rail module and power module can be disconnected readily and transported while disconnected). Also, the modularity of the gauge system enhances its ability to be reconfigured for different users, tools, job sites, projects, etc.

Pulley-based gauge systems of the prior art mount pulleys on pulley carriages, which are disposed in and attached to a beam. The spacing of the pulleys and thus tension on a connecting belt is controlled by adjusting the position of one or both pulley carriages along the beam. However, this approach suffers from a number of drawbacks: the belt may be tensioned improperly or inconsistently, the gauge system may need to be disassembled substantially to change the belt, the pulleys may drift in position over time, and/or the like.

In some embodiments, the gauge system disclosed herein avoids the need for pulley carriages by mounting the pulleys in respective transverse cavities formed in the beam. As a result, the pulleys may remain mounted and their spacing may remain constant even when the belt is changed. The gauge system may incorporate a rail assembly that includes a beam forming the rail and that also includes a pair of pulleys and a belt that couples rotation of the pulleys to one another. The beam may include an exterior surface and a pair of cavities each extending transversely into the beam from the exterior surface. The pulleys may be mounted in the cavities. In some embodiments, pivot axes of the pulleys may be coaxial with apertures formed in walls of the rail.

The gauge system also or alternatively may have a belt that is easier to access, tension, and/or replace. The gauge system of the present disclosure may include a rail assembly, which may incorporate a beam forming the rail and also may be equipped with a pair of pulleys and a belt that couples rotation of the pulleys to one another. The belt may extend to a pair of ends. The rail assembly may include a belt linkage that secures the pair of ends adjacent one another to form a closed loop around the pulleys. The belt linkage may be adjustable to change a spacing of the ends relative to each other while the ends remain secured, thereby permitting changes to a tension of the belt via its ends. As a result, in some embodiments of the gauge system, the belt may be replaced and/or its tension adjusted without removing the pulleys from the beam and/or without changing their spacing from one another, which simplifies construction and belt maintenance. In contrast, pulley-based gauge systems of the prior art involve translational movement and/or disconnection of the pulleys from a beam in order to permit belt tensioning and/or belt replacement.

Gauge systems of the prior art fail to throttle power intelligently, if at all. In particular, in these prior art systems, when motion of the stop is blocked or hampered, greater and greater amounts of power are supplied to the motor in an attempt to drive the stop anyway. As a result the power supplied to the motor can spike quickly, which may cause the controller to lose data and/or which may case sensor data from the rotary encoder to become unreliable, thereby requiring a restart of the controller. Controller restarts waste time and can be very annoying to the user. Also, power spikes can damage the motor. Furthermore, forcing motion of the stop with large amounts of power can injure a user, such as when the user's hand gets caught in the stop.

In some embodiments, the gauge system of the present disclosure may be capable of performing power throttling, to minimize the generation of power spikes and power overloads without compromising the ability of the motor to efficiently drive the stop. The drive assembly of the gauge system may include a motor. The controller may be programmed to restrict amounts of power supplied to the motor according to a predefined limit. The predefined limit may increase with a speed of the motor, thereby reducing or eliminating generation of power spikes when motion of the stop is blocked or hampered. The gauge system thus may provide power throttling that functions as a software-based "spring." The power throttling may enable use of travel barriers and may reduce motor wear and failure, improve hand safety (such as if a hand gets jammed between the stop and the rail), and/or reduce power overloads, among others.

Gauge systems of the prior art avoid use of travel barriers (e.g., hard stops) to restrict stop movement because travel barriers can cause power spikes and power overloads when a carriage and/or stop encounters a travel barrier. Instead, prior art gauge systems utilize end sensors to sense when the stop has neared an end of its range of travel, so that the stop can be halted before a physical barrier is contacted by the stop and/or its carriage. However, end sensors have numerous disadvantages, including cost, difficulty to install and service, and inaccuracy in precisely defining stop position.

The gauge system may use travel barriers. The travel barriers may be used to facilitate placing the stop at a known position, to determine a value for a range of travel of the stop based on a pre-set scale factor, to determine a position for each end of the stop's range of travel, and/or to calculate a scale factor that correlates rotation of the motor to linear travel of the stop. The gauge system may incorporate a rail assembly that includes the rail, a carriage, and at least one travel barrier. The stop may be supported by the carriage and may have a range of travel along the rail. At least one end of the range of travel may be determined by contact of the carriage with the travel barrier. The controller may be programmed to drive the stop until movement of the stop is halted by the contact of the carriage with the travel barrier, to define the current location of the stop, thereby placing the stop at a home position (i.e., homing the stop).

Gauge systems of the prior art permit operative connection of a motor to only one end region of a rail. Accordingly, in these systems, the left/right position of the motor either is fixed or can be changed by disconnecting the rail from its mounted position and flipping the rail over lengthwise. As a result, moving the motor from left to right is complicated and may require substantial disassembly of the system and re-tensioning of the belt.

The gauge system of the present disclosure may permit more flexibility and/or ease in selecting and changing motor position. The rail may have opposing end regions. The drive assembly may include a motor that supplies motive power to the stop. The motor may be operatively connectable to the rail with the motor disposed adjacent either opposing end region to couple operation of the motor to driven motion of the stop back and forth along the rail. In some embodiments, the motor may be connected adjacent each end region without changing the orientation of the rail. In some embodiments, the motor may be operatively coupled to at least one pulley mounted to the rail while the pulley remains mounted to the rail. An ability to connect a motor to either end of the rail greatly improves portability.

Gauge systems of the prior art place the carriage at least mostly inside the rail. This placement substantially encloses the travel path of the carriage, which avoids inadvertent obstruction of carriage movement, thereby minimizing power spikes, power overloads, and injury. However, placing the carriage inside the rail makes assembly, service, and repair of the carriage more difficult and time consuming.

The gauge system of the present disclosure may position the carriage externally to the rail, and thus more conveniently for assembly, service, and repair, relative to an internal carriage. The gauge system may include a carriage that supports the stop. The rail may include a beam that supports the carriage and forms an external track. The carriage may be driven along the beam guided by the external track. In some embodiments, the carriage may be disposed externally on the rail to slide along an external way formed outside the rail, rather than inside the rail. The carriage may include one or more set screws to remove play.

Gauge systems of the prior art design the motor and controller as separate modules. With this approach, the controller can be situated conveniently for the user, such as above the rail, while the motor can be situated out of the way of the user, such as behind the rail. Also, the controller can be moved along the rail to accommodate different tool positions, target lengths, or user preferences, while the motor is kept at the same site adjacent the rail (since the user does not need to have continual access to the motor). Moreover, both the motor and the controller can be replaced or serviced individually. Furthermore, the controller can be readily shielded, by intervening space, from heat and vibration generated by the motor. However, keeping the motor and controller separate makes the gauge system less portable and more difficult to reconfigure. The gauge system of the present disclosure may place the motor and controller in the same module. The system may include a motor box that includes a motor that forms a portion of the drive assembly and also includes the controller. In some embodiments, the gauge system may include a power module that incorporates the motor, the controller, and a user interface, which improves the portability and the ease of assembly and disassembly of the system. The integrated power module may be configured to mate with a rail module that includes the rail and a drive linkage of the drive assembly.

The gauge system of the present disclosure may adapt to different styles of entering target dimensions. The controller may be programmed to receive target dimensions entered in either decimal format or fractional format by a user and to display the target dimensions according to the format in which the target dimensions were entered.

These and other aspects of the present disclosure are included in the following sections: (I) system overview, (II) an exemplary embodiment of a saw-based gauge system, (III) an exemplary embodiment of a positioning apparatus, (IV) exemplary bracket assemblies, (V) exemplary control and operation of a positioning apparatus, and (VI) examples.

I. SYSTEM OVERVIEW

FIG. 1 shows an exemplary gauge system 50 for positioning and processing of workpieces. The gauge system may include a stop 52 and a tool 54 that are connected to one another and/or supported by a frame assembly 56. The frame assembly may incorporate a base frame 58, a rail 60 (which may be part of a rail assembly), and, optionally, one or more bracket assemblies 62 that connect rail 60 to base frame 58. Rail 60 may be elongate and linear and also or alternatively may be described as a longitudinal fence, a frame, a frame member, a linear rail, a beam, a linear beam, a guide, or a linear guide.

Stop 52, which also or alternatively may be described as a datum structure or a transverse fence, may be driven back and forth (e.g., leftward and rightward), indicated at 64, along the rail and parallel to a measurement axis 66 (also termed a positioning axis) by a drive assembly 68 controlled by a controller 70. In some embodiments, measurement axis 66 may be at least substantially parallel to a longitudinal axis 72 defined by the rail, with the rail extending parallel to measurement axis 66. Measurement axis 68 generally is a linear axis. In any event, the stop, and particularly a datum surface 74 thereof, may be driven by drive assembly 68 to a target distance or target dimension 76 (also termed a set point) from a processing site or site of action 78 for tool 54. More particularly, the tool may define an origin 79 of measurement axis 66 where the measurement axis intersects the processing site and the stop may be driven to a target position spaced from the origin along the measurement axis by the target dimension. The target dimension may be for a product to be formed from a workpiece 80 by action of the tool and/or may be adjusted to compensate for a miter offset, among others.

Target dimensions (or set points) generally include any data corresponding to one or more target distances of the stop to a landmark, such as a processing site or site of action for a tool. Target data and/or signals may correspond to one or more values entered via one or more input/output devices and/or calculated/converted by a controller based on entered data/set point signals. The target dimensions may be entered, received, and/or calculated as a list of values, such as a cut list defining the values of a characteristic target dimension (e.g., the target lengths) of a set of cut products.

A target dimension may be any characteristic dimension of a product to be generated from a workpiece. The characteristic dimension may, for example, be any perimeter dimension measured parallel to one of the main axes of a workpiece, such as a target length or target width, among others. The target length thus may be a target longitudinal dimension, such as for a square-cut product. Alternatively, for a miter-cut product, the target length may be a shortest or "short point" target longitudinal dimension (i.e., a short-point target length) or a longest or "long point" target longitudinal dimension (i.e., a long-point target length). In some embodiments, the gauge system may receive a short-point target length and then move the stop according to a long-point target length calculated using the short-point target length, and, optionally, a width of the workpiece. Alternatively, the gauge system may receive a long-point target length and then move the stop according to a short-point target length calculated using the long-point target length. In some embodiments, where the tool (such as a drill) does not change the characteristic perimeter dimensions of the workpiece, the target dimension for a product may be measured from an end or side surface of the product to a site on the product where the product is modified (e.g., bored) by the tool.

A miter, as used herein, is an oblique surface of a workpiece. A miter may be formed by performing a miter cut (an oblique cut) through the workpiece, to form an oblique surface on the workpiece. A workpiece or product with at least one miter may be called a mitered workpiece or product. The miter may be formed at a miter angle, which is the angle by which the oblique surface is tilted from orthogonal or parallel to one or more characteristic axes (i.e., longitudinal or traverse axes) of the workpiece. A miter offset may be any dimensional adjustment value necessitated by a miter present on the workpiece or to be formed on a product thereof. Incorporation of a miter offset into a dimension generally means that the miter offset is used to modify the dimension, such as adding the miter offset to, or subtracting the miter offset from, the dimension.

A width, as used herein, is a characteristic transverse dimension of an article. The width, for example, may be the larger one or the smaller one of the two characteristic transverse dimensions of a rectangular workpiece. In some embodiments, the width may be the larger characteristic transverse dimension, such as for miter compensation with casing molding. In some embodiments, the width may be the smaller characteristic transverse dimension, such as for miter compensation with baseboard molding. In some embodiments, the width may be an effective width for crown molding supported at its spring angle.

Measured aspects, such as dimensions, lengths, widths, angles (or tangents thereof), positions, distances, speeds, and so on, used herein generally have values. For example, a user may enter into a controller a value for a target length. However, the use of "value" has been omitted in most cases herein, for the sake of brevity and because the term "value" is understood from the context without a need to recite the term explicitly. For example, the phrase "a user may enter a value for a target length" is generally shortened herein to "a user may enter a target length," with equivalent meaning.

The stop may be moved along the measurement axis with respect to the rail and/or frame assembly, which may remain at least substantially stationary during stop movement. The stop may be driven to a target position corresponding to the target dimension, where movement of the stop ceases. The stop may be held at the target position to resist stop movement, such as by operation of the drive assembly and/or an accessory device, such as a clamp, among others. Workpiece 80 may be processed by the tool while abutted with the stop and while the stop is held at the target position. The stop held at the target position may be described as being at least substantially immobile, stationary, or fixed.

The workpiece may be placed against the stop before or after the stop is moved to the target position.

Stop 52 may be any datum structure that serves as a basis for measurement. The stop may be described as a fence, a pusher, a foot, or the like. Generally, the stop provides a contact surface for abutment with a workpiece, with the contact providing a datum from which to measure the linear distance to an origin of the measurement axis, which corresponds to the linear distance to a site of action for the tool.

Gauge system 50 may support a workpiece 80 and situate the workpiece with respect to three orthogonal axes using stop 52 and frame assembly 56. Stop 52 defines the location of the workpiece along measurement axis 66 and frame assembly 56 may define the location of the workpiece along a vertical axis and a transverse axis 82, which each extend transversely to measurement axis 66. Measurement axis 66 and transverse axis 82 may have any suitable orientation with respect to a user of the gauge system. In an exemplary configuration, the measurement axis extends generally leftward and rightward and the transverse axis extends generally forward and rearward with respect to the user.

The workpiece may be supported by frame assembly 56, generally with a longitudinal axis 84 of the workpiece disposed horizontally. Support for the workpiece may be provided by any suitable portion of the frame assembly (and/or stop), such as base frame 58, rail 60, brackets 62, or a combination thereof, to define an elevation of the workpiece above the floor/ground along a z-axis (vertical axis). The frame assembly (i.e., frame 58, rail 60, and/or one or more brackets 62) may support workpiece 80, indicated schematically at 86, by contact with a surface of the workpiece, generally a lower or bottom surface 88 (i.e., an underside) thereof. The workpiece may be aligned with the measurement axis: a characteristic axis of the workpiece (such as longitudinal axis 84) may be oriented parallel to measurement axis 66 by contact of another workpiece surface (e.g., a front/rear surface 90) with the frame assembly (frame 58, rail 60, and/or bracket(s) 62). In some embodiments, rail 60 abuts the workpiece to define a position of the workpiece along transverse axis 82, thereby acting as a longitudinal fence. A fence is any wall or barrier against which a workpiece is placed to position the workpiece for processing with a tool.

Frame 58 of the frame assembly may have any suitable structure, such as a stand, a table, a base, a bench, or a combination thereof. In some embodiments, frame 58 may be self-supporting and/or may include legs and/or feet to support the frame assembly on a generally horizontal surface, such as a floor and/or the ground. In some embodiments, frame 58 may provide supportive contact for the workpiece using a discrete tool frame that is connected to a base frame (e.g., see FIG. 3).

Workpiece 80 may be positioned with the aid of stop 52 at a target position spaced according to the target dimension from the site of action of tool 54 along measurement axis 66. The stop may be driven to the target position before or after the workpiece is contacted with the stop. If the stop is driven to the target position before workpiece contact, the workpiece may be contacted with the stop manually (or automatically) by moving the workpiece with respect to the stop. Alternatively, if the stop is driven to the target position after workpiece contact, the stop may function as a pusher that drives movement of the workpiece. In any event, a workpiece datum 92 (e.g., an end surface 94) may be abutted with stop 52 at stop datum 74, to dispose the workpiece for processing by the tool at a target distance or target dimension 76 from end surface 94 (or other datum surface) of the workpiece. When disposed for processing by the tool, the workpiece may extend across the site of action of the tool, such as extending across a cutting path defined by a saw as the tool.

The systems of the present disclosure may position and process workpieces. A workpiece, as used herein, is any piece of material that will be, or is being, positioned and/or processed by a gauge system. A tool of the gauge system thus may process the raw form of the workpiece, a partially processed form of the workpiece (such as a workpiece cut into smaller pieces or segments (a segmented form of the workpiece) and/or modified otherwise), or both. A processed form of a workpiece, as used herein, is termed a workpiece product or a product.

A workpiece may have any suitable composition. Workpieces thus may be formed of wood, metal, plastic, fabric, cardboard, paper, glass, ceramic, or a combination thereof, among others. The composition may be generally uniform or may vary in different regions of a workpiece. Exemplary workpieces are wood products, for example, pieces of lumber, such as pieces of stock. Other exemplary workpieces are metal sheets, pipes, or bars.

A workpiece may have any suitable shape and size. Generally, the workpiece is elongate. However, in some embodiments, the workpiece may not be elongate and/or may not be oriented with the long axis of the workpiece parallel to the measurement axis. The workpiece may have any suitable length. Exemplary lengths are based on available lengths of stock pieces, such as stock lumber of about two feet to twenty feet in length, for the purpose of illustration.

A workpiece may be of generic stock or may be pre-processed according to a particular application, before processing in a gauge system. For example, the workpiece may be a standard or pre-cut piece of raw lumber. Alternatively, the workpiece, before processing by the gauge system, may include one or more holes, grooves, ridges, surface coatings, markings, etc., created, for example, based on desired features of products to be formed by the gauge system.

Any suitable tool 54 (or two or more tools) may be used to process the workpiece. Processing the workpiece with a tool, as used herein, includes any structural modification of workpiece by the tool, such as by adding material to the workpiece (e.g., printing, painting, fastening, etc.), removing material from the workpiece (e.g., cutting or boring), reshaping the workpiece without substantially removing or adding material (e.g., bending, forming, stamping, etc.), or any combination thereof. The tool may be driven manually or may be a power tool (e.g., an electrical power tool). Furthermore, the tool may be controlled manually, such as after manual positioning of the workpiece against the stop. Alternatively, the tool may be controlled automatically by a tool controller 96 that determines when and/or how the tool processes the workpiece. (Controller 96 is shown in phantom outline to improve clarity.) Tool controller 96 may be in communication with stop controller 70, or motion/operation of both the stop and the tool may be under control of the same controller. Automatic control of tool 54 with a controller may be more suitable when stop 52 is configured as a pusher that drives workpiece movement. Exemplary tools 54 include saws (e.g., chop saws (also termed miter saws), table saws, radial arm saws, panel saws, cold saws, hand-driven saws, etc.), drills, shearers, routers, notchers, riveters, printers, sprayers, insertion tools (such as to drive fasteners), assemblers, or any combination thereof, among others. The tool may provide a fixed processing site with respect to the frame assembly along the measurement axis or the processing site may be adjustable with respect to this axis. Alternatively, or in addition, the tool may provide a processing site that is fixed or movable with respect to the frame assembly along an axis parallel to transverse axis 82 and/or along a z-axis. Furthermore, the tool may provide a generally planar processing site (e.g., a plane of cutting), which may have an adjustable angle about an axis parallel to transverse axis 82 and/or about a z-axis. In some examples, the tool may be a saw defining a cutting path. The saw may be a miter saw that is adjustable to orient the cutting path about the origin of the measurement axis.

Drive assembly 68 provides the motion or motive power that drives stop 52 along the rail. The rail and stop, with or without the drive assembly, may be described as a linear actuator. The drive assembly may include a motor assembly 98 with at least one motor 100 coupled to a drive linkage 102. The motor may receive drive signals from controller 70, to control operation of the motor, such as controlling the motor's (rotary) direction of rotation, position, speed, and/or acceleration. Any suitable type of motor may be used, for example, AC or DC, single or multiphase, induction, servo, synchronous, universal, and/or gear motors, among others. The motor may rotary or linear. In exemplary embodiments, the motor may be a DC servomotor.

Drive linkage 102 couples the stop movably to the rail and generally includes any portion or all of a mechanism that transmits motion from the motor/motor assembly to the stop. Drive linkages may, for example, include pulleys, gears, belts, screws, fixed connectors, or the like, in any suitable combination. Exemplary drive linkages convert rotary motion of the motor into linear motion of the stop, and thus may include a belt-and-pulley mechanism, a screw drive, and/or a worm drive, among others. Other exemplary drive linkages couple linear motion of the motor (a linear motor) to linear motion of the stop. Thus, the motor may be a carriage that drives itself (and a connected stop) back and forth along the rail and measurement axis.

Drive assembly 68, at least one sensor 104, and controller 70 may form a feedback loop or mechanism 106 through which the controller directs the stop to set points (or target positions). Sensor 104 may be a position sensor that is operatively coupled to drive assembly 68, to sense a position of the drive assembly, which can be correlated with a translational position of the stop along the measurement axis. The sensor may communicate sensed position signals to the controller, and the controller may utilize the position signals to determine drive signals to communicate to the motor assembly. For example, the controller may compare the current position of the drive assembly (and particularly a moving component thereof) to a set point, which may be a fixed set point or a time-dependent dynamic set point (see FIG. 32), to determine a difference ("an error") between the current position and the set point.

The controller may calculate drive signals for sending to the motor assembly based on any suitable aspect or aspects of the error, such as the magnitude of the error (proportional control; "P"), a sum of the error over time (integrative control, "I"), a change in the error over time (derivative control; "D"), or any combination thereof, among others. Accordingly, the feedback loop may operate under PID, P, PI, PD, etc. control by the controller. Exemplary feedback loops include a PID position loop, a cascaded position/velocity loop, or a PID loop with velocity and/or acceleration feedforward, among others. In the some embodiments, the feedback loop may use a target position from a look-up table and compare it with the actual position.

In exemplary embodiments, sensor 104 may be a rotary encoder, which may be configured to sense a position of motor assembly 98, such as a rotary position of a rotary component of the motor assembly (e.g., a shaft, a gear, a pulley, or a wheel thereof, among others) achieved by rotation of the rotary component. The rotary position may be compared with a fixed or dynamic rotary set point (corresponding to a fixed or dynamic linear set point), to determine a drive signal to send to the motor assembly and particularly the motor thereof.

Controller 70 may be connected and/or connectable to any other suitable devices and/or sources. For example, the controller may be in communication with one or more input/output devices 108, which may communicate data (signals) to and/or receive data (signals) from the controller. Also, controller 70 (and/or tool controller 96) may be connected to a power supply 110, which may supply AC power or DC power. Accordingly, gauge system 50 may run on line power, such as by plugging the system into an electrical outlet, and/or may run on power from a portable DC power source, such as at least one battery.

Components of gauge system 50 may form a positioning apparatus 112, which may be a discrete unit that can be connected to various tools 54 and/or frames 58, such as via brackets 62. Positioning apparatus 112 may include stop 52, rail 60, drive assembly 68, controller 70, and sensor 104, or any combination thereof. Apparatus 112 further may include one or more brackets 62, additional sensors 104, input/output devices 108, a power supply 110, or any combination thereof. In some embodiments, rail 60, at least a portion of drive linkage 102, and, optionally, stop 52, may be provided in a discrete unit 114, which may be described as a rail module, a measuring bar, a rail unit, a rail assembly, a beam unit, or a bar unit, among others.

Figure 2:
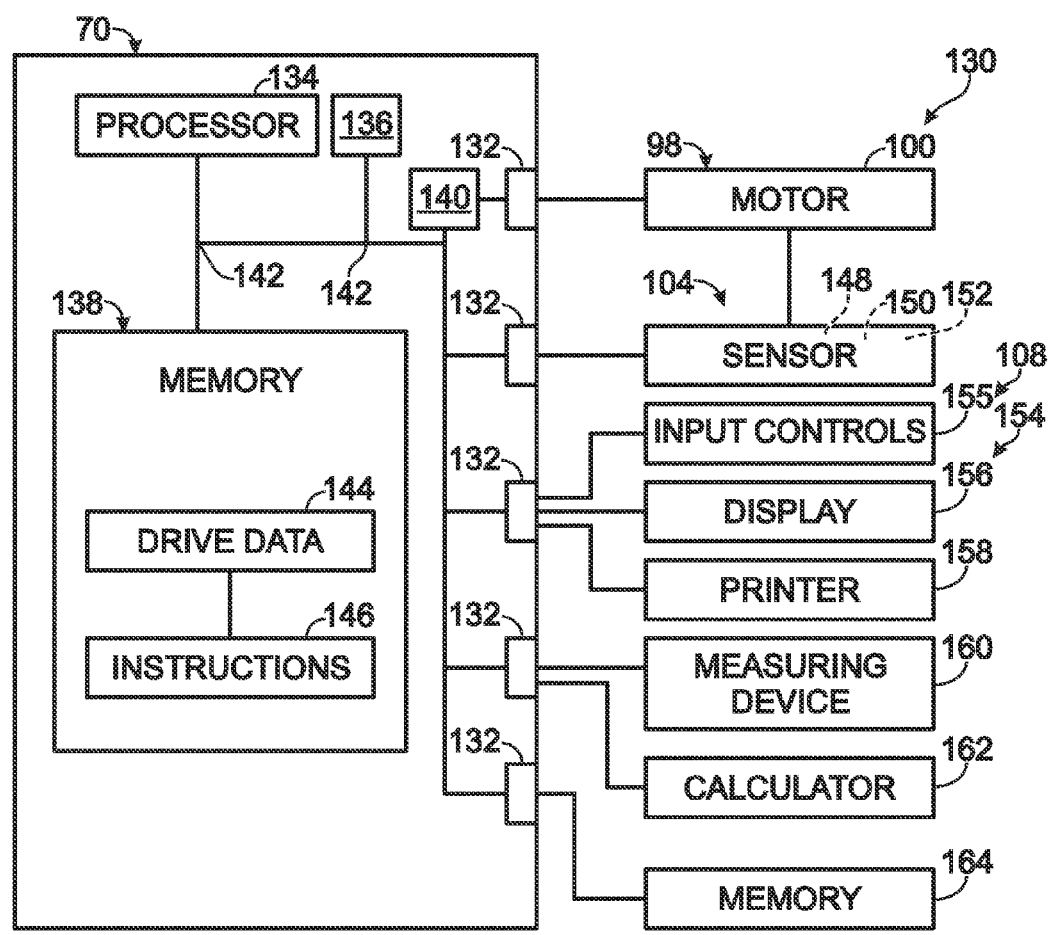
FIG. 2 is a schematic view of selected aspects of the gauge system of FIG. 1, including a controller and peripheral devices that may be placed in communication with the controller, in accordance with aspects of present disclosure.

FIG. 2 shows a schematic view of selected aspects of gauge system 50, particularly controller 70 and associated devices 130 (also termed peripherals or peripheral devices), namely, motor assembly 98, at least one sensor 104, and input/output devices 108, which may be disposed in communication with the controller via one or more ports 132 of the controller using any suitable communication mechanism. For example, any peripheral 130 may be connected and/or connectable to a port 132 by electrical conduction, that is, by a "wired" connection (also termed a hard connection), for example, with a plug, socket, and cable. Alternatively, or in addition, any peripheral 130 may be connected and/or connectable to port 132 by a "wireless" connection, that is, without interconnection by an electrical conductor. Wireless connection may rely on communication by transmission through air of data, which may be encoded by light (electromagnetic waves, e.g., infrared light, radio waves, microwaves, visible light, or the like) or sonic energy, among others. Any suitable wireless implementation, device, and standard may be used, such as to provide short-range, point-to-point communication with controller 70 or longer range communication with the controller over a wireless network.

Controller 70 may be described as a computer or a computing device. The controller may include a processor 134 (which may be described as a microprocessor and/or a digital processor), a clock 136, memory 138, and an amplifier or drive chip 140, among others. Ports 132, clock 136, memory 138, and amplifier 140 may be connected to processor 134 and/or to one another by busses 142. In some embodiments, the controller may be a hand-held device, such as a person digital assistant, a mobile phone, or the like, and may communicate with the drive assembly wirelessly.

Memory 138 may have any suitable structure and may store any suitable information. The memory may be readable/writable, read-only, or a combination thereof. Memory 138 may store drive data 144 and instructions 146, among others. The instructions, which may be described as software, generally operate on the drive data to determine suitable output signals to communicate to motor 100 and other peripherals 130. Drive data 144 may include and/or correspond to one or more fixed and/or dynamic set points or target dimensions, target speed profiles, a predefined range of travel for a carriage/stop, travel endpoint positions, a motion log, at least one scale factor, calibration data, left/right tool position, or any combination thereof, among others. Instructions 146 may include algorithms, such as a feedback algorithm, a scale algorithm, a calibration algorithm, a power throttle algorithm, a miter algorithm, or any combination thereof, among others. Further aspects of drive data 144 and instructions 146 are described elsewhere in the present disclosure, such as in Sections II, III, V, and VI.

The present disclosure also provides a storage medium encoded with a machine readable computer program code, with the code including instructions for causing a controller to implement any of the methods disclosed herein. The storage medium may, for example, be memory 138 of controller 70 and/or peripheral memory.

Amplifier 140 may be configured to amplify a drive signal generated by the controller using drive data 144 and instructions 146 before the drive signal is communicated to motor 100. Accordingly, amplifier 140 may include a digital to analog converter, to convert a digital drive signal to an analog drive signal. The amplifier also or alternatively may increase the amplitude of the drive signal, by applying a transfer function to the drive signal, to increase its voltage, current, or both. Alternatively, or in addition, amplifier 140 may operate by pulse width modulation to send pulses of electrical power to the motor, with the width of each pulse corresponding to the magnitude of a digital drive signal.

Sensor 104 may include one or more sensors, with each sensor measuring any suitable aspect of the positioning apparatus, such as an aspect of motor assembly 98 and/or motor 100, drive linkage 102, stop 52, or controller 70, among others. Exemplary sensors 104 include a position sensor 148 (e.g., a rotary encoder or a linear encoder (e.g., end sensors disposed in/on the rail), among others), a temperature sensor 150, and/or an electrical sensor 152. The temperature sensor may be coupled to the motor assembly and may be configured to measure a temperature of the motor assembly and particularly the motor. The electrical sensor may be disposed in a circuit connecting the controller to the motor and may be configured to measure an electrical parameter of the electrical power supplied to the motor, such as the current, resistance, and/or voltage. The sensed temperature and/or electrical parameter may be communicated to the controller at time intervals to determine whether the amount of electrical power supplied to the motor should be reduced. This approach may be utilized to identify situations where the motor is working too hard and using too much power, to avoid damage to the motor, to avoid power spikes that may cause the controller to require a re-start, and/or to improve the safety of the gauge system. Further aspects of the use of sensor measurements to throttle power supplied to the motor are described elsewhere in the present disclosure, such as in Sections V and VI.

Controller 70 may be connected and/or connectable to any suitable combination of peripherals 130 to form a user interface 154. The user interface may, for example, include input controls 155, a display 156, a printer 158, a measuring device 160, a calculator 162, and peripheral memory 164.

Input controls 155 may include any electronic device or combination of electronic devices configured to permit a user to input data to controller 70. Exemplary input controls may include a keypad, a keyboard, a touch screen, a microphone (for speech recognition), a mouse, a joystick, or the like. Further aspects of user input controls that may be suitable are described elsewhere in the present disclosure, such as in Section III.

Display 156 may include any electronic device or combination of electronic devices configured to present images transiently, that is, without producing a permanent record. Exemplary displays may include liquid crystal display (LCD), light-emitting diode (LED), cathode ray tube (CRT), electroluminescence, field emission, digital light processing, and plasma displays, among others. In exemplary embodiments, the display is an LCD display that displays only one line of characters, such as a maximum of 20 or less characters (numbers, letters, and/or other symbols).

Printer 158 may include any suitable type of printer, such as an inkjet printer, a laser printer, a dot matrix printer, or the like. The printer may be configured to print any suitable data on any suitable print medium. In exemplary embodiments, the printer may be a label printer. The labels printed by the label printer may present information about a processed product, such as its length, its type, a part number, its composition/material, the processing site (e.g., city, company, etc.), the time, the date, the project, or any combination thereof, among others. The labels may be self-adhesive and may be printed on an assembly of a front layer with an adhesive surface and a non-adhesive back layer that covers the adhesive surface. In some examples, the printer may have a wireless connection to the controller and may communicate via infrared or radio wave signals.

Peripheral measuring device 160 may include any peripheral device configured to measure one or more linear and/or nonlinear dimensions, and to encode the measured dimensions as signals for communication to the controller. Measuring device 160 generally is equipped with memory to store data corresponding to at least one or a plurality of measurements. Exemplary measuring devices may include a tape measure (e.g., a digital tape measure), calipers, an optical measuring device (e.g., a laser-based device), any combination thereof, or the like. A user may capture one or a series of measurements that are stored in the device, for example, as a cut list. The device may be used remotely from the positioning apparatus and then may be placed in proximity to the controller to download the measurements through either a wired or wireless connection to the controller, as a batch of measurements or one at a time. Alternatively, the measurements may be sent from the measuring device to the positioner, either one at a time as measured or as a batch, while the user is measuring remotely. Further aspects of peripheral measuring devices are described in U.S. Provisional Patent Application Ser. No. 61/185,553, filed Jun. 9, 2009, which is incorporated herein by reference.

Calculator 162 may include any device configured to perform calculations on data. The calculator may or may not be hand-held and may be powered by one or more batteries or by line power. The data may be inputted by a user via a user interface of the calculator, may be received from the controller (e.g., after input via user interface 154, with or without subsequent data processing by the controller), or may be received from peripheral measuring device 160 via a wired or wireless connection. In some embodiments, calculator 162 may be integral to controller 70 or measuring device 160.

Any suitable calculations may be performed by calculator 162, such as calculations that are common in construction, manufacturing, or the like. Calculator 162 may be described as a construction calculator. Exemplary calculations performed by the calculator may include at least one of or any combination of (1) unit conversion (e.g., yards, feet, and inches to metric and vice versa), (2) area and volume calculations from dimensions, and vice versa, (3) conversion of degree, minute, seconds values to decimal degrees, and vice versa, (4) trigonometric calculations, (5) determination of values for stair parameters, such as the run and rise, tread width, stringer length, incline angle, etc., (6) calculation of roof pitches, (7) board feet calculations, (8) calculation of the layout of studs for a wall, (9) calculation of header dimensions for a given opening, (10) calculation of the layout of drop ceilings for T-bar cutting, (11) calculation of hanger dimensions based on roof pitch to allow for flat ceiling installation, (12) calculation of areas, diameters, and circumference of circles and arcs, (13) calculation of rafter dimensions, including common rafters, regular and irregular hips, valleys, and jacks, (14) calculation of rebar length based on the length of each leg and the bend diameter, and (15) calculation of miter angles for retrofitting an opening that is not square, based on the perimeter lengths of the opening and the diagonal lengths of the opening.

Any dimension resulting from any of the calculations performed by the calculator may be sent to the controller as a set point distance(s) or target dimension, which may be executed by the controller, automatically or after request by a user, to drive stop movement according to the set point distance(s) or target dimension. Alternatively, or in addition, any dimension resulting from any of the calculations performed by a peripheral calculator may be sent to the controller for further calculations by an integral calculator of the controller.

Peripheral memory 164 may include any memory device that is or can be placed in communication with controller 70. The memory device may permit upload to or download from the controller of any suitable data. Exemplary data that may be uploaded include new or revised instructions 146 for the controller, which may confer new or revised functionality to the controller. Other exemplary data may include a list of target dimensions, such as a cut list. Exemplary data that may be downloaded include drive data, such as stored set points or target dimensions, a scale factor, one or more motion logs, etc. Peripheral memory 164 may be provided by any suitable device such as a PDA (person digital assistant), a mobile telephone, a flash drive, or the like. The peripheral memory may communicate with the controller of the gauge system by a wired or wireless connection.

A motion log generally includes any data corresponding to positions of the stop with respect to time. The data may correspond to a current position of the stop, one or more preceding positions of the stop measured at one or more earlier time points, and/or one or more succeeding target positions of the stop after the current position at one or more later time points. Data from the motion log may allow calculations corresponding to an aspect of the motor and/or stop, such as its speed, acceleration, change in acceleration, and/or an error or difference between its current and target positions.

II. EXEMPLARY EMBODIMENT OF A SAW-BASED GAUGE SYSTEM

Figure 3:
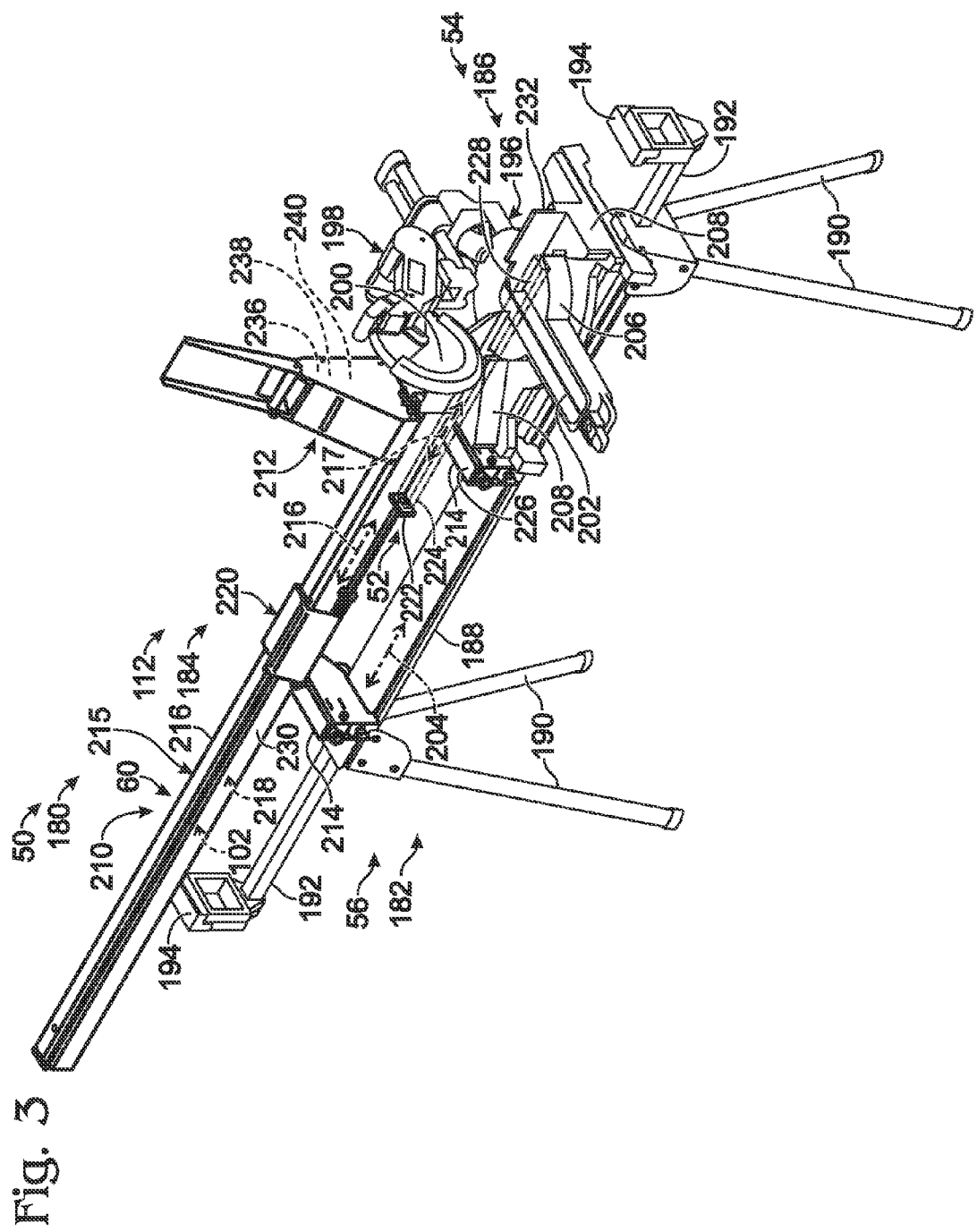
FIG. 3 is a view of an exemplary saw-based embodiment of the gauge system of FIG. 1, in accordance with aspects of the present disclosure.

FIG. 3 shows an exemplary embodiment 180 of gauge system 50 (see FIGS. 1 and 2) including a saw as the processing tool. Any combination of the devices, components, and features of system embodiment 180 (hereinafter, saw system 180) may be combined with any of the devices, components, and features shown and/or described elsewhere in the present disclosure.

Saw system 180 may include a frame 56 in the form of a stand 182, on which is mounted a positioner 184 and a saw machine, namely, a chop saw 186. Positioner 184, which is illustrated using a greater line weight to distinguish it from the stand and chop saw, is an embodiment of positioning apparatus 112; chop saw 186 is an embodiment of tool 54 (see FIG. 1). The embodiments of stand 182 and chop saw 186 shown here are manufactured by DeWalt Industrial Tool Company and thus may be described as a DeWalt® saw stand and a DeWalt® chop saw.

Stand 182 may include a central body or beam 188 connected to legs 190 that support the body in a horizontal position. Extendable supports or arms 192 may be storable in the body to provide workpiece support surfaces 194 at axially adjustable and fixable positions.

The chop saw may include a base 196 and an arm 198 coupled to the base. Arm 198 may support a power-driven circular saw blade 200. Arm 198 may be pivotably and slidably coupled to base 196. Pivotal motion of the arm brings saw blade 200 down to, and up from, a cutting position near base 196, and sliding of the arm moves the saw blade on a cutting path 202 across a workpiece, transverse to a longitudinal axis 204 defined by stand 182. Cutting path 202 may be adjusted from perpendicular to longitudinal axis 204 (a square cut), to an oblique orientation to create a miter cut, by pivoting a central portion 206 of base 196 about a vertical axis. Central portion 206 carries arm 198 and saw blade 200, and may be pivoted with respect to flanking portions 208 of base 196, which are clamped to stand 182. In other cases, saw blade 200 may be pivoted about a horizontal axis.

Positioner 184 may include a rail module or fence module 210, a power module 212 operatively coupled to and supported by the rail module. The power module may be described as a motor box, a drive unit, a power head, a control unit, and/or a drive/control unit. The positioner also may include bracket assemblies 214 that mount the rail module to stand 182. Rail module 210 may be described as a rail assembly or a fence assembly that includes a rail or beam 215, which may form a positioner frame that may be elongate. Beam 215 may be engaged by bracket assemblies 214, which also may be attached to central body 188 of stand 182. Beam 215 may be mounted with a longitudinal axis 216 defined by the beam disposed parallel to a measurement axis 217, which may intersect cutting path 202 to define an origin of the measurement axis. In some embodiments, saw 186 may be pivotable about a pivot axis to orient blade 200 for miter cuts, and the measurement axis may intersect the pivot axis and/or the cutting path at the pivot axis to define the origin. In any event, beam 215 may (or may not) extend parallel to longitudinal axis 204 of stand 182.

Bracket assemblies 214 may fix the relative positions of central body 188 of the stand and beam 215 of positioner 184 over a range of relative longitudinal positions, to permit a user to select how close the rail module is disposed to the saw. For example, the rail module may be positioned farther from the saw in order to cut longer products from pieces of stock.

Rail module 210 may include a drive linkage 102 comprising a belt-and-pulley assembly 218 operatively connected to a carriage assembly 220. Carriage assembly 220 may be coupled slidably to beam 215, to permit the carriage assembly to reciprocate (travel back and forth) parallel to longitudinal axis 216 and measurement axis 217, along a path determined by beam 215. The carriage may carry a stop foot 222 as an embodiment of stop 52 (see FIG. 1), which can be positioned at a range of set point distances from cutting path 202 of saw blade 200.

A workpiece, such as a piece of lumber 224, may be supported and positioned by saw system 180 using contact surfaces of stand 182, positioner 184, and/or saw 186. Piece 224 may, for example, be contacted and supported from underneath by contact of a lower/bottom surface of the piece with at least one bracket surface 226, a base surface or deck 228 of saw 186, a top support surface 194 of at least one extendable arm 192, or any combination thereof, to define the elevation of piece 224. The piece of stock also may, for example, be contacted on a front and/or back side surface using a lateral and/or front surface 230 of beam 215, a fence 232 of saw 186, and/or a fence structure formed by stand 182 and/or one or more bracket assemblies 214. In combination, contact of lumber piece 224 on a bottom surface and a front and/or back side may orient the piece parallel to measurement axis 217. Abutment of stop foot 222 with an end surface of lumber piece 224 positions the piece along measurement axis 217, to define axial placement of the piece of lumber.

Power module 212 may comprise a controller 236, a motor assembly 238, and a rotary encoder 240. Controller 236 may include any of the elements, features, and capabilities disclosed for controller 70 and may be connected or connectable to any of peripherals 130 disclosed for controller 70 (see FIG. 2). Controller 236 may control operation of motor assembly 238 based on position signals from encoder 240 and based on a "fixed" end point and/or dynamic end points calculated from a fixed end point. Motor assembly 238 may be operatively connected to belt-and-pulley assembly 218, to form, collectively, at least a portion of drive assembly 68 (see FIG. 1). Operation of a motor of the motor assembly may drive coupled motion of the belt-and-pulley assembly, carriage 220, and stop foot 222. Controller 236 may use a feedback mechanism to move stop foot 222 according to a target dimension or set point value received from a user.

In the configuration of positioner 184 shown in FIG. 3 for saw system 180, and with respect to a user using the system, the positioner (and particularly stop foot 222) is disposed to the left of the saw, generally along measurement axis 217. Stated differently, the tool is to the right of the positioner. Power module 212 is connected to the rail module near one of the rail module's opposing ends, namely, the opposing end closest to the saw, to dispose the power module and the saw close to one another, which permits the user to operate both the power module and the saw conveniently, with minimal walking back and forth. However, the user may prefer to set up saw system 180 with the positioner on the other side of the saw, namely, to the right of the saw with respect to the user, such that the tool is to the left of the positioner.

III. EXEMPLARY EMBODIMENT OF A POSITIONING APPARATUS

Figure 4:
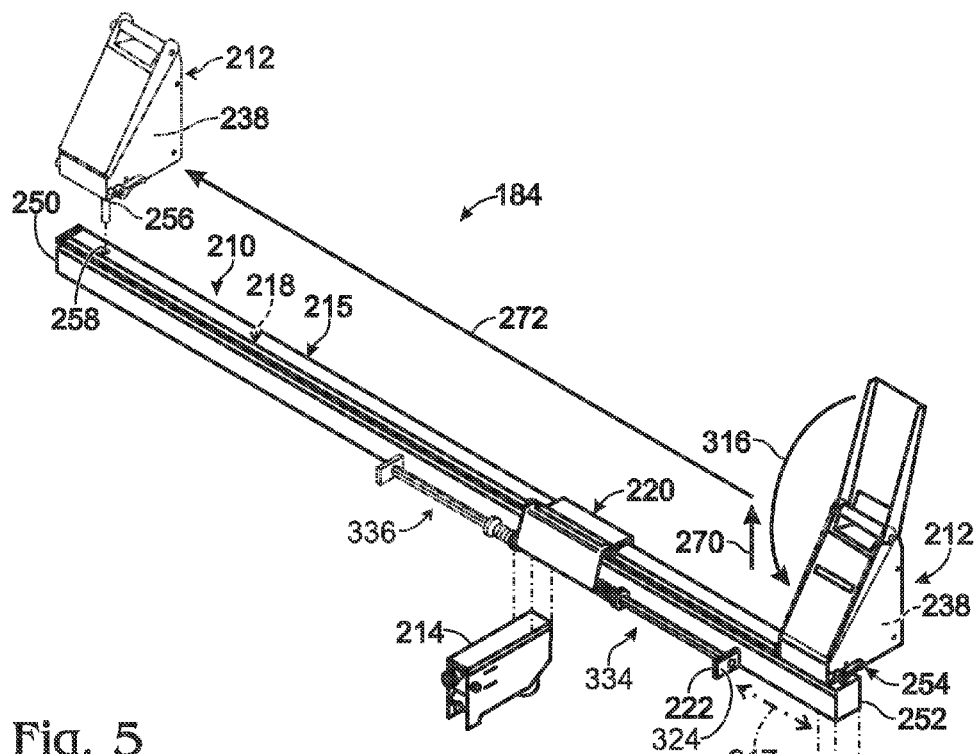
FIG. 4 is a view of a positioner, also termed a gauge or measuring apparatus, from the system of FIG. 3.
Figure 5:
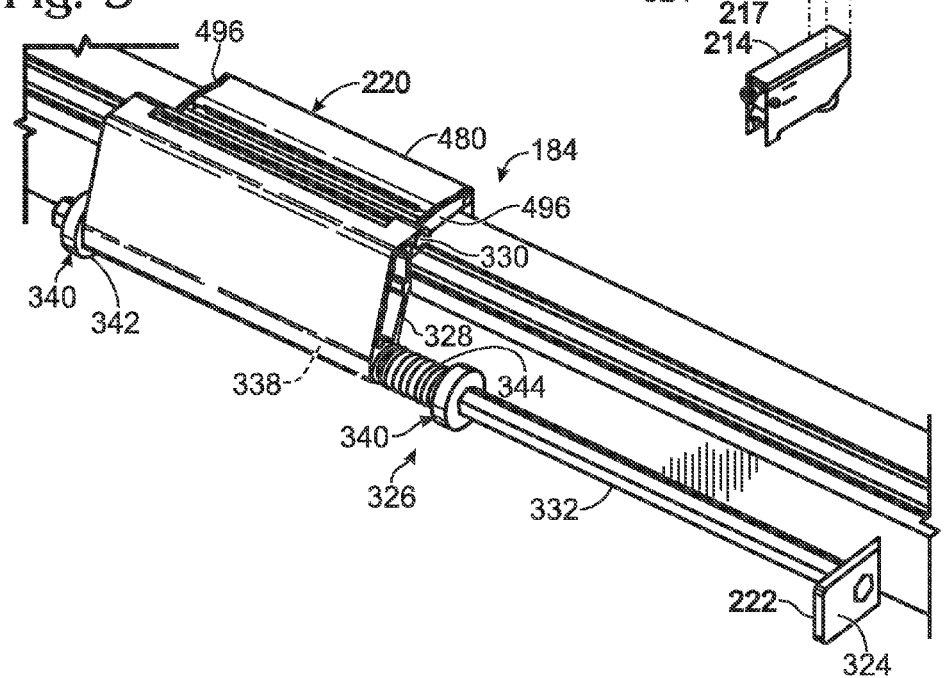
FIG. 5 is a fragmentary view of a rail module of the positioner of FIG. 4, taken around a carriage and stop of the rail module.
Figure 6:
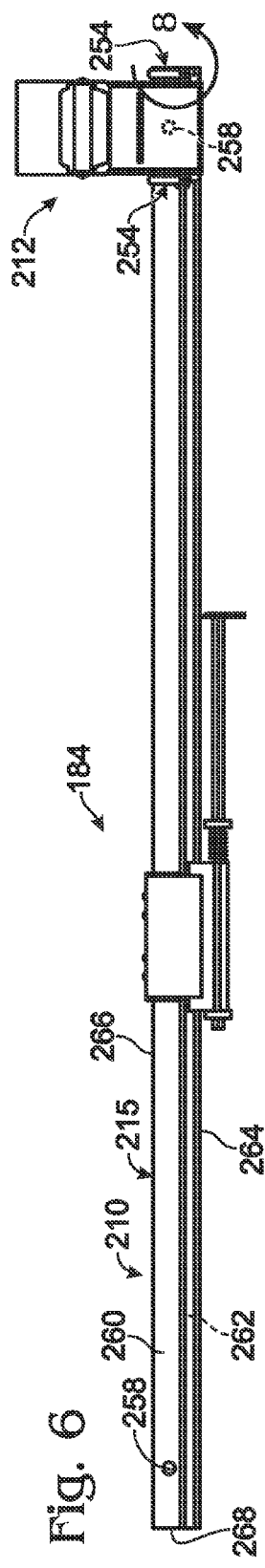
FIG. 6 is a plan view of the positioner of FIG. 4, taken in the absence of the brackets.
Figure 7:
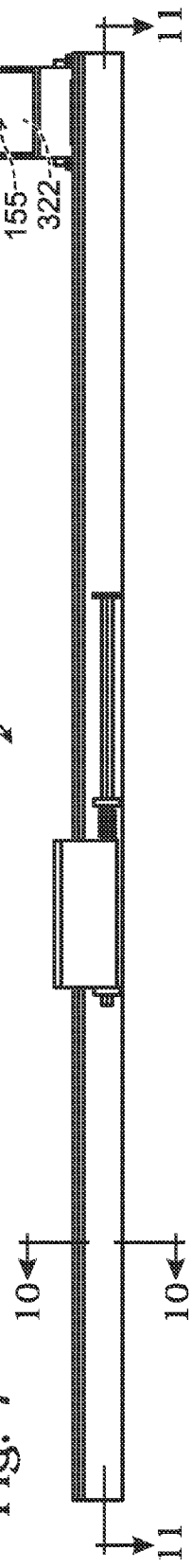
FIG. 7 is a front elevation view of the positioner of FIG. 4, taken in the absence of the brackets.

FIG. 4 shows distinct configurations of positioner 184 that permit the positioner to function on either side of a tool, such as saw 186 (see FIG. 3); FIG. 5 shows a longitudinal portion of the positioner taken around carriage 220 and stop foot 222; and FIGS. 6 and 7 show respective top and front views of the positioner. In FIG. 4, the positioner is illustrated in the absence of stand 182 and saw 186, and with bracket assemblies 214 disconnected from rail module 210; the bracket assemblies are not shown in FIGS. 5-7.

Power module 212 may be operatively coupled to rail module 210 and/or belt-and-pulley assembly 218 near either opposing end 250, 252 of beam 215 to drive movement of stop foot 222 to target positions along measurement axis 217. Positioner 184 may be reconfigured from a rightward tool arrangement (e.g., as in FIG. 3) to a leftward tool arrangement by (a) disconnecting power module 212 from its position near right end 252 and reconnecting the power module near left end 250 (as indicated with the power module in phantom outline in FIG. 4), (b) changing the orientation of stop foot 222 (e.g., to the orientation shown in phantom outline in FIG. 4), (c) communicating a left/right change in tool position to the controller, or (d) any combination thereof. In other words, the power module may function properly near either end of rail module 210, whether a tool is to the right or the left (or both), but a user may prefer to have the power module positioned closer to the tool.

Power module 212 may be connected to rail module 210 by one or more fasteners and/or a mated coupling of the power module to the rail module. The mated coupling may transmit torque from a motor of the power module to a drive linkage of the rail module. The fasteners may restrict the ability of the power module to move in relation to the rail module, such as turning and/or bouncing, among others, particularly while the motor is operating. In any event, power module 212 may be disconnected from rail module 210 by releasing the fasteners and separating the power module from the rail module.

Power module 212 may be connected to the rail module by one or at least a pair of quick-release fasteners 254 disposed adjacent opposing sides of the power module, and also may connected by a mated coupling of the power module's motor assembly 238 to belt-and-pulley assembly 218 of the rail module.

More particularly, a rotatable member of the motor assembly (e.g., a shaft, gear, or pulley) may be engaged by an at least partially and/or at least generally complementary rotatable member (e.g., a gear, pulley, or shaft) of the rail module's drive linkage (i.e., belt-and-pulley assembly 218), to provide a mated relationship of the motor assembly with the drive linkage. For example, motor assembly 238 may include a shaft 256 structured to transmit torque to the drive linkage of the rail module, without substantial slippage, generally in a meshed configuration. Accordingly, the shaft may include teeth and/or may be described as a splined shaft, among others. The shaft may be received in mating relation with an opening 258 (also termed a socket) defined by rail module 210 near one or both opposing ends 250, 252 (see FIGS. 4 and 6). The opposing ends may have similar structure and rail module may have at least substantial mirror image symmetry with respect to its central transverse plane. In any event, openings 258 may be defined near both opposing ends of the rail module, to permit mating with the power module near the left and right ends of the rail module. Each opening 258 may extend to an exterior surface of the rail module, such that the opening is accessible for mating with shaft 256. Furthermore, each opening 258 may communicate with any suitable surface of rail module 210 and/or beam 215, such as a top surface 260 (as shown here), a bottom surface 262, a front surface 264, a back surface 266, or an end surface 268, among others (see FIG. 6).

Power module 212 may be disconnected from the rail module by releasing fasteners 254, and then withdrawing shaft 256 from opening 258 by lifting power module 212 vertically, indicated schematically by a motion arrow at 270 in FIG. 4. Power module 212 then may be moved longitudinally along the rail module, indicated schematically by a motion arrow at 272, and then re-mated with the rail module near opposing end 250 and re-secured with fasteners 254. In other cases, power module 212 may be disconnected from the rail module for transport and/or storage, and then later reconnected (or connected for the first time) to the rail module adjacent either end of the rail module, according to the user's left/right preference or need. In other mating configurations, separation and mating of the rail module and power module may be performed in a horizontal direction (e.g., mating at the back of the rail module) or in the vertical direction from below the rail module.

FIGS. 8 and 9 show plan and sectional views of fastener 254 securing power module 212 to beam 215 of rail module 210. Power module 212 may be equipped with opposing forks 280 each defining a notch 282 for receiving a fastener 254. Notch 282 may be defined between a pair of fingers 284 of fork 280. A shaft 286 of fastener 254 may be received between the fingers. The frame may define a channel 288 (e.g., a generally T-shaped channel) in a top surface of beam 215, with the channel sized to receive a head 290 of fastener 254 (see FIG. 9). An opposing end of shaft 286 may be received in threaded engagement with a nut 292 disposed over a washer 294 and carrying a pivotably coupled cam lever 296. The lever may have an eccentrically mounted head 298. The head may act as a cam that adjustably bears against washer 294 when lever 296 is pivoted between open and closed positions, to release the fork from, and to secure the fork to beam 215 using fastener 254.

An elastomeric bumper 300 may project from any suitable surface of the power module. For example, in the depicted embodiment, bumpers 300 are attached to the power module on opposing left and right sides. Bumpers 300 may protect the power module from damage and/or may keep the power module spaced from an adjacent tool or frame structure.

Power module 212 may be equipped with features that facilitate handling or protection of the power module (see FIG. 7). For example, the power module may have a handle 310 configured to be grasped by hand, to facilitate lifting and/or carrying the power module with one hand. In some embodiments, the power module may weigh less than about 25, 20, or 10 pounds (i.e., less than about 11.25, 9, or 4.5 kilograms), which may render the power module readily portable, to permit positioner disassembly and storage or transportation to different job sites, among others. Handle 310 may have any suitable position on the power module, such as disposed at or near the top, the back, a side, or a bottom of the power module. The power module also or alternatively may include a cover 312 connected to a body 314 of the power module, with the cover having an open position and a closed position. Cover 312 may have a hinged connection to body 314, such that the cover pivots, indicated at 316 (see FIG. 4) between open and closed positions. In some embodiments, the hinged connection may define a pivot axis 318 that extends through the handle, optionally with the central axis of the handle and the pivot axis being coaxial (see FIG. 7). The closed position of the cover may place the cover in a substantially or completely overlapping relationship with a display 320 and/or input controls 155, such as a keypad 322, of the power module. The cover thus may provide protection to potentially fragile components during transport and storage of the power module.

Stop foot 222 also may be reconfigured when the positioner is being re-arranged for use with a tool near the other end of the rail module (see FIGS. 4 and 5). The stop foot may be re-oriented, generally by 180 degrees, such that a datum surface 324 of the stop faces generally toward the correct left/right side on which the tool is or will be disposed.

Stop foot 222 may be included in a stop assembly 326 connected to carriage 220 (see FIG. 5). The stop assembly also may comprise a wing member 328 pivotably connected to carriage 220 at hinge joint 330, a stop bar 332, or any combination thereof, among others. Wing member 328 may support and be connected to stop bar 332, which, in turn, carries stop foot 222. Stop bar 332 may be connected to wing member 328 in either of the two opposing orientations shown in FIG. 4 at 334 (in solid outline) and 336 (in phantom outline), according to the left/right side on which the tool is disposed. In alternative embodiments, the stop assembly may include a pair of stop feet with respective datum surfaces 324 facing toward left and right tool positions, such that the stop assembly does not need to be reconfigured if the tool position is changed from left to right (or vice versa) and/or if the positioner is used with tools disposed concurrently on both left and right sides.

Stop foot 222 may be adjustably located with respect to carriage 220 by adjustment of the longitudinal, angular, and/or directional disposition of stop bar 332 (see FIG. 5). The stop bar may be received in a passage 338 defined by wing member 328. Stop bar 332 and passage 338 may have complementary cross-sectional shapes, for example, both may be hexagonal. Stop bar 332 may be maintained in the passage at a selected disposition using fasteners 340 engaged with stop bar 332 at positions that opposingly flank the wing member. Exemplary fasteners 340 may be ring clamps 342 that can be loosened, to permit the stop bar to slide, and then fixed in position. Accordingly, stop foot 222 may be placed at a selectable distance from the carriage, according to the user's preference or need, and then fixed. In some embodiments, a spring 344 may be disposed between fastener 340 and wing member 328. The spring may absorb shocks to the stop foot, to reduce damage to other components of the rail module. The tension of the spring may be adjusted by changing the spacing between flanking fastener 340 and wing member 328 along stop bar 332.

FIG. 10 shows a sectional view of selected portions of rail module 210, particularly rail or beam 215, and a belt 360 of belt-and-pulley assembly 218.

Rail module 210 may provide a beam 215 that is fixed with respect to movable portions of the rail module, such as the carriage, the stop foot, and at least most of the belt-and-pulley assembly. Beam 215 may an elongate frame member, which may or may not be continuous and/or monolithic. The beam may be formed of any suitable material, such as metal, polymer, or composite, among others. In exemplary embodiments, the beam may be formed of aluminum and/or may be an extrusion with a substantially constant cross-sectional shape (i.e., except where the beam has been modified after its formation (e.g., to create apertures in walls thereof). The beam may have a top surface 364, a bottom surface 366, a front surface 368, and a back surface 370 provided by corresponding respective outer walls 372-378. The beam may be hollow. The beam also may include one or more inner walls (e.g., walls 380-384) disposed generally inward of the outer walls. Each inner wall may be vertical, horizontal, oblique, or a combination thereof. Each inner wall may be at least generally parallel to an outer wall and may extend from one outer wall to another outer wall (e.g., inner wall 380), from an outer wall to an inner wall, and/or from an inner wall to another inner wall (e.g., inner wall 382). The walls of the beam may define one or more interior compartments 386, 388 that are at least substantially enclosed on four sides (e.g., the top, bottom, front, and back sides). The beam also or alternatively may form one or a plurality of exterior channels (e.g., channels 288, 390-398). The beam further may include one or a plurality of exterior ridges, such as opposing ridges 404, 406 above exterior channels 390, 392, respectively. The beam even further may include a dovetail projection 408, which may be described as a wedge, and which, for example, may be formed near the bottom of the beam (and/or the top, front, or back of the beam) to create a wedge base. The dovetail projection may be fan-shaped and may flare away from a central vertical plane defined by the beam as the projection extends toward the bottom of the beam. The dovetail projection may facilitate connecting the rail to other support structures, such as stands, tables, workbenches, and the like.

Belt 360 may include inner and outer belt segments 410, 412, which may extend longitudinally in the beam and at least substantially parallel to one another. The inner belt segment may be disposed in inner compartment 388 and the outer belt compartment may be disposed in one or more outer compartments formed by one or more exterior channels, such as exterior channel 398 or a sub-channel thereof. The outer belt segment may have opposing inner and outer surfaces 414, 416. The outer belt segment may be substantially exposed in the rail module. In other words, the outer belt segment may form a portion of the exterior surface of rail module 210, such as a portion of the back surface of the rail module. Accordingly, beam 215 may cover and/or outwardly overlap substantially less than all, or less than about one-half, of outer surface 416 of outer belt segment 412 by area, such that the outer belt segment is exposed to form an exterior surface region of rail assembly 210. Alternatively, or in addition, a substantial portion of the width of the outer belt segment (measured vertically in the present example), such as at least about one half of the width, may be exposed to form an exterior surface region of rail module 210. The accessibility of outer belt segment 412 from outside of the rail assembly may offer substantial advantages over an enclosed belt found in prior art positioners, such as easier installation, adjustment, and service of the belt. In any event, the belt segments may be arranged along an orthogonal axis 418 with respect to one another. Orthogonal axis 418 may be perpendicular to the longitudinal axis of the rail module and may be vertical or horizontal.

Figure 11:
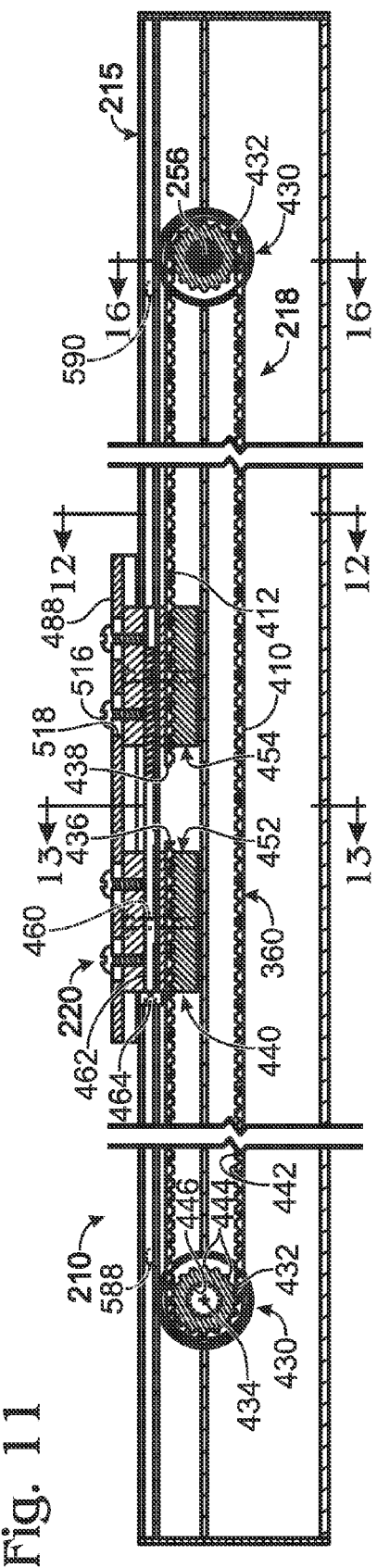
FIG. 11 is a fragmentary, longitudinal sectional view of selected portions of the positioner of FIG. 4, taken generally along line 11-11 of FIG. 7.

FIG. 11 shows a longitudinal sectional view of rail assembly 210, taken as indicated in FIG. 7. Belt-and-pulley assembly 218 may include belt 360 and a pair of pulley assemblies 430 engaged with and operatively coupled to the belt. Each pulley assembly 430 may include at least one pulley 432 pivotably coupled to beam 215, to provide rotation of each pulley about a respective pivot axis 434. Each pivot axis 434 may be vertical, as shown here, or horizontal, among others.

Opposing ends 436, 438 of belt 360 may be connected to each other by a belt linkage or connector 440 to form a closed loop. The belt linkage may (or may not) be considered part of carriage 220. When connected in the closed loop, the belt extends around each pulley, and extends between the pulleys to form inner and outer belt segments 410, 412, which also or alternatively may be described as longitudinal belt segments. Longitudinal belt segment 412 may include belt ends 436, 438.

Rotation of pulleys 432 may be coupled by the belt. Conversely, translational motion of belt segments 436, 438 along the longitudinal axis of the rail assembly and/or beam may be coupled to rotation of the pulleys.

Belt 360 and pulleys 432 may have at least generally complementary structures to resist slippage of the belt with respect to each pulley. For example, the belt may have teeth 442 formed on the inner surface of the belt, and pulleys 432 may have complementary outer teeth 444 formed on an outer surface of each pulley. Each pulley 432 also may define a channel 446 centered on pivot axis 434 and configured to receive shaft 256 of power module 212 (see leftward and rightward pulleys 432 in FIG. 11; also see FIGS. 4, 16, and 26). Channel 446 may be described as a fluted channel and/or may include inner teeth formed in the channel, to provide meshed engagement with corresponding ridges formed on shaft 256.

Figure 13:
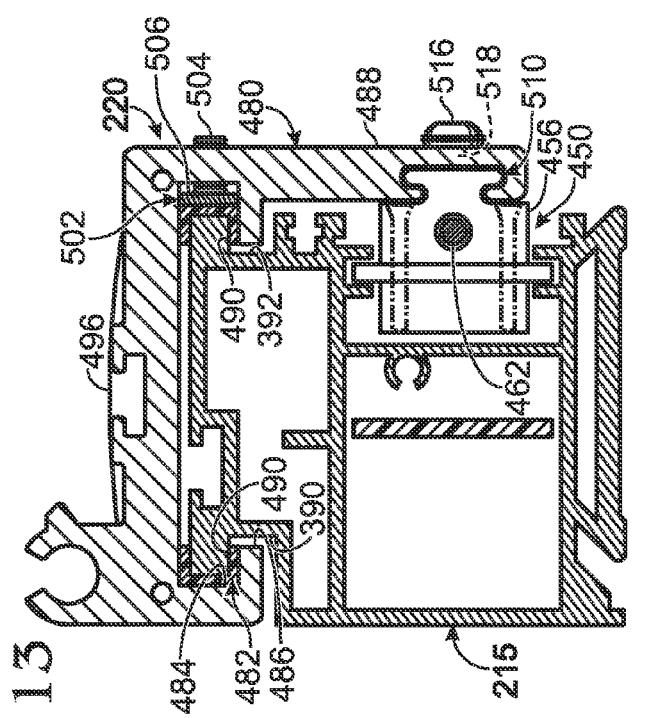
FIG. 13 is a cross-sectional view of the positioner of FIG. 4, taken generally along line 13-13 of FIG. 11, with selected components not shown to simplify the presentation.
Figure 12:
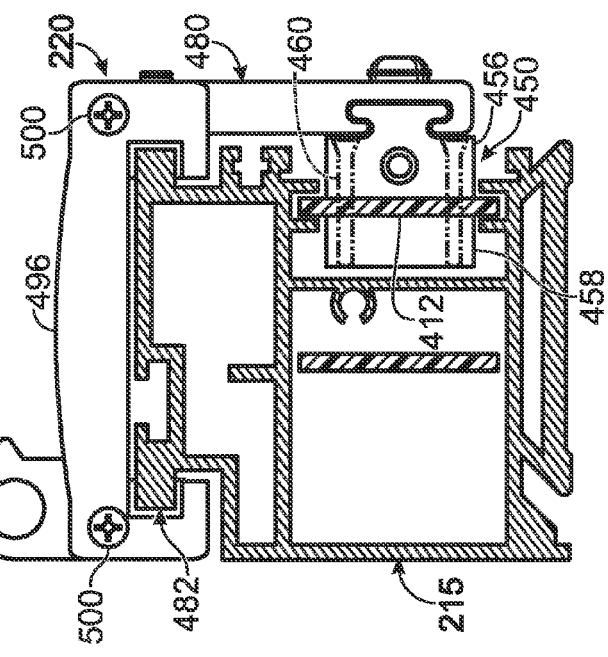
FIG. 12 is a cross-sectional view of the positioner of FIG. 4, taken generally along line 12-12 of FIG. 11, with selected components not shown to simplify the presentation.

FIGS. 11-13 show further aspects of belt linkage 440. The belt linkage may comprise a pair of belt connectors 450, such as clamps 452, 454, that attach to the belt near respective belt ends 436, 438. Each clamp may include an outer clamp piece 456 and an inner clamp piece 458 that sandwich a section of outer belt segment 412 between the clamp pieces (see FIGS. 11 and 12). One or more fasteners 460 may extend through outer clamp piece 456 for threaded engagement with inner clamp piece 458, to connect the outer and inner clamp pieces to one another and, optionally, to apply a compressive force to the flanked section of the belt as the fasteners are tightened.

Belt connectors 450 may be interconnected with one another by at least one spanning member 462, also termed a spacer, that extends from one of the connectors to the other connector. The axial position of the spanning member may be changed with respect to one or both of the connectors to adjust the spacing between the connectors, and thus the tension of belt 360. For example, the spanning member may be a screw (which may be described as a threaded rod) that extends through a hole defined by one of clamps 452, 454 and into threaded engagement with another hole defined by the other of the clamps. The screw may be turned using a driver engaged with a head 464 of the screw (see FIG. 11), to move the clamps closer or farther from one another, which respectively increases or decreases the tension of belt 360.

Belt tension adjustment near the ends of the belt, as disclosed above, may have substantial advantages. Prior art positioners generally adjust belt tension by changing the spacing between pulleys. Accordingly, at least one of the pulleys cannot be mounted at a fixed axial position in the rail module. By contrast, the belt adjustment mechanism disclosed above permits each pulley to be mounted using a simpler design at a fixed axial position along the rail assembly.

Carriage 220 may incorporate a slider 480 of one or more discrete pieces (see FIGS. 5, 12, and 13). The slider may be structured to slide back and forth along beam 215. The slider may be disposed externally (or internally) with respect to beam 215. For example, the slider may be disposed outside (or inside), or at least mostly outside (or inside), the outer walls of the beam. The slider may be in slidable contact with, and/or supported by contact with, an exterior surface or an interior surface (or both) of the beam.

Slider 480 may be configured to slide along beam 215. The slider and the beam may form complementary structures. The complementary structures may be shaped to permit the slider to be received on (and/or in) the beam. The slider may be received by motion of the slider parallel to the longitudinal axis of the beam, such as by introducing the slider onto and/or into beam 215 from an end thereof, to mate the slider with the beam. The complementary structures may restrict lateral uncoupling of the slider from the beam, that is, uncoupling by motion of the slider orthogonal to the longitudinal axis of beam 215. Accordingly, beam 215 may provide a box way for the slider.

Beam 215 may form a track 482 along which slider 480 slides (see FIG. 12). The track may include one or more longitudinal channels and/or ridges formed on or in the frame. Slider 480 thus may form one or more ridges and/or channels that are complementary to the track. For example, slider 480 may define a channel 484 that receives at least a portion of track 482 (see FIG. 13). Each of track 482 and channel 484 may be at least generally T-shaped. Hook regions 486 of slider 480 may be received in opposing channels 390, 392 of beam 215 (see FIG. 13).

Slider 480 may include a body 488 and one or more low-friction elements or slides 490 (also termed slide elements). In the present illustration, slides 490 are generally U-shaped and are received on opposing ridges 404, 406 of track 482, such that body 488 is supported on the slides (see FIGS. 10 and 13). Slides 490 may be disposed between body 488 and beam 215 at one or more spaced positions along a vertical axis and/or along a horizontal transverse axis, to space the body from the beam, and to reduce friction that would occur if body 488 were in contact with beam 215. Slides 490 may provide the only contact between slider 480 and beam 215. The slides 490 may be formed of a low-friction material, such as a low-friction polymer. In some embodiments, body 488 and beam 215 both may be formed of metal. In some embodiments, beam 215 may be formed of or may include a low-friction material such that slide elements 490 may be omitted from slider 480.

Slider 480 also may include one or more retainers or caps 496 to restrict longitudinal motion of slide elements 490 with respect to body 488 (see FIGS. 5, 12, and 13). In exemplary embodiments, the retainers are structured as plates disposed at opposing ends of body 488 and secured to the body with fasteners 500 (see FIG. 12).

Slider 480 further may be equipped with one or more slider adjustment mechanisms 502 to adjust the fit of the slider with respect to track 482 (see FIG. 13). Exemplary positions of mechanism 502 along the slider are illustrated in FIG. 15. Each mechanism 502 may utilize a set screw 504 and, optionally, a pressure diffuser or gib, such as a plate 506 (see FIG. 13). Set screw 504 may be threadably received in slider body 488 and may bear against a slide element 490 and/or plate 506, which may deform the slide element. The set screw may be turned by engagement of its proximal end/head with a driver, to increase or decrease how tightly slide element 490 bears against the beam. This adjustment may be used to reduce the amount of play, such as to reduce lateral play of the slider on beam 215.

Slider 480 may be attached to belt linkage 440 at slider body 488 (see FIGS. 11 and 13-15). Body 488 and one or more of belt connectors 450 may form complementary mating structures, indicated at 510 in FIG. 13. For example, body 488 may define a cavity (or protuberance) shaped to receive a protuberance (or cavity) formed on (or in) outer clamp piece 456. In any event, the complementary mating structures may be configured to permit one or both connectors 450 to slide longitudinally with respect to slider body 488, while the slider body remains mated to the connectors. Furthermore, slider body 488 may be attached to connectors 450 using one or more threaded fasteners 516 extending through slots 518 defined by slider body 488, and into threaded engagement with the connectors (e.g., with outer clamp piece 456 of each clamp)(see FIGS. 11 and 15). The slots may allow fasteners 516 to be received in threaded engagement with connectors 450 over a range of separations of connectors 450 produced by adjustment of the belt linkage.

FIGS. 16 and 17 show respective sectional and exploded views taken near the end of rail module 210. Pulley assembly 430 may include pulley 432 and one or more bearings 530 that facilitate pivotal motion of pulley 432 with respect to beam 215. Each bearing may be described as a rolling-element bearing, such as a ball bearing or a roller bearing, among others.

Pulley 432 may comprise a midsection 532 flanked opposingly parallel to pivot axis 434 by end sections 534, 536 (see FIG. 17). Midsection 532 may be wider than one or both of the end sections, which may have the same or distinct diameters. Midsection 532 may include outer teeth 444. Inner teeth 537 or channels for engagement with the motor assembly may be disposed in any suitable sections of channel 446 of pulley 432 (see FIG. 16).

Bearings 530 may be received on the pulley, and particularly on respective end sections 534, 536, such that access to channel 446 along the pulley pivot axis, from at least one of the opposing ends of the channel, is not obstructed. Accordingly, each bearing may define a central opening 538 that is sized in correspondence with its respective end section 534, 536. Each bearing may include an inner member 540 and an outer member 542 (e.g., an inner ring and an outer ring, among others) connected by rolling elements 544, such as balls or cylinders. Each inner member 540 may be in contact with pulley 432 and each outer member 542 with beam 215. Accordingly, rolling elements 544 enable pulley 432 (and inner member 540) to spin freely about pivot axis 434 relative to a stationary beam 215 (and outer member 542).

Pulley assembly 430 may be received in a cavity 546 formed by beam 215, and particularly by outer and/or inner walls thereof. Accordingly, the pulley assembly may be mounted in the beam, with the assembly having a fixed pivot axis defined by cavity 546. Cavity 546 may be sized and/or shaped in correspondence with the respective size and shape of the pulley assembly. The cavity may be at least substantially coaxial with the pulley assembly, such that a central axis 548 defined by the cavity is coincident with pivot axis 434 of pulley 432.

The cavity may be formed in part by apertures 550-558 formed in outer and/or inner walls of the beam (compare FIG. 10 with FIGS. 16 and 17). Each aperture may be circular or noncircular, and the apertures may have the same or different widths/diameters relative to one another. In exemplary embodiments, apertures 550-558 are formed by a drill, and form a stepped cavity. A smaller aperture 550 (see FIG. 16), which corresponds in size to end section 534 of the pulley, may be formed in top outer wall 372 (see FIG. 10). Also, larger apertures 552-558 (see FIGS. 16 and 17) may be formed at least partially in inner walls 380, 382, 384 and bottom outer wall 374 (see FIG. 10).

Beam 215 may restrict motion of the pulley assembly received in the beam. In particular, translational motion of the pulley assembly perpendicular to pivot axis 434 and in one (or both) of the opposing directions parallel to pivot axis 434 may be restricted by contact with the walls of the beam at the perimeter of the cavity. Translational motion of the pulley assembly in the other opposing direction parallel to pivot axis 434 may be restricted by a retainer 560, such as a C-clip 562 received in cavity 546 and engaged with a wall of the beam (e.g., bottom outer wall 374, in a groove formed therein).

Beam 215 may include a side cover 580 and an end cap 582 disposed at each opposing end region of the beam (see FIGS. 14, 16, and 17). Each cap/cover may be a plate. Also, side cover 580 and end cap 582 may be discrete pieces or may be connected integrally (as shown here).

The side covers, collectively, may extend along only a fraction of the length of beam 215. Side covers 580 that are short may be suitable to, for example, avoid interfering with travel of carriage 220. Accordingly, each side cover may extend to a position adjacent belt 360 near pulley assembly 430, such as near one of the opposing ends of outer belt segment 412. This location of the side cover may improve safety by restricting access to the belt where it extends away from outer belt segment 412 toward internal compartment 388 of beam 215. (Compare opposing ends of rail module 210 in FIG. 14, where the side cover is installed on only one end region.) In some embodiments, the side covers may act as travel barriers, to define a range of travel for the stop (see below) and/or to act as a back-up barrier to reduce damage to the belt if one or more of the usual travel barriers is missing (see below). Each side cover 580 may be received with its edges disposed in an exterior channel of the beam.

End cap 582 may at least substantially cover an end of beam 215, and thus the end caps collectively, in combination with the beam, may enclose interior compartments 386, 388 on six sides (also see FIG. 10). The end cap (and, optionally, the side cover if connected integrally) may be secured with a fastener 584 received in a passage formed by inner wall 382 of beam 215 (see FIGS. 10 and 17).

FIGS. 11 and 14-17 show travel barriers 588, 590 that restrict travel of carriage 220 in respective opposing longitudinal travel directions. Each barrier may be configured to limit travel of the carriage by physical contact of the barrier with the carriage. In other words, each barrier may be disposed in a travel path of a portion of the carriage, to block carriage motion parallel to the measurement axis. Each barrier may be rigid or flexible. A rigid travel barrier, such as a barrier formed of metal, may be desirable in some cases to create a "hard stop" that more accurately defines the site at which carriage travel is blocked. A flexible travel barrier, such as a barrier formed of an elastomer, may be desirable in some cases to create a "soft stop" that is quieter and less likely to damage the carriage.

Each travel barrier may have any suitable structure and any suitable position with respect to the travel path of the carriage. For example, in the present illustration, each travel barrier is a fastener, such as a screw, disposed in threaded engagement with beam 215 via outer wall 378. The screw may have a head that occupies the travel path and that contacts carriage 220 to block carriage motion. For example, the head of the screw may be disposed in one of the exterior channels formed in beam 215, such as channel 392 or 394, among others (see FIG. 10). In some embodiments, the fastener may attach another contact structure, such as an elastomeric bumper to the beam. In any event, the travel barrier may block carriage travel by, for example, contact with slider body 488 and/or retainer 496 of the carriage, among others.

The travel barriers may define a range of linear travel of carriage 220 (and thus stop foot 222 and/or the stop). The range of travel is the distance a point on the carriage/stop travels when the carriage moves from blocked travel at one end of the travel path to blocked travel at the other end of the travel path. The range of travel generally corresponds to the distance between the travel barriers measured parallel to the path of travel, minus the length of the carriage, measured in the same direction, between respective contact sites on carriage 220 for travel barriers 588, 590. The range of travel may be predefined precisely during manufacture of the positioner. For example, the travel barriers may be attached to the beam with a precise spacing, such as by using a jig, to provide a standard range of travel. Alternatively, or in addition, the spacing of the travel barriers may be measured during manufacture, after their placement, using a measuring device. The range of travel may be selected to correspond to an integer multiple of a linear measurement unit, such 8, 10, 12, 15, or 20 feet, or 3, 4, 5, or 6 meters, among others.

Mitered ends of workpieces may be generated in various construction activities, such as by finish carpenters as casings for windows and doors. Baseboards also may be mitered in low end construction. The saw systems disclosed herein may provide compensation for miter cuts. For example, some finish carpenters like to have shear cuts when mitering, which means the measured edge (the inside dimension) may be spaced from the longitudinal fence. Further aspects of miter compensation are disclosed elsewhere herein, such as in Section VI (Examples 2-4), among others.

FIGS. 18 and 19 show fragmentary, plan views of positioner 184 in contact with and defining the positions along measurement axis 217 of respective mitered and square-cut workpieces 620, 622. Positioner 184 may be structured to dispose respective mitered and square ends 624, 626 of workpieces 620, 622 at distinct distances from the cutting path of a saw and from an end 628 of beam 215, for the same position of stop foot 222. For example, an outer corner 630 (and, optionally, an inner corner 632) of mitered end 624 may be offset in a direction parallel to measurement axis 217 by an offset distance 634 from square end 626.

Workpiece ends 624, 626 also or alternatively may be described as oblique and orthogonal workpiece surfaces, respectively. Workpiece surfaces described as orthogonal or oblique define planes that are orthogonal and oblique with respect to a characteristic workpiece axis (e.g., a longitudinal axis, or either of the characteristic transverse axes). Furthermore, an oblique workpiece surface may define an oblique plane that is related to an orthogonal plane by rotation about a characteristic transverse axis of a workpiece.

Stop foot 222 may include oblique (miter) stop surface 636 and orthogonal (square) stop surface 638 (see FIG. 18) for respective engagement of mitered end 624 and square end 626 of workpieces 620, 622 (see FIG. 19). Each stop surface 636, 638 may be substantially planar or nonplanar. Miter stop surface 636 may define an oblique plane oriented at any suitable angle with respect to orthogonal stop surface 638, such as 45 degrees (to accommodate the most common miter angle), or may be curved to accommodate a range of miter angles (see below), among others. Square stop surface 638 at least generally faces end 628 of beam 215 and tool 54. Miter stop surface 636 may be disposed farther from beam end 628 than square stop surface 638. Also, miter stop surface 636 may be disposed adjacent square stop surface 638, such as toward beam 215 from square stop surface 636. Alternatively, miter stop surface 636 may be formed in square stop surface 638, which may separate square stop surface 638 into spaced stop regions, which may opposingly flank miter stop surface 636 (see below).

Stop foot 222 alone, or in combination with beam 215, may form respective receiver regions 640, 642. Receiver region 640 may be shaped to receive an acute corner (a mitered tip) of the mitered workpiece, and receiver region 642 may be shaped to receive a right angle corner of the square workpiece. Each receiver region may engage both converging surfaces of the corner, which may define the position of each workpiece in a horizontal plane. In any event, when disposed in receiver region 640, the mitered tip may be disposed between stop foot 222 and beam 215, such that converging surfaces of the tip are contacted by the stop foot and the frame, respectively. In this position, the tip may be trapped in receiver region 640 to restrict lateral motion of the tip (horizontally, orthogonal to measurement axis 217). Stop foot 222 may be disposed in contact with beam 215 or may be spaced from the beam by any suitable distance.

FIG. 20 shows a fragmentary view of another embodiment of positioner 184 with another exemplary stop foot 660 for engagement of square and mitered ends of workpieces. Stop foot 660 may be spaced from beam 215, to form a receiver region 662 collectively with beam 215, for at least a portion of a tip 664 of a mitered workpiece 666. Receiver region 662 may be formed in part by an end stop surface 668 of stop foot 660, which may be curved. Curvature of stop surface 668 may permit an oblique surface 670 of workpiece 666 to contact stop surface 668 tangentially over a range of angles of the oblique surface. Accordingly, receiver region 662 may receive and abut mitered tips having a range of miter angles. Stop foot 660 also may form another receiver region using an orthogonal stop surface and beam 215 to engage and position converging surfaces of a right angle corner of a workpiece. A potential disadvantage of stop feet 222 and 660 for use with a mitered workpiece is that the mitered workpiece may function as a wedge to urge each of these stop feet away from the frame, which may cause inaccuracies in workpiece positioning.

FIGS. 21 and 22 show fragmentary views of yet another embodiment of positioner 184 with another exemplary stop assembly 690 for engagement of square and mitered corners of workpieces. Stop assembly 690 may be equipped with a stop foot 692. The stop foot may receive a portion of a workpiece 693, namely, a mitered tip 694 thereof, and engage converging surfaces 696, 698 of the tip. Stop foot 692 may be superior to stop feet 222 and 660 for receiving a mitered workpiece because the mitered workpiece is not wedged between the frame and the stop foot.

Stop assembly 690 may be connected to carriage 220 and may comprise a wing member 700 connected to carriage 220 via a pivotable joint 702. The stop assembly also may comprise a stop bar 704 connected to wing member 700 and also connected to stop foot 692 at an end of the bar.

Stop foot 692 may provide an orthogonal stop surface 706 facing at least generally towards an end of beam 215 and positioned for abutment with an orthogonal surface (e.g., a square end) of a workpiece. Stop surface 706 may be formed by a body 710, one or more fingers 712, or by body 710 and at least one finger 712 of stop foot 692, among others. Accordingly, a tip of each finger 712 may engage a facing orthogonal surface of a square-cut workpiece or may be set back and thus spaced from the workpiece's orthogonal surface.

Stop foot 692 may include a recess 716 (see FIG. 21) formed in and/or adjacent orthogonal stop surface 706, to provide a receiver region for surfaces 696, 698 of mitered workpiece tip 694. For example, finger 712 may engage parallel surface 696 of workpiece 693 and body 710 may engage oblique surface 698 of the workpiece. Parallel surface 696 may be a side surface of the workpiece disposed parallel to measurement axis 217.

Finger 712 may space tip 694 of workpiece 708 from beam 215. Accordingly, the workpiece may be skewed slightly, indicated at 718, in the horizontal plane with respect to measurement axis 217, if beam 215 is utilized as a fence to align the workpiece with measurement axis 217. As a result, the set angle at which a saw is set to cut through the slightly skewed workpiece (e.g., to form a square or miter cut) may be changed by the skew angle at which the workpiece is skewed. However, the skew angle generally becomes negligible with longer workpiece products. As an example, intended for illustration only, the finger width may be less than about one percent of the length of a desired product, such as a finger that is 0.25 inch wide and a cut product that is 2 feet long. These dimensions yield a skew angle of 0.6 degrees, which is within acceptable tolerances for most applications. Alternatively, the skewed arrangement of the workpiece may be avoided by various approaches. For example, if the tool has a fence, the tool's fence may be moved forward of beam 215 by the width of finger 712. With this approach, finger 712 and the tool's fence may be used to position the workpiece parallel to the measurement axis in a horizontal plane. As another example, a width of beam 215 measured horizontally may be increased locally by an amount equal to the width of finger 712, near the end of beam 215 adjacent the tool. A local increase of the beam's width may, for example, be achieved by attachment of a plate over the front surface of beam 215 near its end. The plate may be positioned beyond the range of travel of the stop foot, such that motion of the stop foot is not impeded by the plate.

Body 710 and finger 712 (or two or more fingers 712) may be present in the same monolithic stop structure or may be present as discrete parts. In exemplary embodiments, stop foot 692 may be formed as one piece (e.g., from an extrusion) having a substantially constant cross-sectional shape, such as along a vertical axis when the stop foot is positioned as in FIG. 21. Body 710 may be hollow or solid.

Each of stop feet 222, 660, and 692 disposes an outer corner of a mitered end and a square corner at an offset with respect to one another. Accordingly, the positioner's controller may position any of stop feet 222, 660, and 692 at distinct positions along measurement axis 217 for the same target dimension, based on whether the controller is informed that a workpiece has a mitered end or a square end for engagement with the stop foot. Further aspects of controller calibration and/or compensation for square and mitered ends are described below with respect to controller routines in Sections V and VI.

Stop bar 704 may be connected to wing member 700 with a clamp 730 (see FIGS. 21 and 23). The clamp may comprise a clamp body 732 defining an opening 734 to receive stop bar 704. Clamp body 732 may be at least generally U-shaped and/or may be integral to wing member 700. The clamp also may comprise a fastener 736 that extends between opposing legs of the clamp member and that is in threaded engagement with only one of the legs. Fastener 736 may be connected to a handle 742, such as a lever, that can be turned to adjust the spacing of the clamp's legs, to provide an adjustable configuration in which the stop bar is slidable longitudinally with respect to the clamp and a fixed configuration in which the stop bar is fixed.

Wing member 700 further may incorporate an angle adjustment mechanism 746. Mechanism 746 may be adjusted to determine an angle with which wing member 700 extends from slider 480, and thus a height and angulation of stop foot 692. In exemplary embodiments, mechanism 746 may, for example, be an adjustable set screw 748 that extends from an upper region of the wing member and into contact with slider 480. Set screw 748, by changing the angle of the wing member, may be utilized to adjust a spacing of stop foot 692 from beam 215.

Generally, the stop foot may be positioned at any suitable distance from beam 215. In some embodiments, the stop foot (and/or stop) may be in contact with beam 215. For example, friction may be minimized by forming an interface, between the stop foot and the beam, that has a low coefficient of friction. In some embodiments, the stop foot (and/or stop) may be spaced from the beam, such as by a short distance (e.g., less than about 2, 1 or 0.5 millimeters, among others) or a longer distance (e.g., greater than about 1, 2, or 5 millimeters, among others), to avoid friction that might hinder stop motion. Placing the stop foot in contact with the beam or spaced by only a short distance may be suitable to avoid a large gap between the stop with the beam, such as to permit an acute tip of a miter-cut workpiece to contact the stop foot near the beam without getting wedged in a large gap between the stop foot and the beam.

Figure 24:
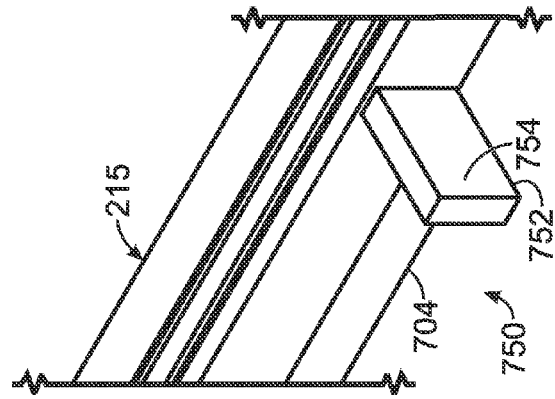
FIG. 24 is a fragmentary view of the positioner of FIGS. 21-23 equipped with a different exemplary stop foot in the stop assembly, in accordance with aspects of the present disclosure.
Figure 25:
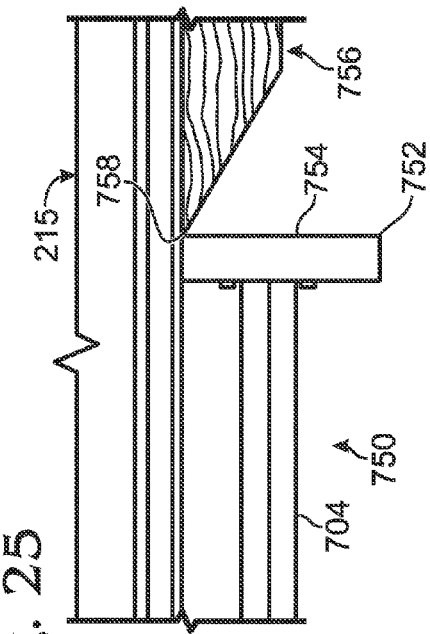
FIG. 25 is a top view of the positioner of FIG. 24 with the stop foot abutted with a miter-cut end of a workpiece, in accordance with aspects of the present disclosure.

FIGS. 24 and 25 show fragmentary views of another exemplary stop assembly 750, which may be incorporated into any of the positioners disclosed herein. Stop assembly 750 may include any of the components or features of other stop assemblies disclosed herein, such as wing member 700, stop bar 704, and clamp 730 of stop assembly 690 (see FIGS. 21-23).

Stop assembly 750 may include a stop provided by a stop foot 752 connected to an end of stop bar 704. Stop foot 752 may be shaped as a rectangular block or plate, which may be structured as a parallelepiped. The stop foot may provide a transverse fence forming a flat abutment surface 754 (a datum surface) that a workpiece 756 may contact for axial positioning of the workpiece. Surface 754 may be oriented orthogonal to the longitudinal axis of beam 215. Workpieces having square and oblique ends may be abutted with surface 754. For example, in FIG. 25, a tip 758 formed by a miter-cut end (a pointed end) of workpiece is abutted with stop foot 752 at surface 754.

Figure 26:
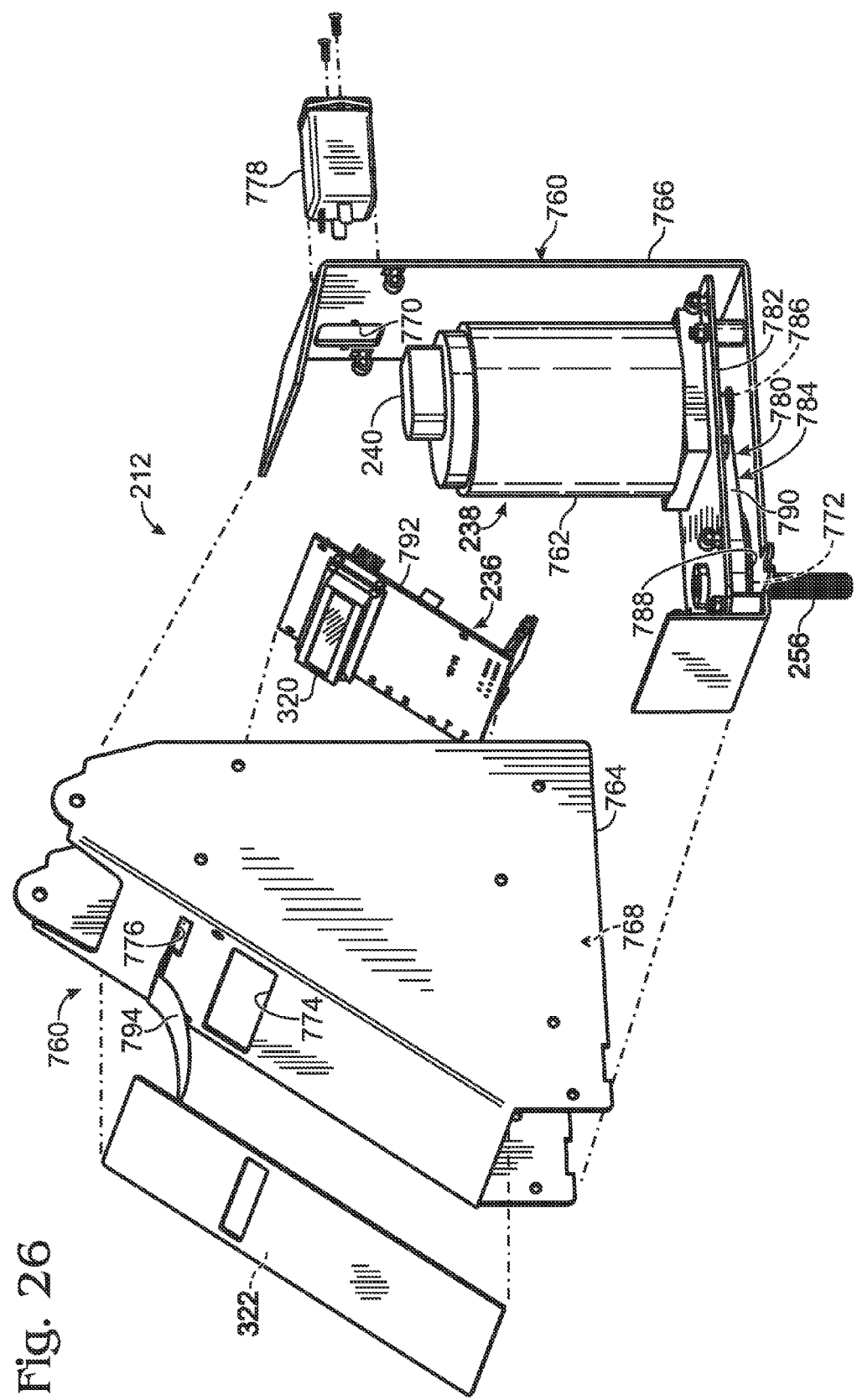
FIG. 26 is an exploded view of a power module of the positioner of FIG. 4.

FIG. 26 shows an exploded view of power module 212. The power module may include a housing 760 that substantially encloses controller 236, encoder 240, a motor 762, or any combination thereof, among others. Housing 760 may incorporate a pair of housing elements 764, 766 that are secured to one another with fasteners, to form a chamber 768 in which controller 236 and motor 762 are housed.

The housing may define a plurality of openings 770-776, which may permit electrical input and output and mechanical output, among others.

Opening 770 may receive a socket member 778. The socket member may provide a port for input of electrical power, such as line power or battery power, and may be electrically connected to controller 236.

Opening 772 may receive shaft 256 of motor assembly 238. The shaft may be rotationally coupled to motor 762 via a shaft linkage 780, which may (or may not) be disposed in housing 760. The shaft linkage may be separated from other components of the power module by a partition, such as a plate 782. The shaft linkage may be any linkage that transmits torque from motor 762 to shaft 256, such as a belt-and-pulley assembly 784 that includes a smaller pulley 786 rotationally coupled to a larger pulley 788 by a belt 790. Belt-and-pulley assembly 784 may provide a gear reduction that causes shaft 256 to turn more slowly than motor 762, such as by a ratio of about 5:1. The use of a gear reduction may improve the accuracy with which shaft 256 can be controlled. In particular, the gear reduction may cause the position signals received by the controller from encoder 240, to correspond to smaller angles of rotation of shaft 256, according to the gear reduction, than if the gear reduction were not implemented.

Opening 774 may receive display 320, which is connected electrically to controller 236. Display 320 may be mounted on a circuit board 792. The circuit board may at least substantially provide the circuitry of controller 236. Accordingly, the controller may be provided by a single-board, which may have a mixed analog/digital hardware design. The use of a single-board controller may offer inexpensiveness, simplicity, and reliability. The circuit board may be potted in epoxy. The circuit board and/or display may be designed for easy replacement by a user. For example, each may be replaced by snap-in installation without the need for separate fasteners or tools.

Figure 27:
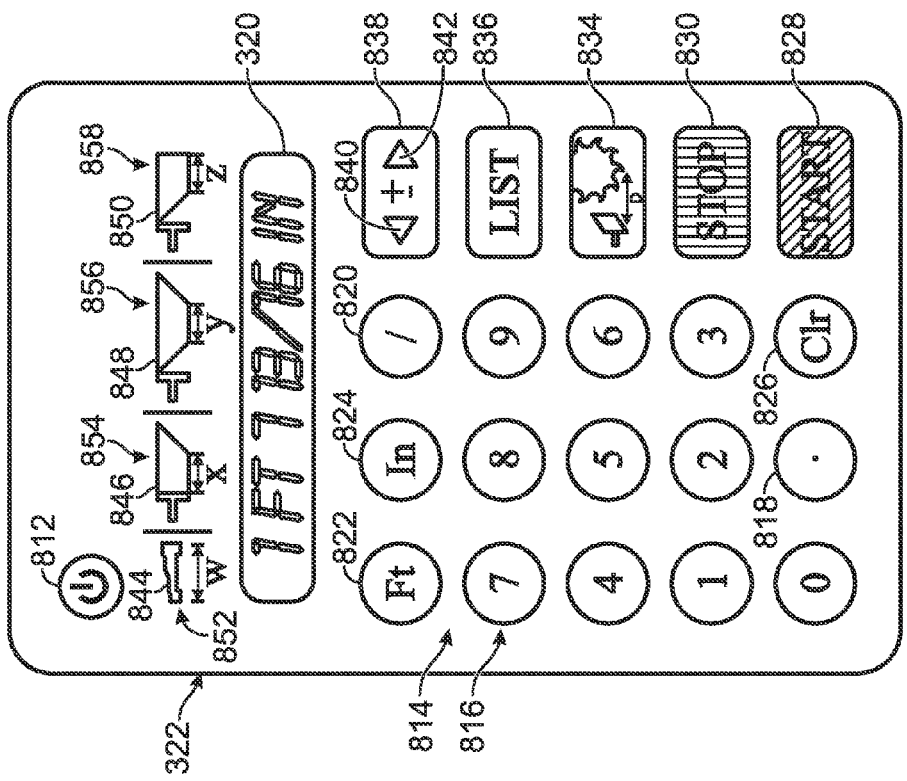
FIG. 27 is a plan view of an exemplary keypad that may be included in the power module of FIG. 26.

Opening 776 may receive a connector, such as a ribbon connector 794, that electrically connects keypad 322 to controller 236. Keypad 322 may be connected to housing 760 and disposed outside of housing 760, such as on an outer surface of the housing 760. The keypad may have a clear window or outer membrane, which may, for example, prevent dirt penetration, FIG. 27 shows a plan view of display 320 and keypad 322. The keypad may include any combination of keys.

The keys may include a power button 812 and numerical input keys 814. The power button may be used to power on and/or off the controller and may be described as a soft-start key. Keys 814 may include number keys 816 (0 to 9), a decimal point key 818, a fraction key 820, unit keys 822, 824, and a clear key 826. Keys 814 may be utilized by a user to input any numerical data, particularly dimensions, such as set points/target dimensions and/or one or more calibration measurements (see below), among others. Decimal point key 818 may be used to provide a decimal form of a dimension, such as "1"+"Ft"+"7.8125" (feet are indicated by pressing foot key 822 and inches are assumed by the controller without pressing inch key 824). Fraction key 820, may be used instead of decimal point key 818, to input the fractional form of the same dimension, by pressing "1"+"Ft"+"7" "In"+"13" "/"+"16," with inch key 824 being used to signal the start of the fraction. In other words, decimal and fractional formats of a numerical input, such as a target dimension, may be inputted according to the user's preference, with the controller programmed to recognize and display either format, and without the need to toggle a separate display format setting. Thus, the controller may be programmed to receive and display target dimensions adaptively: the target dimensions may be entered in either decimal form or fractional format by a user and the controller may display the target dimensions according to the format in which the target dimensions were entered.

Furthermore, a user may input the same dimension, such as 24 inches by pressing "2"+"Ft" or "2"+"4"+"In," or just "2"+"4," with inches being a default input unless specified otherwise. The controller may be programmed to enable keys 814 also or alternatively to be utilized to input non-numerical data to the controller, system configuration (tool to left/right of positioner), user preferences (e.g., metric or English units), or the like. Any of the other keys of the display also or alternatively may be configured to input non-numerical data to the controller.

The keys of the keypad may include a start key 828, which may have a green background, and a stop key 830, which may have a red background. Start key 828 may function as an "enter" key that accepts an inputted value, such as a set point value, and/or that signals that the user is ready for the positioner to move the stop to a set point. Accordingly, pressing the start key may initiate movement of the stop toward a set point (a target position). Stop key 830 may be pressed to terminate a positioner operation, such as a drive sequence toward a set point. Accordingly, pressing the stop key may cause operation of the motor to cease temporarily and/or a drive sequence to be aborted.

The keys of the keypad also may include a calibration key 834. Key 834 may be identified by a graphic representation, such as an illustration involving a stop and/or a saw blade, among others. Pressing key 834 may signal that a user is inputting calibration data, wants to initiate a calibration routine, or the like.

The keys of the keypad further may include a list key 836. The list key may be employed to store a list of two or more data entries, such as two or more set points for later use. Alternatively, or in addition, the list key may be utilized to recall set points stored as a list.

The keys of the keypad still further may include a nudge key 838. The nudge key may be pressed to increment the current position by a predefined or inputted value (e.g., 0.05, 0.1, or 0.2 inch or 0.5 or 1 mm, among others), to add or subtract the value to or from a set point and/or current stop position. The nudge key may function as two distinct keys that may be operated by pressing the nudge key at distinct positions 840, 842 to signal a positive or negative increment to the current position.

The keys of the keypad also may include a plurality of miters keys 844-850 to input miter-related data and/or to identify a set point as being for a particular miter-related configuration of stop abutment and saw angle. Any of miter keys 844-850 may be identified by, be associated with, and/or bear a graphic representation (also termed a graphic) that illustrates the function of the miter key. Width key 844 may be identified by and may present a graphic representation 852 of a width dimension, "w," of a workpiece (and/or of a product to be generated), such as a piece of molding to be miter cut (e.g., at 45 degrees). Miter key 846 may be identified by and may present a graphic representation 854 of a "square-miter" inside dimension, "x," of a mitered product, which corresponds, for example, to a short point of a left stile casing. Miter key 848 may be identified by and may present a graphic representation 856 of a "miter-miter" inside dimension, "y," of a mitered product, which corresponds, for example, to a short point of a header casing. Miter key 850 may be identified by and may present a graphic representation 858 of a "miter-square" inside dimension, "z," of a mitered product, which corresponds, for example, to a short point of a right stile casing.

The miter keys may have any other suitable properties. Each of the miter keys may (or may not) be dedicated miter keys that are used predominantly or at least substantially exclusively for miter compensation. The miter keys also may include an angle key for input of an angle value for miter compensation (i.e., an angle value related to a miter cut at one or both ends of the product). The angle key also may include a graphic representation illustrating the function of the key, namely, conveying the concept of an angle to the user.

IV. EXEMPLARY BRACKET ASSEMBLIES

This section describes exemplary bracket assemblies for attaching a positioning apparatus, such as positioner 184, to a support frame.

FIGS. 28 and 29 show respective side elevation and exploded views of bracket assembly 214, which may be utilized in the saw system of FIG. 3 to attach rail module 210 to chop saw stand 182 via central body or beam 188 of the stand. Bracket assembly 214 may include an upper clamp 860 and a lower clamp 862, which adjustably engage upper beam 215 and lower beam 188, respectively. Upper clamp 860 may include clamp members 864, 866, which may opposingly engage dovetail projection 408 of beam 215. Clamp member 866 may be adjustably positioned relative to clamp member 864 by turning a handle 868. Lower clamp 862 may include clamp members 870, 872, which may opposingly engage beam 188 of stand 182. Clamp member 872 may be urged toward clamp member 870 by turning a fastener 874.

Bracket assembly 214 may have an adjustable height provided by upper and lower bracket pieces 876, 878 carrying the upper and lower clamps, respectively. Bracket pieces may be attached to one another in a fixed configuration using fastener assemblies 880 received in aligned aperture pairs 882, 884 defined by the upper and lower bracket pieces. Alternatively, the bracket pieces may be attached to one another in an adjustable configuration by placing fasteners through vertical and horizontal slots 886, 888 arranged in an overlapping configuration, indicated at 890 in FIG. 28, with the slots defined respectively by the bracket pieces. In the adjustable configuration, the relative positions of the upper and lower clamps can be adjusted vertically and/or horizontally and then fixed.

Figure 30:
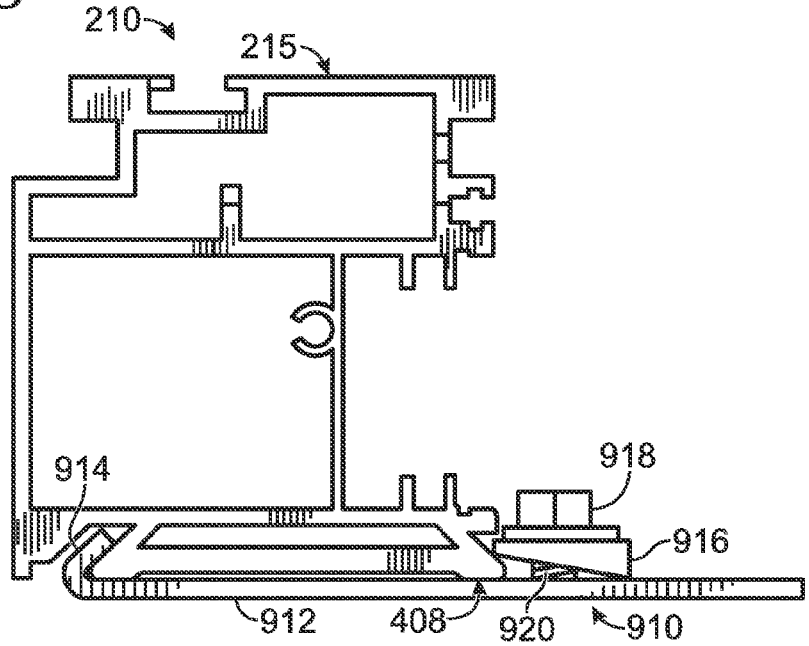
FIG. 30 is a side elevation view of another exemplary bracket assembly attached to the rail module of the positioner of FIG. 4, in accordance with aspects of present disclosure.
Figure 31:
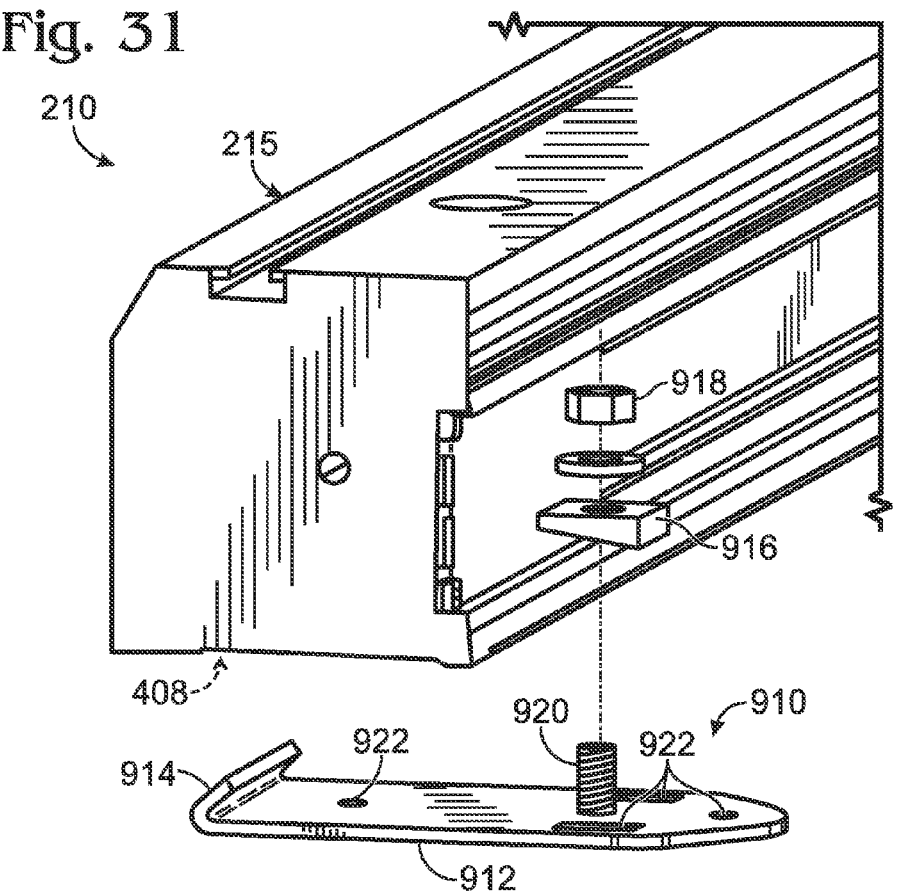
FIG. 31 is a fragmentary, partially exploded view of the bracket assembly and rail module of FIG. 30.

FIGS. 30 and 31 show respective side elevation and exploded views of another exemplary bracket 910 attached to rail module 210 of positioner 184 and configured to secure beam 215 to a base, such as workbench. Bracket 910 may include a plate 912 with a hook 914 that is sized and shaped to be hooked onto dovetail projection 408, with the body of the plate disposed parallel to the bottom of beam 215. An opposing side of dovetail projection 408 may be engaged by a washer 916 secured by a nut 918 threaded to a post 920 projecting from the body of the plate, generally opposing hook 914. Post 920 may be fixed to plate 912. Plate 912 may define apertures 922 for receiving fasteners that attach the plate to a base, such as a workbench.

V. EXEMPLARY CONTROL AND OPERATION OF A POSITIONING APPARATUS

This section describes exemplary controller algorithms, user interactions with the controller, and operating procedures that may be utilized during operation of any of the positioning apparatus and/or gauge systems disclosed herein. The algorithms and procedures presented in this section are described with reference to the elements of positioner 184 (e.g., see FIG. 3).

A setup routine may be performed at any time to prepare the positioner for accurately driving the stop to set points. The setup routine generally is performed when the positioner is used for the first time. However, selected portions or all of the setup routine may be repeated at any suitable later times, such as each time the controller is started up, when the positioner has been reconfigured (such as by moving power module 212 from one end region to the other end region of the rail module), or when the user chooses to recalibrate the positioner (e.g., to check or improve the accuracy of stop positioning at set points, among others).

The setup routine may involve any suitable combination of (1) internal calibration to determine a scale factor using an internal standard built into the positioner, (2) external calibration to determine an actual distance of the stop from a tool by using one or more external standards, and (3) establishment of a polarity of measurement axis 217 with respect to rail module 210.

Internal calibration, which may be described as determination of a scale factor, may be performed in response to a command from a user and/or automatically at one or more times determined by the controller. Automatic internal calibration may, for example, be suitable when the positioner is used for the first time by a user.

Internal calibration may be based on an internal standard incorporated into the design of the positioner. In exemplary embodiments, the internal standard may correspond to a predefined range of linear travel for the carriage (and/or the stop). The linear range of travel may be predefined by a pair of travel barriers 588, 590 set at a predefined spacing from one another (see FIGS. 11 and 14-17). The predefined range of linear travel may be communicated to the controller at any suitable time, such as inputted during manufacture or inputted by the user after the first start up (e.g., based on a stated range of linear travel associated with the rail module being used).

The controller may follow an internal calibration routine in which rotary position sensor 240 of positioner 184 communicates position signals to controller 236 as motor 762 drives carriage 220 through the predefined range of travel. The position signals provide a range of rotary travel for the motor, when the motor drives carriage 220 from one end to the other end of the range of linear travel. The controller may correlate the position signals and the range of rotary travel, when the carriage travels from one travel barrier to the other travel barrier, with the predefined range of linear travel, to determine a scale factor. The scale factor, which may be described as a linear-rotary conversion factor, corresponds to a relationship between rotary motion of motor 762 and linear motion of carriage 220/stop foot 222, such as a ratio corresponding to a linear distance traveled by the carriage (and stop foot) per rotary position signal received from the encoder, or the reciprocal of this ratio.

Each position signal may correspond to rotation of the motor through a small angle (e.g., about one degree or less). The position signal may be generated by sensing rotation of an encoder wheel coupled to the motor. The encoder wheel may carry a plurality of encoder marks arranged around a pivot axis of the wheel. Rotary position signals (pulses) may be generated as the encoder marks are sensed sequentially while the wheel rotates. In exemplary embodiments, the encoder wheel may carry about 500 encoder marks. The controller/encoder may count position signals over the range of the travel, and the controller may calculate a ratio of the range of linear travel to the number of position signals counted, or vice versa, among others. Also, or alternatively, the controller may correlate the position signals with the beginning and the end of the range of linear travel. Accordingly, a position signal from at least substantially the start point of the range of rotary travel may be considered as corresponding to a zero point in the range of linear travel, and a position signal from at least substantially the end of the range of rotary travel may be considered as corresponding to the linear dimension (of the range of linear travel) from the start point (e.g., +8 (or −8) feet from the zero point). In any event, the scale factor may be used to convert rotary position signals into linear dimensions, and vice versa.

An exemplary scale factor calculation and use of the scale factor to control motor operation are presented here for the purposes of illustration only. The controller may have data corresponding to a range of travel of 8 feet (96 inches) stored in memory. The rotary encoder may, for example, send 48,000 position signals to the controller when the carriage/stop moves from one end to the other end of its range of linear travel and the motor rotates through its full range of rotary travel. The range of linear travel, 96 inches, divided by the range of rotary travel (i.e., the number of position signals, 48,000) provides a scale factor of 0.002 inch of linear travel per encoder mark (and position signal). Thus, in this illustration, the controller drives the motor through a measured rotation of five hundred encoder marks per inch of linear stop travel. Accordingly, if the controller receives a command to move the stop by twenty-four inches, the controller sends drive signals to the motor, to cause the encoder wheel to revolve until 12,000 position signals (24 inches times 500 encoder marks per inch) have been detected.

The controller may store an initial scale factor, which may be a provisional scale factor. The provisional scale factor may be used by the controller until internal calibration is completed, which may determine a revised scale factor that replaces the initial scale factor (or current scale factor). In some cases, the controller may display an error message and/or reject a revised scale factor, if the revised scale factor differs from the initial scale factor by at least a threshold amount (e.g., an absolute or proportional amount). The provisional scale factor may be inputted to the controller and/or calculated by the controller during manufacture of the positioner or may be communicated to the controller at first start-up of the positioner by a user, among others. The provisional scale factor may be an approximate scale factor such as an average or representative value for the configuration of the drive assembly, rotary encoder, and rail utilized by the positioner. In some cases, the initial scale factor stored by the positioner may be accurate enough to be used without revision, and thus internal calibration after purchase may be unnecessary.

In some cases, the controller can determine automatically, based on internal calibration, which length of rail module is being utilized in the positioner, from among a set of two or more candidate lengths. The controller (e.g., during manufacture or setup) may receive and store data corresponding to a set of candidate ranges of linear travel (e.g., 8, 10 and 12 feet) for rail modules manufactured with distinct lengths. During internal calibration, the controller may identify one of the candidate ranges of linear travel as corresponding most closely to the measured amount of rotary change achieved by the motor. This measured amount of rotary change may correspond to the rotary range of travel of the positioner's motor when the carriage is driven from one end to the other end of the range of linear travel. As an example for illustration, the candidate ranges of linear travel may correspond to rotation of approximately 48, 60, and 72 thousand encoder marks past the encoder's sensor. The controller thus may compare (a) the actual number of encoder marks sensed with (b) an approximate expected number of encoder marks for each candidate range of travel, to select the closest candidate range of travel. A revised scale factor then may be calculated based on setting the range of linear travel of the positioner to the selected candidate range. The revised scale factor and identified range of linear travel then may be used in subsequent positioning operations by the controller.

In some embodiments, the travel barriers may be used after the controller is powered on to ascertain stop position and/or to determine range of travel based on a preset scale factor. The controller may drive the stop through its range of travel, from one travel barrier to the other, and then calculate and, optionally, display, a value for the range of travel based on a stored scale factor and position signals from the sensor. This procedure may allow a user to determine whether or not the range of travel reported to the user is close to expected. For example, if the nominal range of travel is 96 inches, and the controller reports a range of travel that is not close to 96 inches, the user may be alerted that the system is not set up and/or functioning properly. Alternatively, or in addition, the controller may drive the stop through its entire range of travel to correlate each end of the range of travel and the distance between the ends with particular position signals from the sensor.

In some embodiments, the controller may drive the stop to an end of its range of travel when the current location of the stop within the travel path is not certain. In particular, the controller may drive the stop until movement of the stop is halted by the contact of the carriage with the travel barrier, to define the current location of the stop, namely, at one or the other end of the range of travel. The position of the stop may be uncertain any time the controller loses contact with the position sensor and/or position data from the sensor is lost or corrupted. For example, if the controller is turned off, a user may move the stop manually along the rail, to a new position, which is not signaled to the controller. Accordingly, the position of the stop may be uncertain when the controller is powered on for a first time by a user, each time the controller is powered on, when the controller needs to be rebooted and/or re-initialized, when the controller has been overloaded with power, or the like. In some cases, the controller may be programmed to drive the carriage until halted by a travel barrier, after the controller is powered on and before driving the stop according to entered target dimensions. The controller may determine that an end of the range of travel has been reached when a predefined condition is satisfied by data from a sensor. For example, the controller may assign the current location of the motor/stop as an end position of the range of travel when the set point error for a time segment of the drive sequence exceeds a threshold value. Alternatively, the controller may make the same assignment when the motor draws too much power and/or gets too hot, among others. In any event, the controller may throttle power to avoid a power spike and then may turn off the motor temporarily.

The controller may receive an input corresponding to the left/right position of the power module 212 and/or tool 54. The controller may be programmed to assume that the power module and tool are both near the same end of the rail module. The left/right position may establish a polarity for travel of the stop, with travel in a "negative" direction bringing the stop closer to the power module and tool, and travel in a "positive" direction taking the stop farther from the power module. These negative and positive directions of stop travel may be correlated with the opposing rotational directions of the motor, such that the controller sends drive signals for the correct rotational direction to the motor.

External calibration involves measurement by a user of an actual distance from the stop to the tool, for a set point of the stop, and communicating the measured actual distance to the controller. The controller then may offset the set point to correspond to the measured actual distance. In the prior art, external calibration may involve at least two set points of the stop, to determine the scale factor and the actual distance from the stop to the tool. For example, the two set points may be near opposite ends of the range of linear travel, to determine two actual positions of the stop with respect to the tool. The linear distance between the two actual positions may be correlated to rotary travel of the motor to drive the stop between the actual positions, to calculate a scale factor. However, the internal calibration described above enables external calibration to be performed with only one external measurement. Accordingly, internal calibration may increase the accuracy and reduce the time and the length of material needed for external calibration.

The actual distance measured provides an absolute position of the stop, along a measurement axis, relative to the tool. Measurement of the actual distance may be performed with any suitable measuring device, such as a tape measure, calipers, an optical measuring device, or the like, and may be carried out manually or automatically. The actual distance may be measured without the aid of a workpiece or may be measured by processing a workpiece that is abutted with the stop and then measuring a dimension of the processed workpiece. For example, the workpiece may be abutted with the stop and then cut by a saw and the length of the cut workpiece measured with a tape measure. The actual position of the stop may be communicated by a user who measures the actual position or by a peripheral, electronic measuring device in communication with the controller (e.g., see U.S. Provisional Patent Application Ser. No. 61/185,553, filed Jun. 9, 2009, which is incorporated herein by reference).

The positioner may be configured to be calibrated by a user for engagement of the stop in two or more distinct configurations with workpieces and/or for distinct configurations of a tool, among others. The performance of multiple calibrations for the same gauge system (e.g., FIG. 3) in distinct configurations is exemplified by a saw-based system being used to create square (right angle) and miter (oblique) cuts. The positioner may be calibrated distinctly for two or more of the following configurations: (1) a square workpiece end against the stop and the saw arranged for a square cut (a "square-square" calibration for a "square-square" product), (2) a square workpiece end against the stop and the saw arranged for a miter cut (a "square-miter" calibration for a "square-miter" product; inside dimension "x"; miter key 846 in FIG. 27), (3) a mitered workpiece end against the stop and the saw arranged for a miter cut (a "miter-miter" calibration for a "miter-miter" product; inside dimension "y"; miter key 848 in FIG. 27), and/or (4) a mitered workpiece end against the stop and the saw arranged for a square cut (a "miter-square" calibration for a "miter-square" product; inside dimension "z"; miter key 850 in FIG. 27). Accordingly, separate calibrations may be performed by a user in conjunction with the controller, based on whether a square workpiece end or a mitered workpiece end is abutted with the stop. Alternatively, or in addition, separate calibrations may be performed based on whether the saw is arranged for a square cut or a miter cut. The positioner may be configured to permit a user to inform the controller of the type of calibration being performed, such as with the use of miter keys 846-850 described above in relation to FIG. 27. Alternatively, or in addition, the controller may be configured to perform any of the distinct types of calibrations listed above, in a preset order.

The controller may be programmed to select a calibration for use with a set point. The calibration may be selected from a set of two or more distinct calibrations, such as any of the distinct calibrations listed above, based on a workpiece/tool configuration communicated to the controller (e.g., inputted by the user). For example, the controller may apply a square-square calibration when the controller is informed that a workpiece is being cut to create a square-square product (or as a default calibration), a square-miter calibration when the controller is informed that a workpiece is being cut to create a square-miter product, and so on.

In some embodiments, the controller may be programmed to apply a set point according to the type of cut product (square-square, square-miter, etc.) to be generated. The controller may apply a set point distinctly for different types of cut configurations based on the same calibration. For example, the controller may receive a square-square calibration value and a set point identified as being for a square-miter product, with the set point being a target inside dimension (x) for the square-miter product. Many power saws are pivotable between square and miter configurations about a vertical pivot axis that is coplanar with the saw's fence. Accordingly, when the saw is pivoted between square and miter configurations, and the stop is left in the same position, the outer dimension of a square-miter product is about the same as the length of a square-square product, but the inner dimension of the square-miter product is reduced according to the miter angle and the workpiece width. For example, with a 45-degree miter, the inner dimension is reduced by the width of the workpiece relative to the outer dimension. However, the inner dimension (see miter keys 846-850 of FIG. 27) may be a more common measurement, in some applications, for finish carpenters. Accordingly, the controller may apply the set point without adjustment for a square-square set point and may increase (or decrease) the set point according to the width of the workpiece and/or the angle at which the miter cut is to be performed for a square-miter set point.

Alternatively, or in addition, the controller may apply a set point distinctly according to whether a workpiece has a square end or a mitered end abutted with the stop. For example, the controller may adjust the set point by an amount related to the width of a workpiece, if a mitered end of a workpiece is abutted with a stop and an inside dimension is communicated to the controller as a set point. Alternatively, or in addition, the controller may adjust the set point based, at least in part, on offset distance 634 between miter end abutment and square end abutment with the stop (see FIGS. 19 and 20).

In some embodiments, the controller may be in communication with a miter saw. The controller may send signals to the miter saw, such as to change the angle of the miter saw, and/or may receive signals from the miter saw. The signals received from the miter saw may correspond to whether or not the miter saw has performed a cut and/or an angle at which the miter saw is disposed. The controller may adjust set points based on the signals received from the miter saw.

Figure 32:
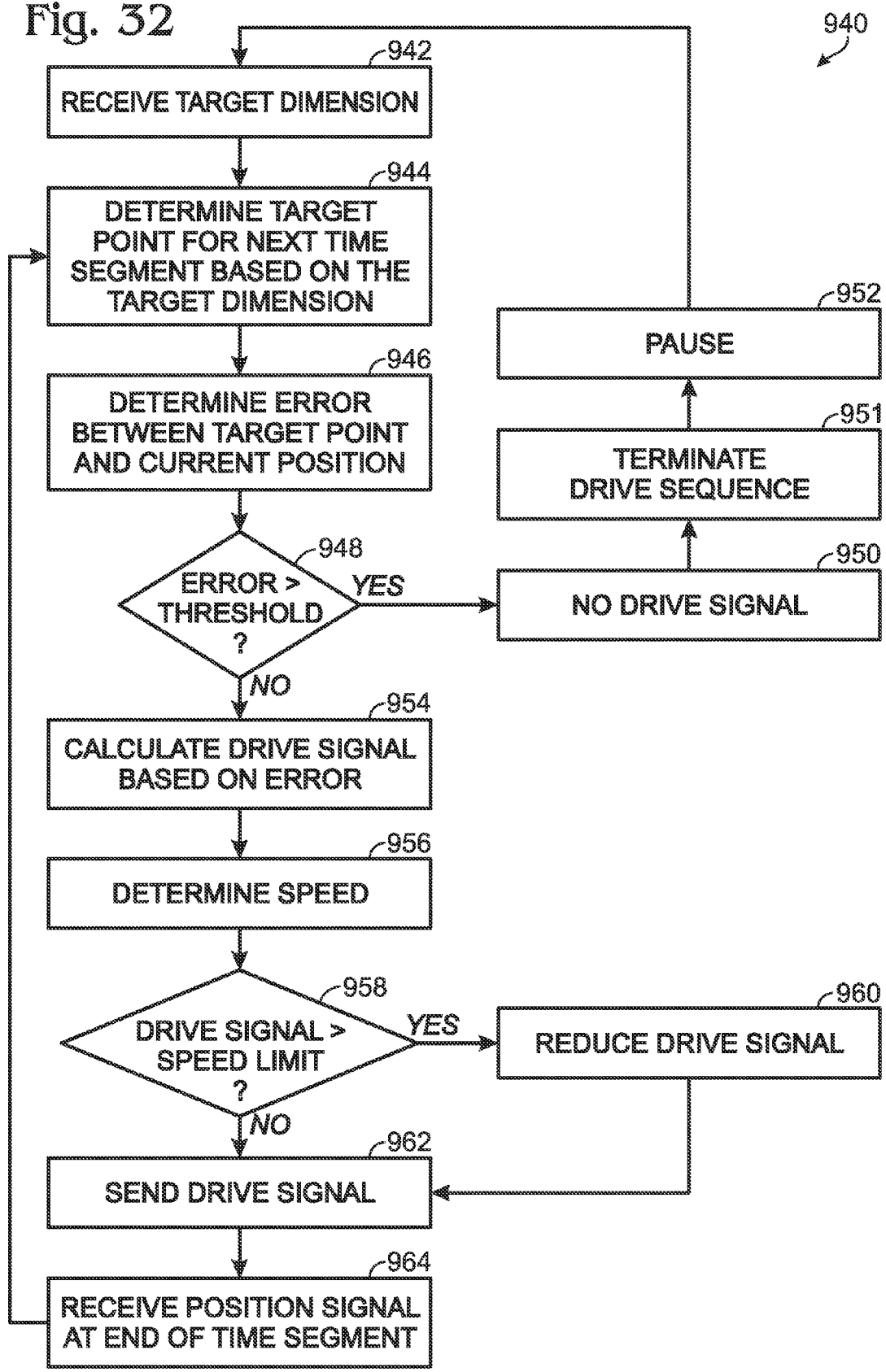
FIG. 32 is a flowchart illustrating an exemplary method of driving a stop to a target position, which may be performed by a gauge system for workpiece processing, in accordance with aspects of the present disclosure.

FIG. 32 shows an exemplary flowchart 940 for a method of driving a stop to a target position based on an entered and/or calculated target dimension. The method steps presented in flowchart 940 may be performed in any suitable combination and in any suitable order. Also, any combination of the method steps presented in flowchart 940 may be combined with any other method steps of the present disclosure.

A target dimension may be received by the controller, indicated at 942. The target dimension may correspond to a set point, which may be described as a "stationary" set point. The controller may translate the target dimension into target position, which, from the perspective of the controller, may be a rotary target position for the encoder (and/or a driven part of the motor), based on the current rotary/linear position and the scale factor. For example, the controller may determine the direction of rotary travel of the encoder/motor and the amount of rotary travel of the encoder/motor (e.g., the number of encoder marks to be sensed) to place the stop at the set point.

The controller may obtain a speed profile, relative to elapsed time, for driving the stop from the current position to the set point. The speed profile may define an acceleration phase of increasing speed, a coasting phase of substantially constant speed, and finally a deceleration phase of decreasing speed. Based on the speed profile, the controller may calculate a dynamic set point (a "target point") that is updated at the end of each time segment (e.g., each millisecond) based on the speed profile. The target point thus progressively moves toward the "stationary" set point, according to the speed profile, and at least substantially reaches the stationary set point when the speed profile is completed.

The controller may determine a dynamic set point or target point for the first/next time segment based on the stationary set point, indicated at 944. More particularly, the target point may be determined based a speed profile that is obtained based on the stationary set point.

The controller may determine a position error between the target point and the current position, indicated at 946. The controller also may compare the position error with a threshold error, which may correspond to the maximum permitted error before the drive sequence is terminated (i.e., aborted).

The controller may determine whether the position error exceeds the threshold error, indicated at 948. If the position error exceeds the threshold error, this indicates that motor operation is inefficient and/or the drive sequence is proceeding abnormally. Accordingly, no drive signal is generated and the drive sequence may be terminated, indicated at 950, and the controller then may pause, indicated at 952, and then return to the start of the method, to receive another target dimension and/or start signal, indicated at 942. Termination of the drive sequence and then pausing before executing another drive sequence, may include turning off the motor temporarily, that is, supplying substantially no drive signals and/or power to the motor for a time segment (such as a preset pause interval) before resuming operation of the motor. If the error does not exceed the threshold, the controller may calculate a drive signal based on the error, indicated at 954. The controller may utilize any suitable feedback algorithm to calculate the drive signal.

When no power is supplied to the motor, the stop may go slack, meaning that the motor is no longer working to control the position and speed of the stop. Accordingly, a user may slide the stop readily when the motor is turned off.

The controller may determine/obtain a measured speed, which may correspond to a rotary speed of the encoder/motor and/or a linear speed of the stop, based on position signals from the encoder, indicated at 956. The controller also may compare the drive signal, which may be associated temporally with the measured speed, with a limit, to determine, indicated at 958, whether the drive signal exceeds the limit, which may be a speed-based limit. More particularly, the limit may be constant or may vary at least once with the speed measured, for example, increasing with the speed, such as linearly or stepwise. If the drive signal exceeds the limit, the drive signal may be reduced to create a reduced drive signal, indicated at 960. In some embodiments, the drive signal may be reduced in correspondence with the limit, such as set the value of the drive signal to the limit for the speed. In any event, the reduced drive signal may be communicated to the motor, indicated at 962. As a result, the drive signal may be throttled, which, in turn, throttles the amount of power supplied to the motor. This strategy of power throttling may provide a "software spring" with substantial benefits over relying only on a threshold error to indicate problems (jams, blockages, etc.) for which the drive sequence should be terminated, because the use of a threshold error may not provide a rapid enough response to potential problems. The benefits of power throttling may include less damage to the motor caused by excessive power usage, improved safety provided by a more rapid response to potential injury situations (such as when a hand gets jammed), a smoother drive sequence, an ability to drive the stop through a region of its travel path (e.g., a region of higher friction) where travel is hampered and without generating a power spike, fewer power overloads that require a controller restart, and the like. If, instead, the drive signal does not exceed the limit, the drive signal may be communicated to the motor without any reduction, also indicated at 962.

The controller may receive one or more position signals from the encoder at the end of the time segment, indicated at 964. The position signals may be used to determine the target point for the next time segment, indicated back at 944, to close the loop.

The method shown in FIG. 32 may be utilized to perform an internal calibration of the positioner, to determine a scale factor. When internal calibration is initiated by the controller, the controller may not have accurate position data for the current carriage/stop position. Accordingly, the controller may be programmed to drive the carriage stop according to set points that are outside the predefined range of travel, to ensure that the carriage is driven to each of the travel barriers.

The controller may provide a proximal set point corresponding to travel of the carriage/stop for a distance greater than the predefined range of travel in a negative direction (i.e., toward the tool), and a distal set point corresponding to travel of the carriage/stop for a distance greater than the predefined range of travel in a positive direction (i.e., away from the tool). When carriage motion is blocked by contact with each of the proximal and distal travel barriers (before the proximal and distal set points are reached), the drive throttling mechanism may function to protect the motor and the electronics until the threshold error is exceeded and the drive sequence is terminated. After the drive sequence is terminated by contact with one of the travel barriers, the controller then may provide the other set point and control driving the carriage/stop to the other travel barrier. In any event, the controller may determine a number of position signals (e.g., encoder pulses) generated when the carriage/stop is driven from one travel barrier to the other travel barrier. A ratio may be calculated using the number of position signals and the range of linear travel.

Figure 33:
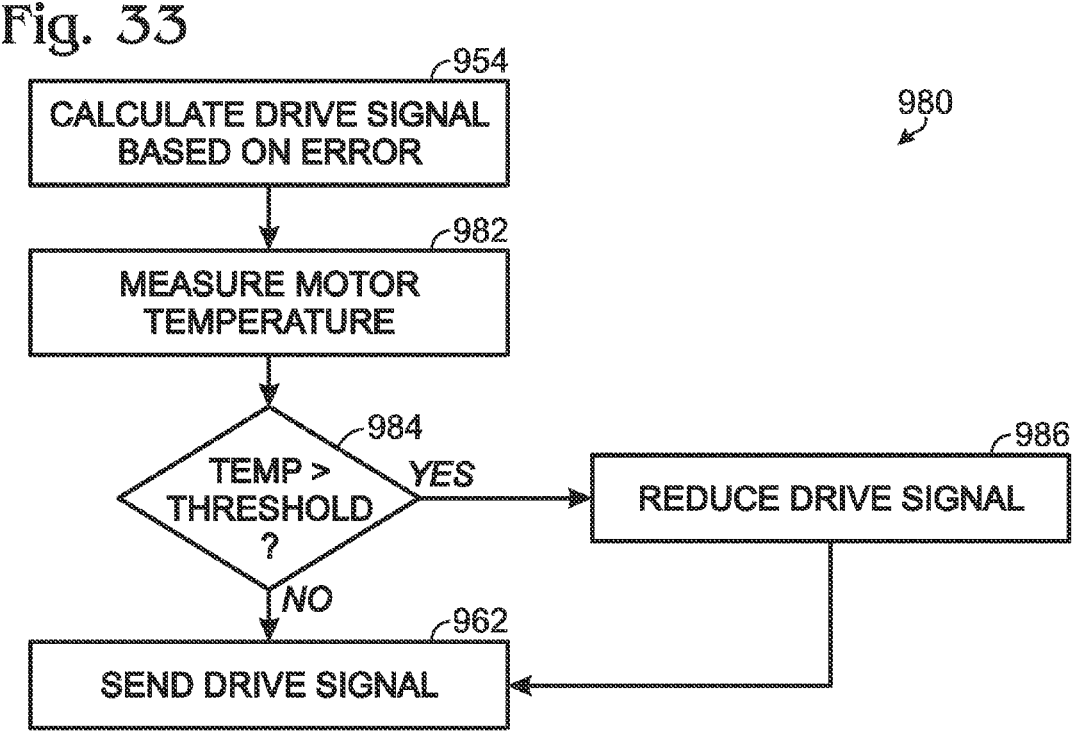
FIG. 33 is a flowchart illustrating an exemplary method of driving a stop that may be performed on its own or may supplement or replace portions of the method of FIG. 32, in accordance with aspects of the present disclosure.

FIG. 33 shows a flowchart 980 of another exemplary method that may supplement or replace portions of the method of FIG. 32. The method of FIG. 33 may be performed with a positioner that includes a temperature sensor. The temperature sensor may measure a temperature associated with the motor and communicate temperature signals to the controller, indicated at 982. The controller may calculate a drive signal, indicated at 954, as in the method of FIG. 32.

The controller may receive a temperature signal and compare the temperature signal to a threshold, indicated at 984. If a value of the temperature signal exceeds the threshold, the controller may reduce the drive signal, indicated at 986, and then communicate the reduced drive signal to the motor. In some embodiments, the controller may reduce the value of the drive signal in correspondence with a difference between the value of the temperature signal and the threshold. Accordingly, values of drive signals may be reduced by increasing amounts as the temperature of the motor rises, to supply decreasing amounts of electrical power to the motor as the motor tends toward overheating. In some embodiments, the threshold may be a first threshold, and the controller may at least substantially terminate communication of effective drive signals (that drive the motor) if the temperature signal exceeds a second threshold that is greater than the first threshold. As an example, for illustration only, the motor may be rated to operate at temperatures of up to 80° C. When the motor reaches 60° C., the controller may begin to throttle power to the motor by reducing the values of drive signals. If the temperature continues to rise towards 80° C., the controller may increasingly throttle power by reducing the values of drive signals further. When the temperature reaches 80° C., the controller may stop supplying the motor with power, to let the motor cool down and avoid motor damage.

Figure 34:
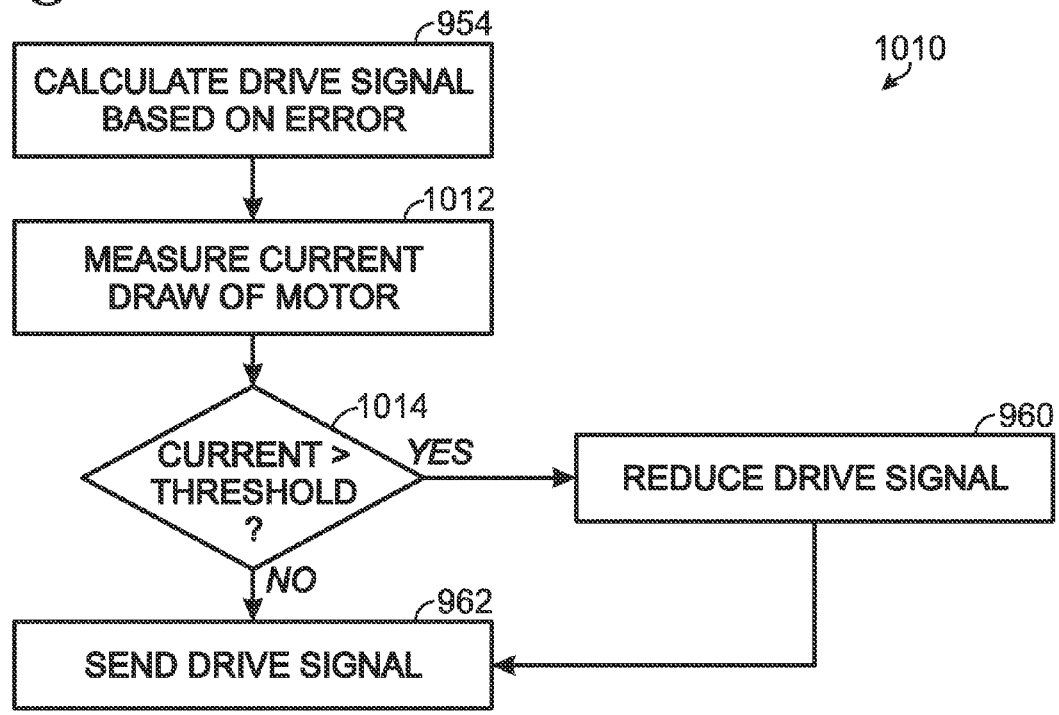
FIG. 34 is a flowchart illustrating yet another exemplary method of driving a stop that may be performed on its own or may supplement or replace portions of the method of FIG. 32, in accordance with aspects of the present disclosure.

FIG. 34 is a flowchart 1010 of another exemplary method that may supplement or replace portions of the methods of FIGS. 32 and 33. The method of FIG. 34 may be performed with a positioner that includes an electrical sensor that senses an electrical parameter of power supplied to the motor, such as electrical current drawn by the motor. The electrical sensor may measure a current drawn by the motor and may communicate electrical current signals to the controller, indicated at 1012. The controller may calculate a drive signal, indicated at 954, as in the method of FIG. 32.

The controller may receive an electrical current signal and compare the value of the current signal to a threshold, indicated at 1014. If the value of the current signal exceeds the threshold, the controller may reduce the value of the drive signal, indicated at 1016, and then communicate the reduced drive signal value to the motor. In some embodiments, the controller may reduce the value of the drive signal in correspondence with a difference between the electrical current signal and the threshold. Accordingly, the values of drive signals may be reduced by increasing amounts as the current drawn by the motor rises, to supply decreasing amounts of electrical power to the motor. In some embodiments, the threshold may be a first threshold, and the controller may at least substantially terminate communication of effective drive signals (that drive the motor) if the electrical current signal exceeds a second threshold that is greater than the first threshold.

VI. EXAMPLES

The following examples describe selected aspects and embodiments of the present disclosure, particularly additional aspects of exemplary gauge systems and methods of using the gauge systems. These examples and the various features and aspects thereof are included for illustration and are not intended to define or limit the entire scope of the present disclosure.

Example 1. Exemplary Gauge System with Saw

This example describes another exemplary embodiment 1100 (hereinafter, saw system 1100) of gauge system 50; see FIGS. 35-47.

FIG. 35 shows saw system 1100 arranged generally as shown in FIG. 3 for saw system 180. Saw system 1100 is a modified version of saw system 180 (see FIG. 3) and may contain any combination of the components already described above for saw system 180 (and/or gauge system 50), but with a number of modifications and additions. First, saw system 1100 may utilize latches, such as draw latches 1102, to attach power module 212 to beam 215. The draw latches may replace fasteners 254 (e.g., see FIGS. 8 and 9). Second, saw system 1100 may include distinct bracket assemblies 1104 that mount beam 215 to saw stand 182. Bracket assemblies 1104 may be utilized in place of or in addition to bracket assemblies 214 (e.g., see FIGS. 28 and 29). Third, saw system 1100 may (or may not) include an accessory support leg 1106 on which beam 215 may be mounted. Fourth, saw system 1100 may incorporate a stop assembly 1108 that is configured for use with crown molding. Stop assembly 1108 may replace stop assembly 326 or 690, among others (e.g., see FIGS. 5 and 21-23).

Figure 36:
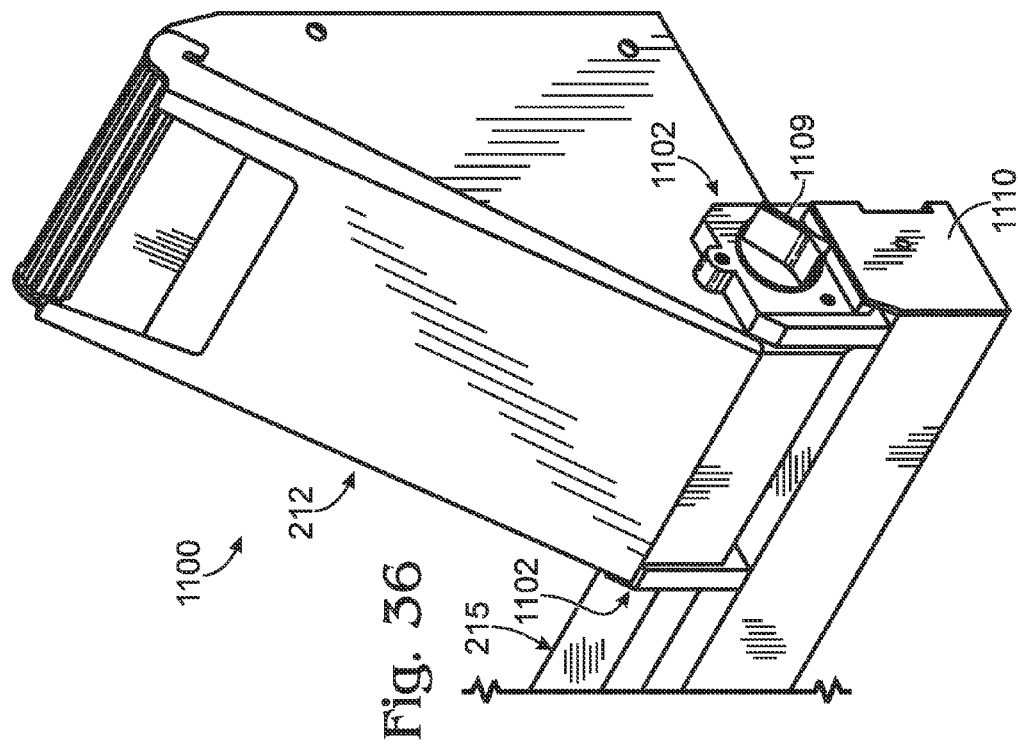
FIG. 36 is a fragmentary view of the saw system of FIG. 35, taken generally around a power module attached to a rail module with draw latches that each include a cam lever, in accordance with aspects of the present disclosure.

FIG. 36 shows power module 212 attached to beam 215 with latches 1102. Each latch may include a cam lever 1109 with an over-center action that retains the latch in a closed position on the beam until urged into the open position by a user. Each latch may be described as a clamp (or a mount) that is adjustable between open and closed positions. In the open position, the latch may be received on beam 215, and in the closed position, the latch may be engaged with beam to restrict removal and/or motion of the latch with respect to the beam. Latches 1102 may have the same structure, as shown here, to permit the same latch to be attached and used on opposing sides of the power module, or the latches may have distinct structure on opposing sides.

Figure 37:
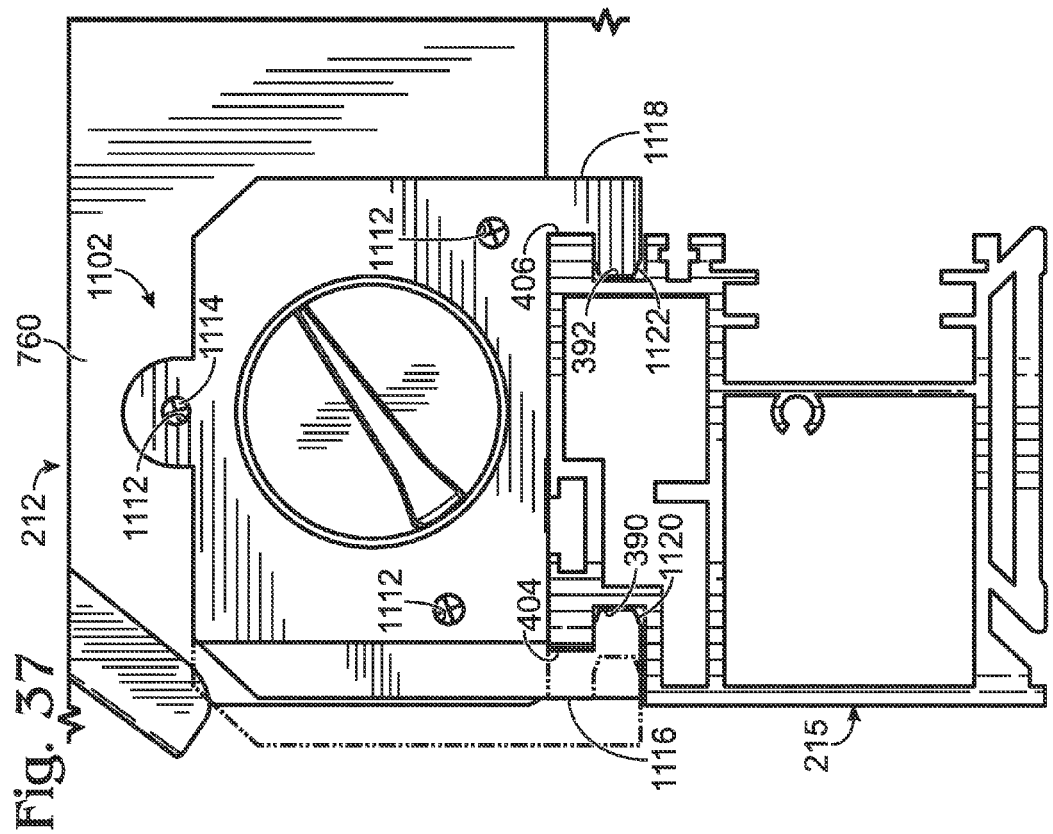
FIG. 37 is another fragmentary view of the saw system of FIG. 35, taken at elevation toward one of the latches after removal of an end cap from a beam of the rail module, with selected components not shown to simplify the presentation.

FIG. 37 shows rightward latch 1102 at elevation in a closed position on beam 215. An open position of latch 1102 is indicated in phantom outline. In this view, an end cap 1110 (see FIG. 36) has been removed from the end of the beam to simplify the presentation. Latches 1102 each may define a plurality of openings 1112 to receive fasteners 1114, such as screws. The fasteners may attach the latches to power module 212, on opposing sides (e.g., left and right side walls) of housing 760 of the power module.

Latch 1102 may utilize a pair of jaws, such as a movable jaw 1116 and a fixed jaw 1118, to provide attachment to beam 215. The jaws may be received on opposing ridges 404, 406 of the beam, with flanges 1120, 1122 of the jaws received in channels 390, 392 of beam 215. The jaws thus may be described as forming respective hooks that hook the latch (and the power module) onto the beam.

Figure 38A:
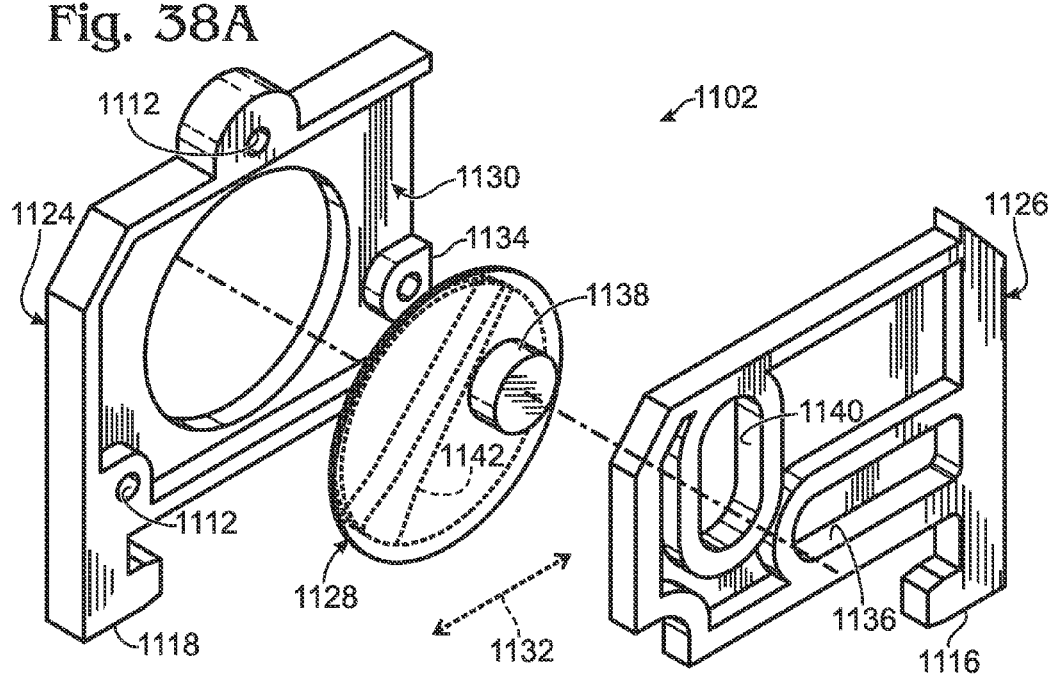
FIG. 38A is an exploded view of either latch of FIG. 36, taken generally from above and from an inner side of the latch that faces the power module.
Figure 38B:
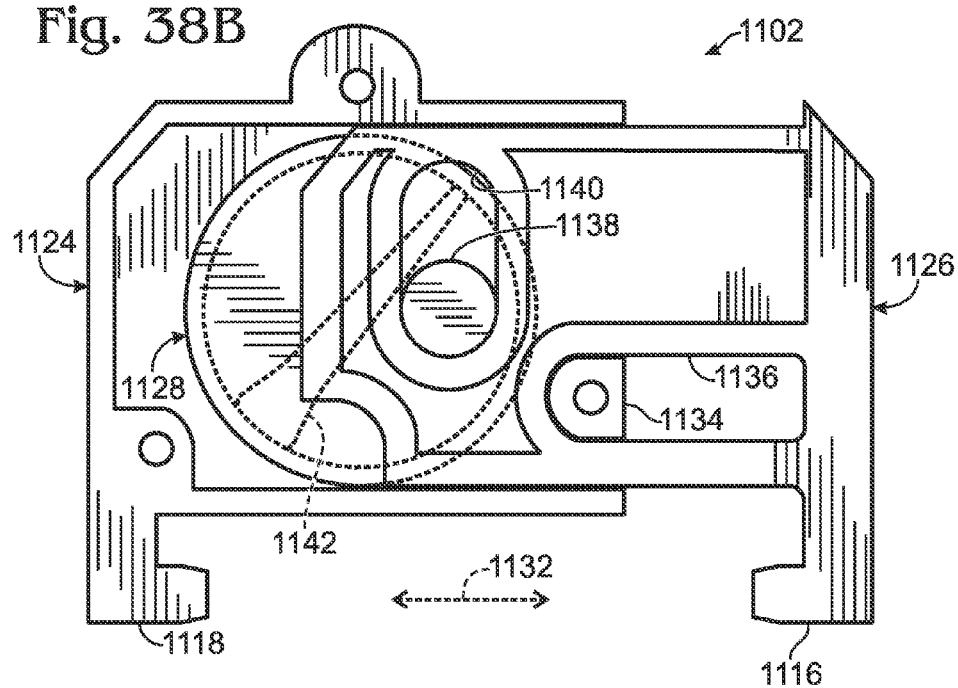
FIG. 38B is another view of the latch of FIG. 38A, taken from the inner side of the latch after assembly of the latch and with the latch in an open position.

FIGS. 38A and 38B show respective exploded and assembled views of latch 1102 taken from an inner side of the latch that faces power module 212. The latch is disposed in the open position in FIG. 38B. Latch 1102 may incorporate a fixed member 1124 forming fixed jaw 1118, a slidable member 1126 forming movable jaw 1116, and a cam member 1128 disposed between members 1124, 1126.

Fixed member 1124 may be secured to the power module (see FIG. 37) to define a cavity or track 1130 that guides linear motion of slidable member 1126 along an axis 1132. The fixed member also may form a boss 1134 received in a horizontal slot 1136 defined by slidable member 1126, to further guide the linear motion of the slidable member. In any event, reciprocative linear motion of member 1126 opens and closes the jaws of the latch.

Cam member 1128 may be pivotable about its central axis to adjust the jaws between open and closed positions. The cam member may provide an eccentric projection 1138 that is received in a vertical slot 1140 defined by slidable member 1126. Accordingly, rotation of the cam member repositions eccentric projection 1138 along slot 1140, which drives slidable member 1126 along axis 1132. The cam member may provide a graspable handle 1142, which may function as part of cam lever 1109, which permits the cam member to be rotated manually, to open and close the latch. Projection 1138 and slot 1140 may be arranged to provide the over-center action offered by cam lever 1109.

Figure 39:
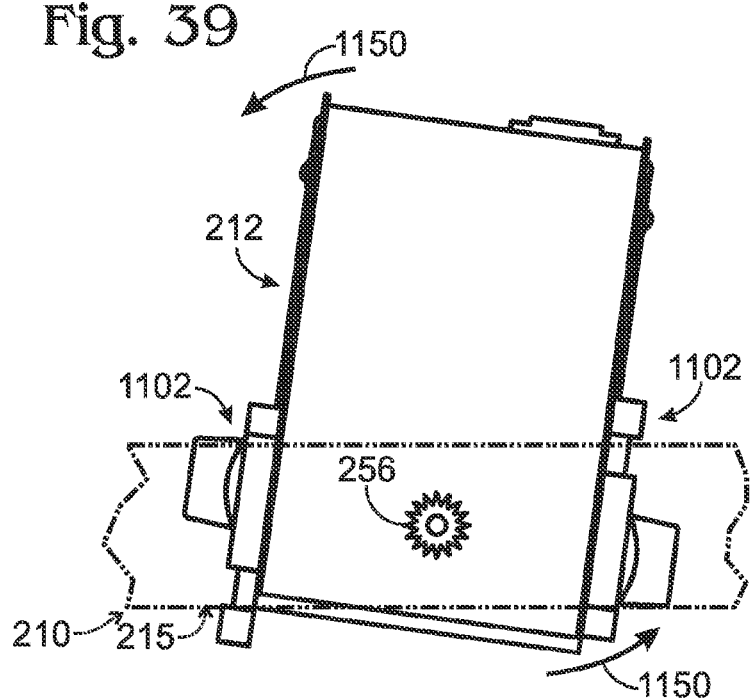
FIG. 39 is a bottom view of the power module and latches of FIG. 36 with the power module in a skewed position produced immediately after mating the power module with the rail module and before closing the latches.
Figure 40:
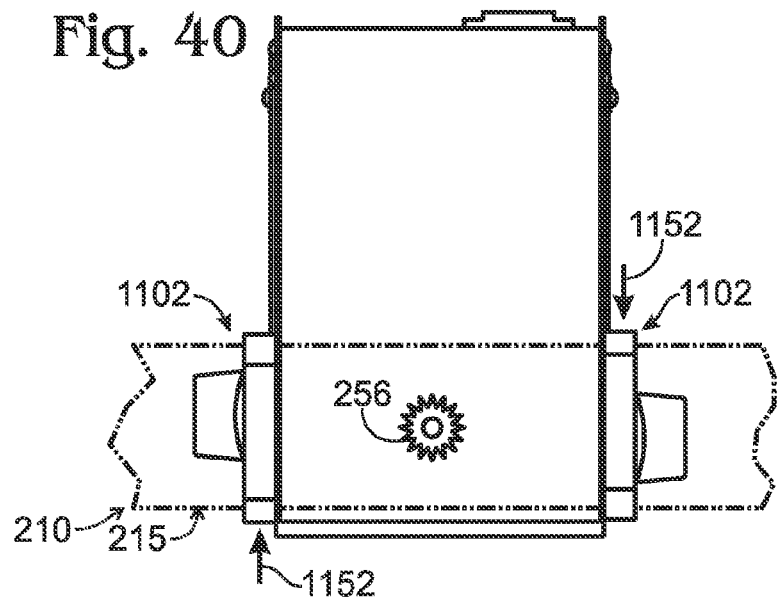
FIG. 40 is a bottom view of the power module and latches of FIG. 36, taken as in FIG. 39, but after rotating the power module into alignment with the beam of the rail module and after closing the latches.

FIGS. 39 and 40 show how latches 1102 may be received on and closed against beam 215 of rail module 210. In FIG. 39, power module 212 is viewed from the bottom and has been mated with rail module 210, to engage shaft 256 with a pulley mounted in the rail module. At this point, power module 212 may be disposed in a skewed position, as shown, that provides sufficient clearance for both latches 1102 to be received on beam 215. The power module then may be pivoted, indicated at 1150, into alignment with the beam. FIG. 40 shows power module aligned with beam 215 and with both latches 1102 closed, indicated by arrows at 1152, against beam 215. The latches may stabilize the power module on the rail module by restricting pivotal motion of the body of the power module as shaft 256 is rotated, and by preventing upward motion of the power module, thereby blocking any bouncing of the power module on the rail module, which could uncouple shaft 256 from the pulley.

Figure 41:
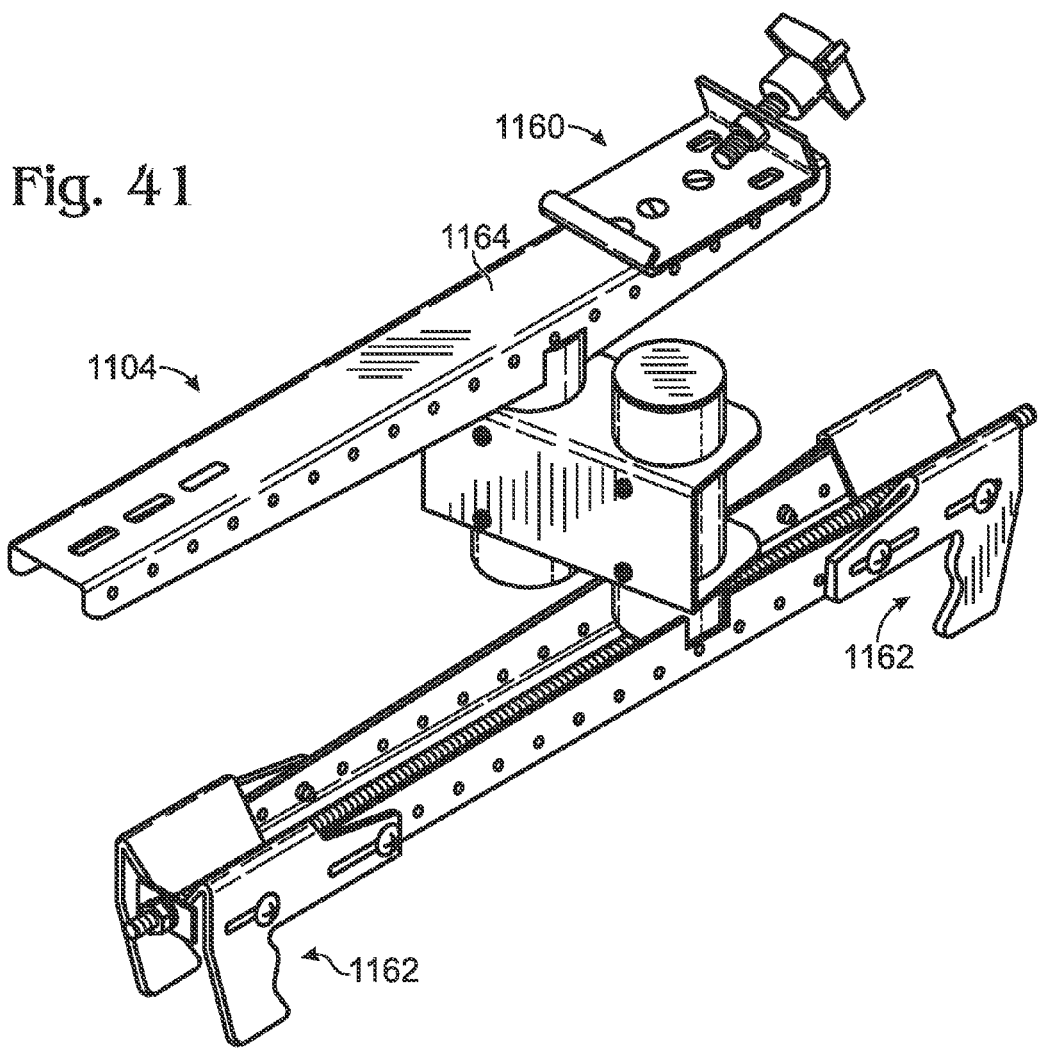
FIG. 41 is a view of a bracket assembly from the system of FIG. 35, taken in isolation from other system components, in accordance with aspects of the present disclosure.

FIG. 41 shows bracket assembly 1104 for connecting beam 215 to a base frame, such as a saw stand. Bracket assembly 1104 may include an upper beam mount 1160 and a lower beam mount 1162. Upper beam mount 1160 may be utilized to mount beam 215 on the bracket assembly. Lower beam mount 1162 may be utilized to mount bracket assembly 1104 on a beam of the base frame (e.g., beam 188 of the saw stand in FIG. 3). Each beam mount may be described as a clamp. The bracket assembly also may provide a shelf 1164 on which workpieces may be placed and supported. Shelf may project forward (at least generally toward the user) from upper beam mount 1160, and thus forward from beam 215 when the beam is mounted to upper beam mount 1160.

Figure 42:
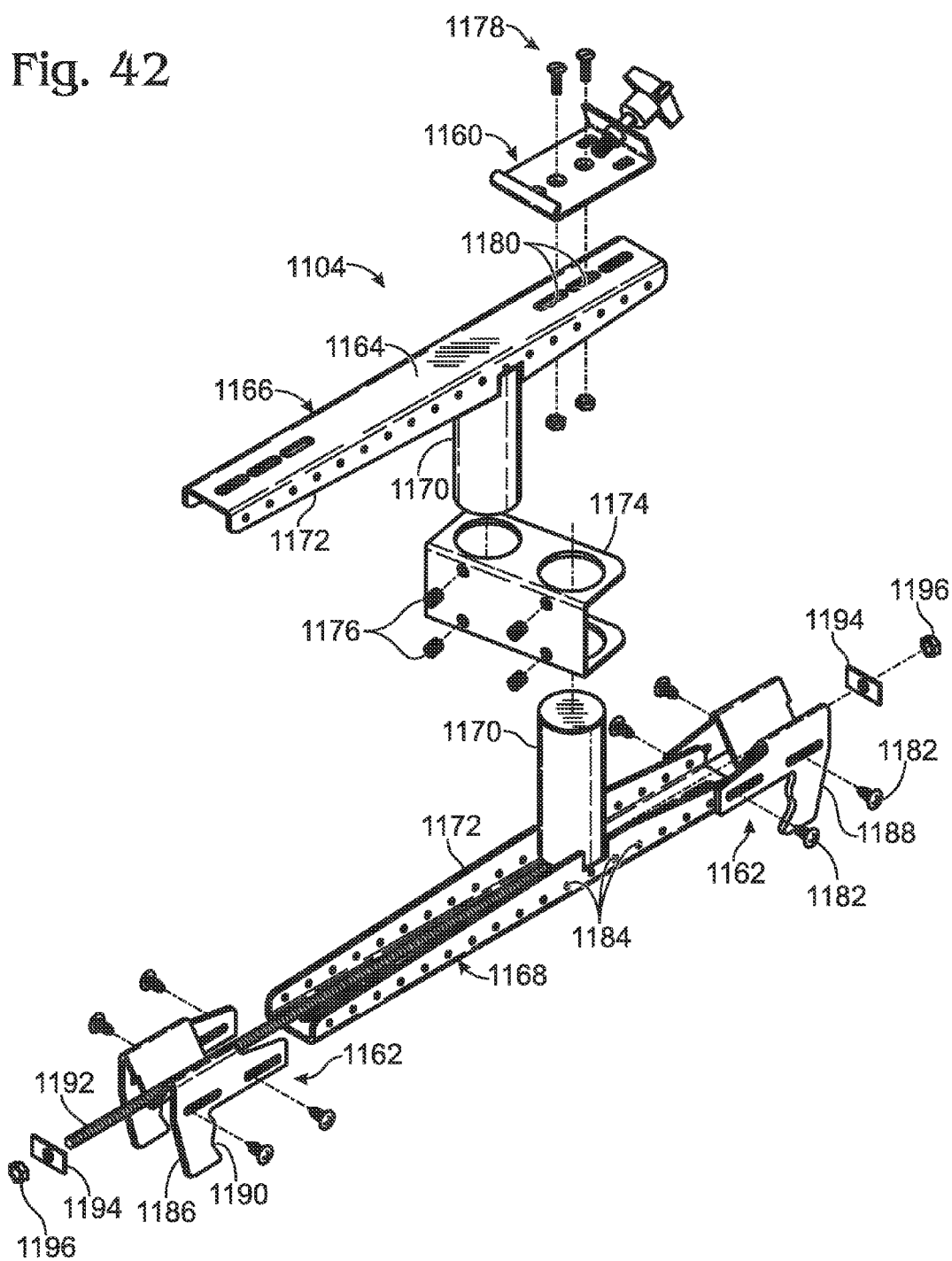
FIG. 42 is an exploded view of the bracket assembly of FIG. 41.

FIG. 42 shows an exploded view of bracket assembly 1104. The bracket assembly may include upper and lower T-supports 1166, 1168. The T-supports may be inverted relative to one another. Each T-support may include a leg 1170 projecting from a head 1172. T-supports 1166, 1168 may be adjustably connected to one another by a yoke 1174 that receives legs 1170. Each leg may slide axially and pivot in yoke 1174 until fixed in position by set screws 1176. Accordingly, bracket assembly 1104 may permit adjustment of the relative positions of the beam mounts, by changing their relative heights (vertical spacing), lateral positions, longitudinal positions, and/or angular dispositions. Thus, bracket assembly 1104 may permit rail module 210 and shelf 1164 to be adjustably disposed to provide alignment with various configurations of tools, tool fences, tool decks, etc.

Upper and lower beam mounts 1160, 1162 may be attached to heads 1172 of T-supports 1166, 1168, respectively. The upper beam mount may be attached with fastener assemblies 1178. Slots 1180 defined by head 1172 may permit the upper beam mount to be secured over a range of positions along the head. Lower beam mount 1162 may be attached with self-tapping screws 1182 received in any of a series of apertures 1184 arranged along the head of T-support 1168.

Lower beam mount 1162 may be formed by a pair of jaw members 1186, 1188. Each jaw member may supply at least one contoured surface 1190 for contact with a side of the beam. Each contoured surface may be wavy or sinuous in profile, which may enable the lower beam mount to mate with beams of different cross-sectional shape (e.g., for use with tool stands from different manufacturers). In some embodiments, each contoured surface may form at least two notches arranged generally along a vertical axis relative to one another. Each jaw member may be shaped to be received on the head of T-support 1168 and to project below the head on opposing sides thereof. In exemplary embodiments, each jaw member may be generally M-shaped. The jaw members may be driven toward each other, prior to placement of screws 1182, using an assembly of a threaded rod 1192, washers 1194, and nuts 1196. The rod may be positioned over the central fold of each jaw member, and washers 1194 engaged with ends of the jaw members by advancement of nuts 1196 toward one another. Once a desired engagement of the frame beam is attained, screws 1182 may be installed to fix the jaw members to lower T-support 1168.

Figure 43:
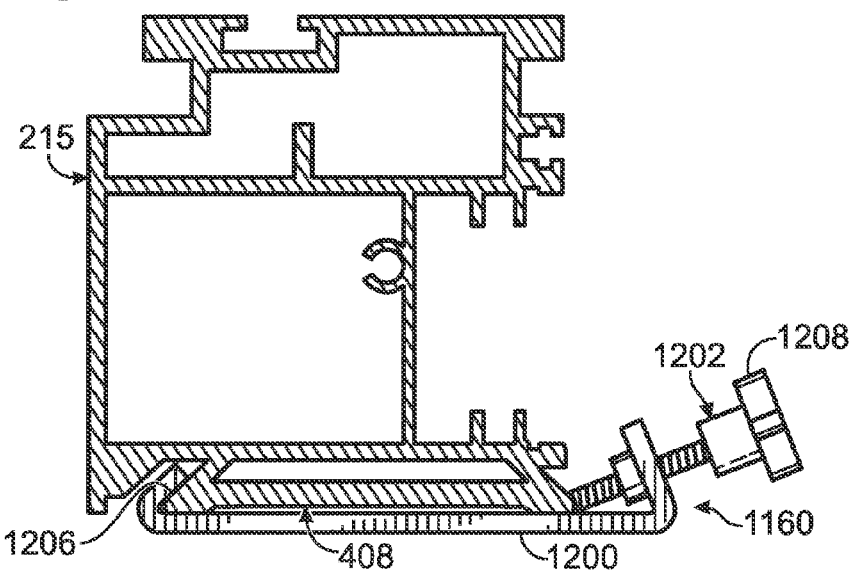
FIG. 43 is a side view of a rail mount of the bracket assembly of FIG. 42 with the rail mount secured to a beam of the system of FIG. 35, in accordance with aspects of present disclosure.

FIG. 43 is a side view of upper beam mount 1160 attached to beam 215. Beam mount 1160 may form a receiver for dovetail projection 408 of the beam and may opposingly engage the dovetail projection. The upper beam mount may include a base 1200 and an adjustable member 1202 in threaded engagement with the base. The base may, for example, be a bent plate that forms an elbow which is complementary to a ridge 1206 formed by projection 408. Adjustable member 1202 may include a graspable handle or knob 1208 that allows a user to secure and release beam 215 manually. The upper beam mount may, optionally, be used without other components of bracket assembly 1104, to attach beam 215 more directly to a frame, such as to a platform (e.g., a table or work bench) using fasteners extending through openings of base 1200 and into the platform.

FIG. 44 shows accessory support leg 1106 in isolation from other system components. The support leg may include beam mount 1160 attached to a shelf member 1220 on which workpieces may be supported. The height of the support leg may be adjusted by operation of a set screw assembly 1222. Use of support leg 1106 in a gauge system may be suitable when utilizing a longer rail module 210, longer workpieces, a more spaced configuration of the near end of the rail module from the processing tool, or a combination thereof, among others.

FIGS. 45-47 show selected aspects of stop assembly 1108 of saw system 1100. The stop assembly may be equipped with a stop foot 1230, which is shown here abutted with a miter-cut end 1232 of a piece of crown molding 1234. Stop foot 1230 may include a stop plate 1236 connected to a stop bar 1238 and forming a transverse fence to abut miter-cut end 1232 (or a square-cut end) of the crown molding, such as a tip 1240 of the miter-cut end (see FIG. 47). Stop plate 1236 may be attached, at its base, to a ledge 1242 projecting from an abutment surface of the stop plate, toward the crown molding and thus generally toward the origin of the measurement axis. Ledge 1242 may support miter-cut end 1232 and particularly tip 1240.

Stop foot 1230 also may be equipped with a lateral fence 1244 connected slidably to stop plate 1236, for motion along a transverse axis that is orthogonal to the measurement axis. The lateral fence may be fixed in position at a selected site along the transverse axis by operation of a set screw 1246. The spacing of lateral fence 1244 from beam 215 may be indicated by a dimension scale 1248 formed on the face of the stop plate. Accordingly, an effective width of crown molding 1234, measured parallel to the horizontal transverse axis of the system, may be read from the dimension scale.

FIG. 46 shows how crown molding 1234 may be situated with respect to stop foot 1230 and beam 215. Crown molding generally is designed to form a decorative border around the ceiling of a room by covering the interface region where the walls meet the ceiling. An exemplary structure for crown molding is presented in FIG. 46, with the crown molding upside down relative to how it is typically installed. The crown molding may have a decorative outer surface 1260 that faces into the room and an inner surface 1262 that faces the wall and the ceiling at the interface region. The inner surface may include a wall flat 1264 that abuts the wall when installed, a ceiling flat 1266 that abuts the ceiling, and an intermediate region 1268 that is spaced from the wall and ceiling to form a cavity adjacent the interface region when the crown molding is installed. The crown molding may be disposed at a spring angle 1270, namely, the angle formed between the crown molding and the wall, when installed. Exemplary spring angles include 38, 45, and 52 degrees, among others.

The crown molding may be cut while lying flat or propped at an angle. If cut while lying flat, the saw may be pivoted about a horizontal axis to angle the saw for a non-vertical cut. If while propped at an angle, the crown molding may be propped up at its spring angle, except upside down, as shown in FIG. 46. Also, the saw may be pivoted about a vertical axis to angle the saw for a vertical cut oriented obliquely to the long axis of the crown molding. Stop foot 1230, and particularly ledge 1242 and lateral fence 1244, may hold the end of a piece of crown molding at its spring angle against beam 215 while performing a miter cut, with ceiling flat 1266 supported, in part on ledge 1242, and wall flat 1264 abutted with beam 215. Alternatively, or in addition, a user may use a lateral fence disposed elsewhere along a saw system and/or may manually support the crown molding against beam 215 at the spring angle.

Example 2. Exemplary Miter Compensation for Crown Molding

This example describes illustrative miter offsets that may be applied, by the saw systems disclosed herein, to entered target lengths for pieces of crown molding; see FIGS. 48-53.

Figure 48:
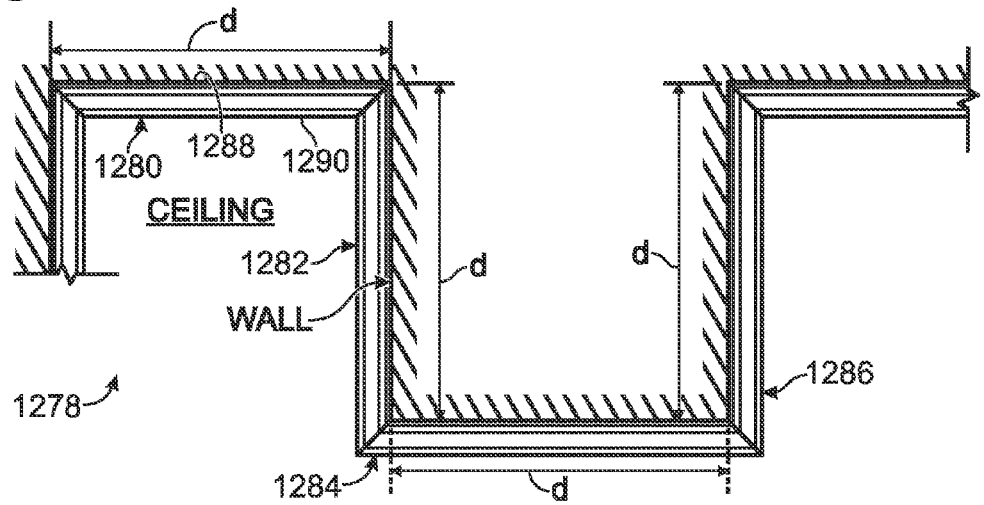
FIG. 48 is a somewhat schematic, sectional view of a portion of a room taken through walls of the room toward its ceiling, with crown molding installed to cover the interface between the walls and the ceiling.

FIG. 48 shows a somewhat schematic, sectional view of a portion of a room 1278 taken through walls (shown hatched) toward the ceiling, with pieces of crown molding 1280-1286 installed to cover a junction region between the walls and the ceiling. Prior to cutting and installation of pieces 1280-1286, a worker generally measures corner-to-corner distances for the walls at the interface region to generate a cut list composed of a set of target lengths for pieces of crown molding to be cut. (The worker also may measure the angle of each corner (e.g., with an angle finder), to allow determination of a miter angle at which each cut should be made.) To simplify the presentation, each corner-to-corner dimension is the same, and is labeled as "d" in FIG. 48. Each corner-to-corner distance is the target dimension for a wall side 1288 of a cut product (e.g., piece 1280). However, the target dimension for a ceiling side 1290 of the same cut product may be shorter, longer, or the same as the target dimension for wall side 1288, based on the orientation and angle of the miter cuts at the ends. For example, the wall-side length (the "long point" or the greatest axial dimension) of piece 1280 is greater than the ceiling-side length (the "short point" or the smallest axial dimension); the wall-side and ceiling-side lengths of each of pieces 1282 and 1286 are the same (if the miter angles are the same); and the wall-side length (the short point) is less than the ceiling-side length (the long point) of piece 1284. Therefore, the wall dimensions measured by a worker may need to be corrected in some cases and not others to generate cut products with the desired target dimensions on both wall and ceiling sides of each cut product.

Figure 49:
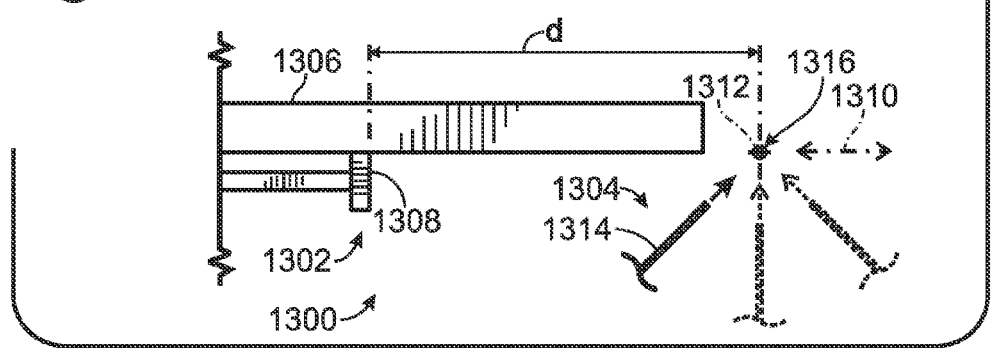
FIG. 49 is a schematic view of an exemplary saw system including a positioner and a miter saw and illustrating how a distance from a stop to an origin of a measurement axis may be defined with respect to cutting paths and a pivot axis of the miter saw, in accordance with aspects of present disclosure.

FIG. 49 shows in schematic form an exemplary saw system 1300 including a positioner 1302 and a miter saw 1304. Positioner 1302 may include a rail 1306 and a stop 1308 driven back and forth along the rail and along a measurement axis 1310. Positioner 1302 may have any of the features discloses elsewhere herein for a positioning apparatus/positioner, such as a controller to calculate and implement miter compensations. Saw 1304 may pivot about a vertical pivot axis 1312 to orient a blade 1314 of the saw (and cutting paths thereof) at different angles with respect to measurement axis 1310, to provide square and miter cuts. An origin 1316 of measurement axis 1310 may be defined by intersection of axes 1310 and 1312. A dimension or distance ("d") from stop 1308 to origin 1316 may be measured along the measurement axis. With square cuts on both ends, distance "d" measured by the system generally corresponds to the entered target dimension of a product to be cut from a workpiece. However, with miter cuts, distance "d" may correspond to a modified form of the entered target dimension, as described below.

Figure 50:
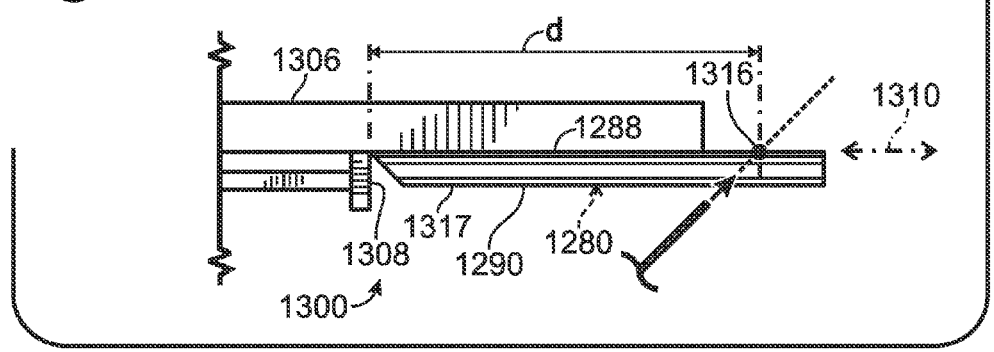
FIG. 50 is another schematic view of the saw system of FIG. 49 with the system arranged to cut, without application of a miter offset by the positioner, a piece of crown molding that will extend from an inside corner to another inside corner in the room of FIG. 48, in accordance with aspects of present disclosure.

FIG. 50 shows saw system 1300 arranged to cut a pre-cut piece 1317 of crown molding to generate cut piece 1280, which will extend from one inside corner to another in room 1278 of FIG. 48. Wall side 1288 of the crown molding may be disposed near or intersecting measurement axis 1310, while ceiling side 1290 may be spaced from the measurement axis by the effective (horizontal) width of the crown molding as supported at the spring angle against rail 1306. Since wall side 1288 extends to stop 1308 and substantially through origin 1316, no application of a miter offset by the positioner is needed.

Figure 51:
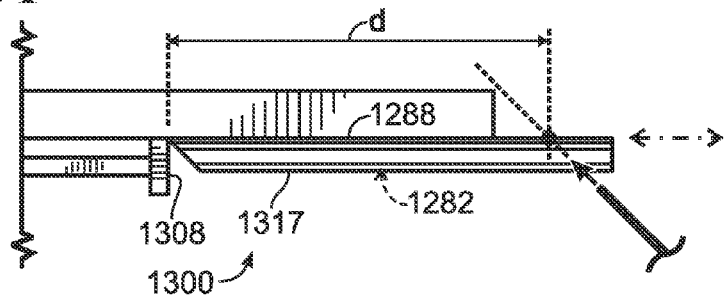
FIG. 51 is yet another schematic view of the saw system of FIG. 49 with the system arranged to cut, without application of a miter offset by the positioner, a piece of crown molding that will extend from an inside corner to an outside corner in the room of FIG. 48, in accordance with aspects of present disclosure.

FIG. 51 shows saw system 1300 arranged to saw pre-cut piece 1317 to generate cut piece 1282, which will extend from an inside corner to an outside corner in room 1278 of FIG. 48. Wall side 1288 extends to stop 1308, so no application of a miter offset by the positioner is needed.

Figure 52:
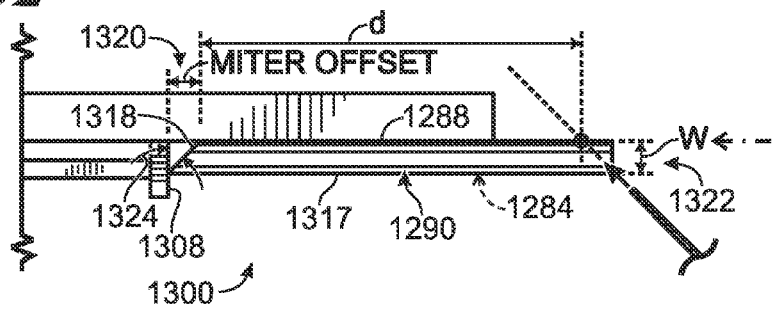
FIG. 52 is still another schematic view of the saw system of FIG. 49 with the system arranged to cut, after application of a miter offset by the positioner, a piece of crown molding that will extend from an outside corner to another outside corner in the room of FIG. 48, in accordance with aspects of present disclosure.

FIG. 52 shows saw system 1300 arranged to saw pre-cut piece 1317 to generate cut piece 1284, which will extend from one outside corner to another in room 1278 of FIG. 48. Wall side 1288 does not extend to stop 1308 because ceiling side 1290 is longer than the wall side at a miter-cut end 1318 of the stock piece, which causes the miter-cut end to space wall side 1288 from stop 1308. Accordingly, the saw system needs to apply a miter offset 1320. In particular, a controller of the system may determine and apply an appropriate miter offset, for addition to (or subtraction from) target dimension "d," based on an effective width 1322 ("w") of the crown molding and an angle 1324 formed by miter-cut end 1318. For example, the controller may calculate the miter offset as width 1322 multiplied by the tangent of miter angle 1324. Alternatively, the miter angle may be defined as 90 degrees minus angle 1324, in which case width 1322 would be divided by the tangent of the miter angle to determine the miter offset. In any event, a worker may determine a suitable value for the miter angle using, for example, an angle finder. A value for a corner angle may be measured with the angle finder, the value halved, and then used as the miter angle directly or subtracted from 90 degrees to obtain the miter angle.

More generally, for any miter compensation, an angle value received by the controller and/or entered by a user may be related to the miter angle: the angle value may be the miter angle for one or both ends of the product or may allow the controller to determine the miter angle based on the angle value (e.g., by dividing by two, subtracting the angle value from 90 degrees, or a combination thereof, among others).

Figure 53:
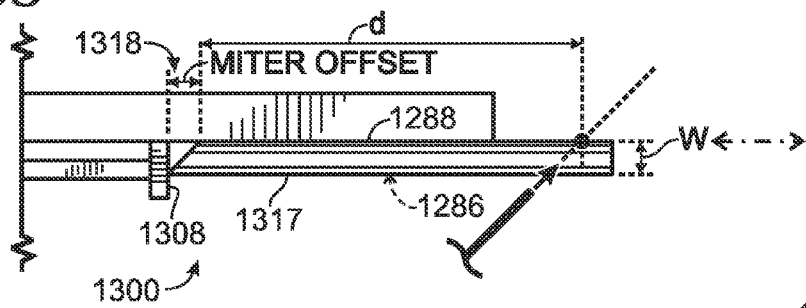
FIG. 53 is a somewhat schematic view of the saw system of FIG. 49 with the system arranged to cut, after application of a miter offset by the positioner, a piece of crown molding that will extend from an outside corner to an inside corner in the room of FIG. 48, in accordance with aspects of present disclosure.

FIG. 53 shows saw system 1300 arranged to saw pre-cut piece 1317 to generate cut piece 1286, which will extend from an outside corner to an inside corner in the room of FIG. 48. As in FIG. 52, wall side 1288 is not abutted with stop 1308, so the system needs to apply miter offset 1318. As for piece 1284, a controller of the system may determine and apply an appropriate miter offset to add to entered target dimension "d" based on an effective width of the crown molding and an angle entered, received, or determined (including assumed by default), which corresponds to the miter angle of the miter-cut end adjacent stop 1308.

Example 3. Exemplary Miter Compensation for Casing Molding

This example describes illustrative miter offsets that may be applied to entered target lengths for casing molding by the saw systems disclosed herein; see FIGS. 54-57. The principles disclosed in this Example also or alternatively may be applied to miter compensation for baseboards.

Figure 54:
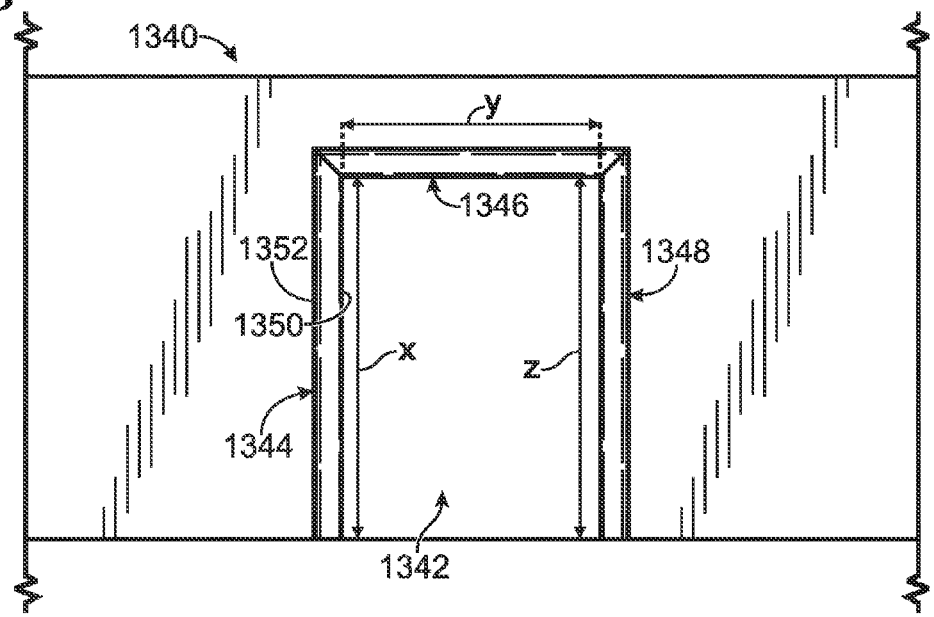
FIG. 54 is a somewhat schematic view of a doorway formed in a wall and with the doorway framed with casing molding.

FIG. 54 shows a somewhat schematic view of a wall 1340 defining a doorway 1342 framed with pieces of casing molding 1344-1348. In particular, the left jamb of doorway 1342 is covered by left piece 1344, the lintel by top piece 1346, and the right jamb by right piece 1348. Before cutting and installation of pieces 1344-1348, a worker may measure the dimensions of the doorway. The dimensions adjacent the left jamb, lintel, and right jamb are designated in FIG. 54 as "x," "y," and "z," which are the target inside dimensions or short points for a door side (or inner side) 1350 of pieces 1344-1348, respectively. The target outside dimensions or long points for an opposing wall side (or outer side) 1352 of pieces 1344-1348 are different from their respective target inside dimensions.

Figure 55:
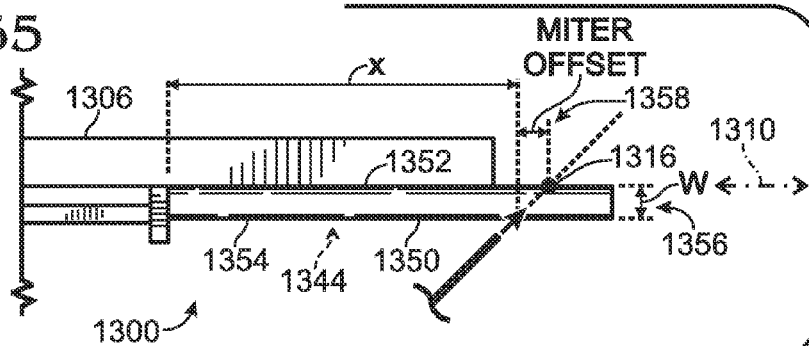
FIG. 55 is a schematic view of the saw system of FIG. 49 with the system arranged to cut, after application of one miter offset by the positioner, a piece of casing molding for the left jamb or left stile of the doorway of FIG. 54, in accordance with aspects of present disclosure.

FIG. 55 shows saw system 1300 arranged to cut a stock piece 1354 of casing molding to generate cut piece 1344 for the left jamb of the doorway. The stock piece may be arranged to place a shear cut: stock piece 1354 may be situated with prospective outer side 1352 adjacent rail 1306 and with prospective inner side 1350 spaced from rail 1306. Accordingly, outer side 1352 is disposed at least substantially on or near measurement axis 1310, while inner side 1350 is spaced from axis 1310 by a width 1356 of stock piece 1354. As a result, the entered inside dimension, "x," may need to be corrected for a miter offset 1358 adjacent origin 1316, to produce the desired outer or outside dimension for cut piece 1344 along outer side 1352.

Figure 56:
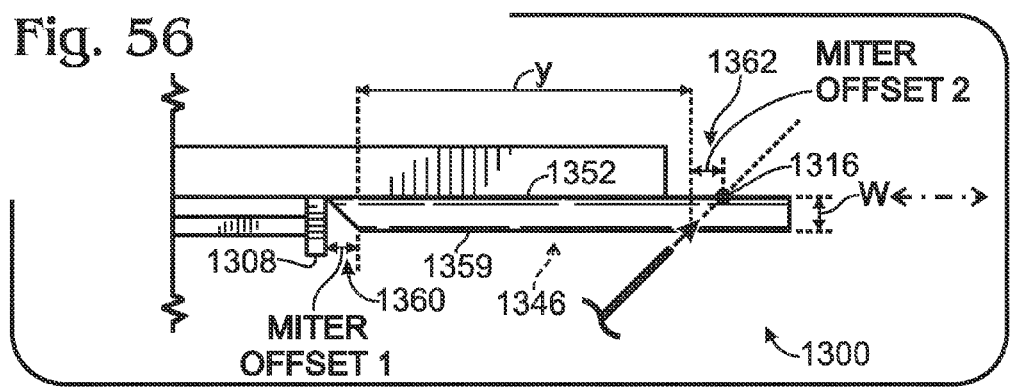
FIG. 56 is another schematic view of the saw system of FIG. 49 with the system arranged to cut, after application of two miter offsets by the positioner (one for each end), a piece of casing molding for the header or lintel of the doorway of FIG. 54, in accordance with aspects of present disclosure.

FIG. 56 shows saw system 1300 arranged to cut a pre-cut piece 1359 of casing molding to generate cut piece 1346 for the lintel of the doorway. Pre-cut piece 1359 may be situated to place a shear cut as in FIG. 55. As a result, the entered inside dimension, "y," may need to be corrected for two miter offsets 1360, 1362, adjacent stop 1308 and origin 1316, respectively, to produce the desired outer dimension for cut piece 1346 along outer side 1352.

Figure 57:
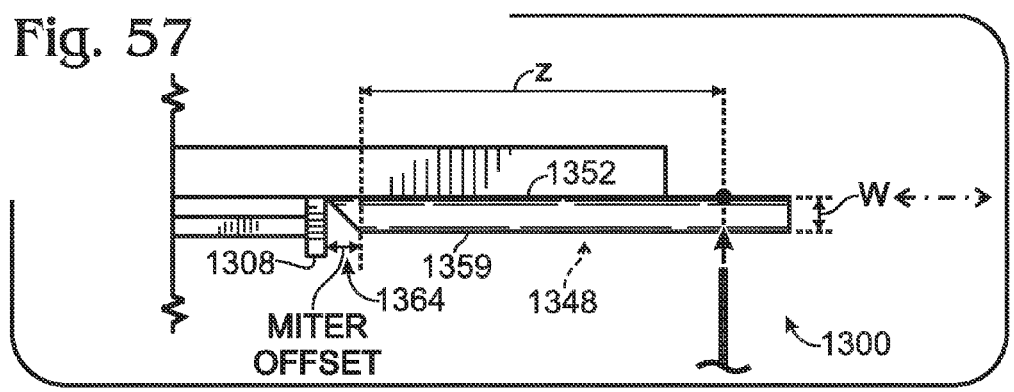
FIG. 57 is yet another schematic view of the saw system of FIG. 49 with the system arranged to cut, after application of one miter offset by the positioner, a piece of casing molding for the right jamb or right stile of the doorway of FIG. 54, in accordance with aspects of present disclosure.

FIG. 57 shows saw system 1300 arranged to cut a pre-cut piece 1359 of casing molding to generate cut piece 1348 for the right jamb of the doorway. Pre-cut piece 1359 may be situated as in FIG. 56, but to place a square cut. As a result, the entered inside dimension, "z," may need to be corrected for a miter offset 1364 adjacent stop 1308, to produce the desired outer dimension for cut piece 1348 along outer side 1352.

The target position of a stop for a target length adjusted for at least one miter cut may be calculated as follows for the three types of mitered products described in this Example, with theta being the miter angle and having a value of zero for a square cut:

$$\text{Target position (adjusted)}=\text{target length}+\tan(\theta)*\text{width}+[x/y]\text{-offset}; \quad (1)$$

OR $$\text{Target position (adjusted)}=\text{target length}+2*\tan(\theta)*\text{width}+z\text{-offset}. \quad (2)$$

In other words, one miter offset (tan(theta)*width) may be applied for "x," and "z" products and two miter offsets (2*tan(theta)*width) for "y" products. The [x/y]-offset and the z-offset represent additional, optional offsets (usually set to zero) that may be set by a user when performing the corresponding type of miter cut. This is in case, for example, the saw is slightly offset when turned in one direction relative to the other, such as slightly offset when turning to the left (x and y cuts), relative to when turning to the right (z cuts), or vice versa.

Example 4. Exemplary Algorithms for Tangent Approximation

This example describes exemplary algorithms for calculating an approximate value for the tangent of a selected angle.

The controller may calculate one or more suitable miter offsets to apply to an entered and/or calculated target dimension, to obtain an adjusted dimension, as described elsewhere herein, such as in Examples 2 and 3, among others. The calculation for each miter offset generally involves multiplying or dividing the width of a workpiece by the tangent of a miter angle formed or to be formed at an end of the workpiece or a product thereof. Either multiplication or division is used for the calculation based on how the miter angle is defined. If a square cut is defined as having a miter angle of zero degrees, multiplication is used, while if a square cut is defined as having a miter angle of 90 degrees, division is used. Also, since the sine of an angle divided by its cosine yields the angle's tangent, the width may be multiplied or divided by the tangent of the miter angle by multiplying (or dividing) by the sine of the miter angle and dividing (or multiplying) by the cosine of the miter angle. If the miter angle is 45 degrees, the width is equal to the miter offset, since the tangent of 45 degrees is one. In any event, the tangent of the miter angle may be entered by a user, may be obtained from a look-up table stored in the controller, and/or may be approximated using an algorithm executed by the controller.

The tangent of an angle may be expressed as a Taylor series. A Taylor series is the sum of an infinite number of terms, with the terms getting progressively smaller, to provide convergence to some regular value. A Taylor polynomial, containing a finite number of terms taken from the beginning of a Taylor series, may provide an approximation to the regular value. However, the Taylor series for tangent may be difficult to use in a tangent calculation. Instead, Taylor polynomials for approximating sine and cosine may be utilized by the controller to determine an approximate tangent value. Accordingly, the controller may evaluate terms of respective Taylor polynomials generated from corresponding Taylor series for sine and cosine. Moreover, the controller may be programmed to execute a loop iteratively, where one of the terms of the Taylor polynomials for sine and/or cosine is determined with each execution of the loop.

The conventions used below are as follows: (1) X^Y means X raised to the Y power, so X-squared would be written as X^2; (2) X! means X factorial, so 4! would be 4*3*2*1=24; (3) X % Y means X modulo Y, where X is divided by Y and the remainder is given as the result. The most common usage of the modulo function is X % 2, which is 0 for even values of X, and 1 otherwise.

The Taylor series for sine and cosine are as follows:

$$\text{sine} = x - (x^3)/3! + (x^5)/5! - (x^7)/7! + (x^9)/9! - \ldots$$

$$\text{cosine} = 1 - (x^2)/2! + (x^4)/4! - (x^6)/6! + (x^8)/8! - \ldots$$

An algorithm for generating approximations of sine, cosine, and tangent is as follows:

Set up: (1) given an angle, X, in degrees, convert X to radians; (2) set a temporary variable, T, to 1; (3) set Sin and Cos variables to 0; and (4) set a counting variable, n, to 0.

Begin Cycle: (1) add T to Cos, so Cos=1; (2) add 1 to n, so n=1; (3) multiply T by (X/n), so T=X/1; (4) add T to Sin, making Sin=X; (5) multiply T by −1, so for the next cycle, the additions to Sin and Cos are subtractions; (6) add 1 to n, so n=2; (7) multiply T by (X/n), so T=(X^2)/2!; (8) go back to Begin Cycle, until the accuracy is sufficient.

Since Tan=Sin/Cos, approximate values for all three functions have been determined.

Computer code in the C language follows for performing the steps listed above. The cycle may be executed any suitable number of times, such as eight times (two steps per cycle with eight cycles gives a limit on the counting variable of 16). The code is very compact and takes up very little storage space in a controller where such space is limited.

Code 1:

```
float tangent(float degrees)
{
    float sine = 0.0, cosine = 0.0, temp = 1.0;
    char i = 0;
    degrees *= 0.0174532925;
    for(i=0; i<16; i++)
    {
        if(i%2 == 0)
        {
            cosine += temp;
        }
        else
        {
            sine += temp;
            temp *= -1;
        }
        temp *= degrees / (i+1);
    }
    return (sine / cosine);
}
```

The following code (Code 2) is functionally identical to Code 1, but has 16 fewer additions [from (i+1)], 16 fewer divisions [from (i % 2)], but 16 more bit- and operations (which are faster than modulo ones, but in this case have the same effect, returning one when odd, zero when even).

Code 2:

```
float tangent(float degrees)
{
    float sine = 0.0, cosine = 0.0, temp = 1.0;
    char i;
    degrees *= 0.0174532925;
    for(i=1; i<=16; i++)
    {
        if( (i & 0x01) == 1)
        {
            cosine += temp;
        }
        else
        {
            sine += temp;
            temp *= -1;
        }
        temp *= degrees / i;
    }
    return (sine / cosine);
}
```

Example 5. Selected Embodiments

This example describes selected aspects and embodiments of the present disclosure as a set of indexed paragraphs.

1. A gauge system for workpiece processing using a tool having a site of action, comprising: (A) a stop configured to be abutted with workpieces; (B) a drive assembly capable of driving the stop back and forth to different separations from the site of action; and (C) a controller programmed (i) to receive and/or calculate a target dimension of a product to be generated from a workpiece with the tool and (ii) to control the drive assembly such that the stop is driven to a target position spaced from the site of action according to the target dimension, thereby allowing the workpiece to be modified by the tool, with the workpiece disposed against the stop at the target position, to generate the product, wherein, optionally, the gauge system also comprises a rail, wherein the stop is connected to the rail, and wherein the stop is driven back and forth along the rail.

2. The gauge system of paragraph 1, further comprising a saw machine as the tool.

3. The gauge system of paragraph 1 or 2, wherein the saw machine is electrically powered.

4. The gauge system of paragraph 2 or 3, wherein the saw machine includes a saw blade defining a cutting path, and wherein the saw blade is pivotable with respect to the rail about a pivot axis.

5. The gauge system of paragraph 4, wherein the saw machine includes a miter saw including a saw blade that is pivotable with respect to the rail about a vertical pivot axis.

6. The gauge system of paragraph 5, wherein the rail includes a front wall defining a vertical plane, and wherein the vertical plane intersects or nearly intersects the vertical pivot axis.

7. The gauge system of paragraph 1, wherein the front wall is for abutment with workpieces.

8. The gauge system of any preceding paragraph, wherein the rail provides a longitudinal fence to abut a side of the workpiece.

9. The gauge system of any preceding paragraph, wherein the stop is driven back and forth along a measurement axis that intersects the site of action to define an origin, and wherein separations of the stop from the site of action are measured along the measurement axis from the origin.

10. The gauge system of paragraph 9, wherein the measurement axis extends adjacent to or on a front surface of the rail.

11. The gauge system of paragraph 9 or 10, wherein the tool is pivotable about a pivot axis with respect to the rail, and wherein the pivot axis intersects the measurement axis.

12. The gauge system of any preceding paragraph, wherein the tool is supported by a frame, wherein the frame includes a fence, and wherein the fence and the rail include respective workpiece abutment surfaces that are substantially coplanar with one another.

13. The gauge system of any preceding paragraph, wherein the controller is programmed to situate the stop at measured distances from the site of action of the tool along a measurement axis, and wherein the rail defines a longitudinal axis that is parallel to the measurement axis.

14. The gauge system of any preceding paragraph, wherein the rail extends horizontally.

15. The gauge system of any preceding paragraph, further comprising the tool, wherein the tool is connected to the rail.

16. The gauge system of paragraph 15, further comprising a frame supporting the rail and the tool.

17. The gauge system of paragraph 16, wherein the frame also supports the drive assembly and the controller.

18. The gauge system of paragraph 16 or 17, wherein the frame includes a plurality of legs.

19. The gauge system of any of paragraphs 16-18, wherein the frame includes a horizontal beam.

20. The gauge system of paragraph 19, wherein the horizontal beam supports the rail, the tool, or both.

21. The gauge system of any of paragraphs 16-20, wherein the frame includes at least one extendable arm.

22. The gauge system of paragraph 21, wherein the frame includes a beam and a pair of extendable arms that are storable in the beam.

23. The gauge system of any of paragraphs 16-22, further comprising one or more bracket assemblies that attach the rail to the frame, wherein, optionally, each bracket assembly includes an upper connector that mounts the rail on such bracket assembly and a lower connector that mounts such bracket assembly on the frame, wherein, optionally, at least one of the upper connector and the lower connector is a clamp, wherein, optionally, each bracket assembly is adjustable to change an angular orientation of the upper and lower connectors with respect to one another, wherein, optionally, each bracket assembly is adjustable to change a spacing along the rail of the upper connector and the lower connector from one another.

24. The gauge system of any of paragraphs 16-23, wherein the frame includes a beam, and wherein the one or more bracket assemblies are mounted on the beam, and wherein the rail is mounted on the bracket assemblies.

25. The gauge system of any preceding paragraph, wherein the rail is formed by a beam, and wherein the stop moves back and forth along the beam.

26. The gauge system of paragraph 25, wherein the beam is formed of aluminum.

27. The gauge system of paragraph 25 or 26, wherein the beam is formed as an extrusion, and wherein, optionally, the beam has a substantially uniform cross section along the beam.

28. The gauge system of any of paragraphs 25-27, wherein the beam is hollow.

29. The gauge system of any of paragraphs 25-28, wherein the beam is at least generally rectangular in cross section.

30. The gauge system of any of paragraphs 25-29, wherein the beam includes outer walls and one or more inner walls.

31. The gauge system of paragraph 30, wherein the beam includes a vertical inner wall.

32. The gauge system of paragraph 30 or 31, wherein an outer wall defines a gap extending along the beam.

33. The gauge system of paragraph 32, wherein the gap extends an entire length of the beam.

34. The gauge system of paragraph 32 or 33, wherein the outer walls include a front wall, a back wall, a top wall, and a bottom wall, and wherein the gap is defined by the back wall.

35. The gauge system of any of paragraphs 25-34, wherein the beam is continuous.

36. The gauge system of paragraph 35, wherein the beam is monolithic.

37. The gauge system of any preceding paragraph, wherein the drive assembly includes a motor.

38. The gauge system of paragraph 37, wherein the motor is an electric motor.

39. The gauge system of paragraph 38, wherein the motor is a servomotor.

40. The gauge system of any of paragraphs 37-39, wherein the drive assembly includes a linkage that transmits motive power from the motor to the stop.

41. The gauge system of paragraph 40, wherein at least a portion of the linkage is disposed inside the rail.

42. The gauge system of paragraph 40, wherein the linkage includes one or more members that rotate with respect to the rail.

43. The gauge system of paragraph 42, wherein the linkage includes one or more pulleys.

44. The gauge system of any of paragraphs 40-43, wherein the linkage includes a belt.

45. The gauge system of any preceding paragraph, wherein the controller includes a digital processor, a user interface, a display, or any combination thereof.

46. The gauge system of paragraph 45, wherein the user interface is a keypad.

47. The gauge system of any preceding paragraph, wherein the drive assembly and/or the controller is configured to receive line power.

48. The gauge system of any preceding paragraph, further comprising at least one battery operatively connected to the drive assembly and/or the controller to supply electrical power.

49. The gauge system of any preceding paragraph, wherein the rail and/or a beam forming the rail is at least about 4, 6, 8, or 10 feet long.

50. The gauge system of any preceding paragraph, further comprising a stop assembly that provides a stop, wherein the stop assembly includes a bar and a foot connected to the bar, and wherein the foot forms a transverse fence configured to abut workpieces.

51. The gauge system of paragraph 50, wherein the bar and the foot are connected pivotably to the rail.

52. The gauge system of any preceding paragraph, wherein the drive assembly includes a carriage that supports the stop.

53. The gauge system of paragraph 52, where the stop is connected pivotably to the carriage.

54. The gauge system of paragraph 52 or 53, wherein the carriage slides along the rail.

55. The gauge system of paragraph 53 or 54, wherein the carriage is disposed at least predominantly in the rail.

56. The gauge system of paragraph 53 or 54, wherein the carriage is disposed at least predominantly on the rail.

57. The gauge system of any preceding paragraph, further comprising a rail assembly that includes the rail and at least a portion of the drive assembly.

58. The gauge system of any preceding paragraph, further comprising a motor assembly forming at least a part of the drive assembly and including a motor.

59. The gauge system of paragraph 58, further comprising a motor box that includes the motor assembly.

60. The gauge system of paragraph 59, wherein the motor box also includes the controller.

61. The gauge system of paragraph 58, further comprising a power module including the motor assembly and/or the motor.

62. The gauge system of paragraph 61, wherein the power module includes the controller.

63. The gauge system of any preceding paragraph, wherein operation of the motor holds the stop at the target position.

64. The gauge system of any preceding paragraph, wherein the tool is a saw defining a cutting path, wherein the controller is programmed (i) to receive a target length of a product to be generated from the workpiece, and (ii) to control operation of the drive assembly based on the target length such that the stop is driven to an adjusted position spaced from the cutting path by an adjusted length representing modification of the target length with at least one miter offset, to compensate for a miter cut at one or both ends of the product.

65. The gauge system of paragraph 64, wherein the controller is programmed to receive a width of the workpiece and an angle of the miter cut and to calculate the adjusted length using the width and the angle, and wherein, optionally, the controller is programmed to use a default angle of 45 degrees if the angle is not received.

66. The gauge system of paragraph 64 or 65, wherein the controller includes a user interface having a plurality of keys, wherein at least one of the plurality of keys is a miter key, and wherein pressing the miter key instructs the controller to calculate an adjusted length to compensate for at least one miter cut.

67. The gauge system of paragraph 66, wherein the miter key is associated with a graphic representation of a miter-cut end of a workpiece and/or product.

68. The gauge system of paragraph 66 or 67, wherein the keys include a first miter key and a second miter key, wherein pressing the first miter key instructs the controller to compensate for a miter cut at only one end of the workpiece, and wherein pressing the second miter key instructs the controller to compensate for a miter cut at both ends of the workpiece.

69. The gauge system of paragraph 66 or 67, wherein pressing the miter key once instructs the controller to compensate for a miter cut at one end of the workpiece, and wherein pressing the miter key twice instructs the controller to compensate for a miter cut at both ends of the workpiece.

70. The gauge system of any of paragraphs 66-69, wherein the plurality of keys includes a width key, and wherein pressing the width key instructs the controller to receive a width of the workpiece.

71. The gauge system of any of paragraphs 64-70, wherein the adjusted length is longer than the target length.

72. The gauge system of any of paragraphs 64-70, wherein the adjusted length is shorter than the target length.

73. The gauge system of any of paragraphs 64-72, wherein the miter cut is at 45 degrees with respect to a longitudinal axis of the workpiece, and wherein the adjusted length is the target length plus or minus a width of the workpiece or plus or minus twice a width of the workpiece.

74. The gauge system of any of paragraphs 64-73, wherein the controller is programmed to receive a cut list specifying target lengths for cut products, a width of a workpiece to be used to generate each cut product, and whether a miter compensation should be introduced to generate each cut product.

75. The gauge system of any preceding paragraph, further comprising a rail module and a power module, wherein the rail module includes a beam that forms the rail and also includes a first member connected to the beam such that rotation of the first member drives the stop back and forth along the beam, to achieve different separations of the stop from the site of action of the tool, wherein the power module forms at least part of the drive assembly and includes a motor and a second member rotated by operation of the motor, and wherein the power module detachably mates with the rail module by fitting the first and second members together such that the operation of the motor transmits motive power to the stop.

76. The gauge system of paragraph 75, wherein the first member is a first pulley, and wherein the rail module includes the first pulley and a second pulley rotatably coupled to one another by a belt.

77. The gauge system of paragraph 75 or 76, wherein the beam defines a longitudinal axis, and wherein the power module mates with the rail module by motion orthogonal to the longitudinal axis.

78. The gauge system of any of paragraphs 75-77, wherein the power module mates with the rail module to form a first connection, wherein the power module attaches to the rail module via a second connection that blocks rotation of a body of the power module and uncoupling of the power module from the rail module, wherein, optionally, the power module includes at least one clamp configured to form the second connection by attachment to the beam, wherein, optionally, each of the first and second connections is configured to be implemented manually, without the use of tools, and wherein, optionally, the second connection is actuated by a cam lever.

79. The gauge system of any of paragraphs 75-78, wherein the controller is included in the power module.

80. The gauge system of any of paragraphs 75-79, wherein the power module and the rail module mate with one another to form a mated connection that is rotatably driven with respect to the beam by operation of the motor.

81. The gauge system of paragraph 80, wherein the mated connection includes a shaft received in a socket.

82. The gauge system of paragraph 81, wherein the shaft is a splined shaft.

83. The gauge system of any of paragraphs 75-82, wherein the first member includes a pulley.

84. The gauge system of paragraph 83, wherein the pulley is mounted in the beam.

85. The gauge system of paragraph 83 or 84, wherein the pulley is a first pulley, wherein the rail module when mated with the power module includes the first pulley and a second pulley rotatably coupled to one another by a belt.

86. The gauge system of any of paragraphs 75-85, wherein the controller is included in the power module, and wherein the controller and the motor have fixed relative positions in the power module.

87. The gauge system of any of paragraphs 75-86, wherein the beam has opposing ends, and wherein the power module is capable of operatively mating with the rail module near each of the opposing ends of the beam.

88. The gauge system of any of paragraphs 75-87, wherein the power module mates with the rail module from above the rail module.

89. The gauge system of any preceding paragraph, further comprising a rail assembly that includes a beam forming the rail and also includes a pair of pulleys and a belt that couples rotation of the pulleys to one another, wherein the beam includes an exterior surface and a pair of cavities each extending transversely into the beam from the exterior surface, and wherein the pulleys are mounted in the cavities.

90. The gauge system of paragraph 89, wherein the beam includes walls extending along the beam, and wherein each of the pulleys is disposed in apertures formed in two or more of the walls.

91. The gauge system of paragraph 89 or 90, wherein the beam is monolithic.

92. The gauge system of paragraph 89 or 91, wherein the beam includes walls extending along the beam, and wherein each cavity includes an aperture formed in a wall.

93. The gauge system of any of paragraphs 89-92, wherein each of the pulleys is disposed in apertures formed in two or more of the walls of the beam.

94. The gauge system of any of paragraphs 89-93, wherein each pulley is connected to the beam with at least one bearing disposed in an aperture formed in one or more walls of the beam.

95. The gauge system of paragraph 94, wherein the one or more walls of the beam block motion of the at least one bearing along the beam.

96. The gauge system of paragraph 94 or 95, wherein the at least one bearing is ring-shaped.

97. The gauge system of any of paragraphs 89-96, wherein each pulley is connected to the beam with a pair of bearings each having a fixed position along the beam.

98. The gauge system of any of paragraphs 89-97, wherein each cavity and a corresponding pulley mounted in such cavity are coaxial with one another.

99. The gauge system of any of paragraphs 89-98, wherein the pulleys have a fixed, non-adjustable spacing from one another in the beam.

100. The gauge system of any of paragraphs 89-99, wherein each pulley has a rotation axis that is vertical.

101. The gauge system of any preceding paragraph, further comprising a rail assembly that includes a beam forming the rail and also includes a pair of pulleys and a belt that couples rotation of the pulleys to one another, wherein the belt extends to a pair of ends, wherein the rail assembly includes a belt linkage that secures the pair of ends adjacent one another to form a closed loop around the pulleys, and wherein the belt linkage is adjustable to change a spacing of the ends relative to each other while the ends remain secured, thereby permitting changes to a tension of the belt via its ends.

102. The gauge system of paragraph 101, wherein the beam includes opposing ends, and wherein the belt linkage is accessible for adjustment from outside the beam at a position intermediate the opposing ends of the beam.

103. The gauge system of paragraph 101 or 102, wherein the beam has opposing front and back sides, and wherein the belt linkage is accessible for adjustment adjacent the back side.

104. The gauge system of any preceding paragraph, further comprising a carriage that supports the stop, wherein the rail is formed by a beam that supports the carriage and forms an external track, and wherein the carriage is driven along the beam guided by the external track.

105. The gauge system of paragraph 104, wherein the carriage includes one or more set screws that are adjustable to limit side-to-side play of the carriage on the beam.

106. The gauge system of paragraph 104 or 105, wherein the carriage slides on the beam, wherein the carriage includes a body and at least one slide element separating the body from the beam, and wherein the slide element is configured to reduce a coefficient of friction between the carriage and the beam to encourage sliding of the carriage on the beam.

107. The gauge system of any of paragraphs 104-106, wherein the external track includes a box way.

108. The gauge system of any of paragraphs 104-107, wherein the external track includes a pair of channels formed on front and back sides of the beam.

109. The gauge system of any of paragraphs 104-108, wherein the external track includes a pair of flanges disposed on opposing sides of the beam, and wherein the carriage includes a pair of generally C-shaped regions that receive portions of the flanges.

110. The gauge system of paragraph 109, wherein the flanges are substantially rectangular.

111. The gauge system of any preceding paragraph, wherein the controller contains a security code, wherein the controller, when powered off and then back on, is programmed to go into a lockout state in which the controller does not execute most or all user commands, and wherein the controller in the lockout state is programmed to require a user to match the security code before the controller leaves the lockout state to execute commands from the user without substantial restriction.

112. The gauge system of any preceding paragraph, wherein the drive assembly includes a motor, wherein the rail is formed by a beam having opposing ends, and wherein the motor is capable of operative connection to the stop with the motor disposed near either opposing end of the beam.

113. The gauge system of paragraph 112, further comprising a rail assembly including the beam and a first member and a second member each mounted rotatably to the beam, wherein the motor is included in a power head, and wherein the power head engages the first member when the motor is operatively connected to a leftward position of the rail assembly and engages the second member when the motor is operatively coupled to a rightward position of the rail assembly.

114. The gauge system of paragraph 113, wherein each member is a pulley, wherein the rail assembly includes a belt that couples rotation of the pulleys to one another, and wherein the belt couples rotation of the pulleys to reciprocative motion of the stop.

115. The gauge system of paragraph 113 or 114, wherein the rail assembly has a top side and a bottom side, and wherein the motor is operatively connectable to the rail assembly at leftward and rightward sites formed on and/or in the top side.

116. The gauge system of any of paragraphs 113-115, wherein the motor is included in a power module, and wherein the rail assembly defines a socket near each end that mates with the power module to couple operation of the motor to driven motion of the stop.

117. The gauge system of any of paragraphs 113-116, wherein the controller is programmed (i) to receive an input that indicates whether the cutting path has a leftward position or a rightward position with respect to the rail assembly and (ii) to select rotational directions for operation of the motor that drive the stop toward and away from the cutting path based on whether a leftward or rightward position is indicated by the input.

118. The gauge system of any of paragraphs 112-117, further comprising a power head, wherein the motor and the controller are both contained in the power head.

119. The gauge system of paragraph 118, wherein the power head includes a housing, and wherein the motor and the controller are disposed in and/or on the housing.

120. The gauge system of any preceding paragraph, wherein the drive assembly includes a motor, wherein the controller is programmed to restrict amounts of power supplied to the motor according to a predefined limit, and wherein the predefined limit increases at least once in correspondence with increased speed of the motor, thereby reducing or eliminating generation of power spikes when motion of the stop is blocked or hampered.

121. The gauge system of paragraph 120, wherein the motor assembly includes a sensor in communication with the controller and configured to measure rotary positions of a rotating part of the motor assembly, and wherein the controller is programmed to determine the speed of the motor based on the measured rotary positions.

122. The gauge system of paragraph 120 or 121, wherein the predefined limit increases linearly or stepwise with the speed of the motor, and/or wherein the predefined limit and/or a slope at which the predefined limit changes with motor speed are both settable by a user.

123. The gauge system of any of paragraphs 120-122, wherein the motor assembly includes a sensor in communication with the controller and configured to measure an aspect of the motor assembly, wherein the controller is programmed to monitor measurements from the sensor and to turn off the motor temporarily if one or more of the measurements meet a predefined condition indicating motor inefficiency, thereby reducing damage to the motor and improving safety for a user, and wherein, optionally, the sensor is a rotary encoder that measures movement of a rotating part of the motor 124. The gauge system of paragraph 123, wherein the aspect is a temperature of the motor assembly, a position of a moving part of the motor assembly, or an electrical characteristic of motor operation.

125. The gauge system of paragraph 123 or 124, wherein the aspect is a rotary position of a rotatable part of the motor assembly, and wherein the controller is programmed to turn off the motor if measured rotation of the rotatable part deviates sufficiently from expected rotation of the rotatable part.

126. The gauge system of any of paragraphs 120-125, wherein the controller controls communication of drive signals to the motor, and wherein a value of each drive signal corresponds to an amount of power supplied to the motor during a time segment.

127. The gauge system of any of paragraphs 120-126, wherein the controller is programmed to compare each drive signal value to the predefined limit and to reduce each drive signal value before such drive signal value is implemented to supply an amount of power to the motor, if such drive signal value exceeds the predefined limit.

128. The gauge system of any of paragraphs 120-127, wherein the controller is programmed to monitor data from a sensor and to turn off power to the motor temporarily if at least a portion of the data meets a predefined condition.

129. The gauge system of any of paragraphs 120-128, wherein the controller is programmed to execute a drive sequence that results in placement of the stop at the target position, and wherein the controller is programmed to abort execution of the drive sequence before the target position is reached if the at least a portion of the data meets a predefined condition.

130. The gauge system of paragraph 129, wherein the controller is programmed to receive signals from a position sensor and to abort execution of the drive sequence based on one or more of the signals if such one or more signals meet the predefined condition.

131. The gauge system of any preceding paragraph, further comprising a rail assembly including the rail, a carriage, and at least one travel barrier, wherein the stop is supported by the carriage, wherein the stop has a range of travel along the rail, wherein at least one end of the range of travel is determined by contact of the carriage with the travel barrier, and wherein the controller is programmed, when a current location of the stop within the travel path is not certain, to drive the stop until movement of the stop is halted by the contact of the carriage with the travel barrier, to define the current location of the stop.

132. The gauge system of paragraph 131, wherein both ends of the range of travel of the stop are determined by contact of the carriage with travel barriers, and wherein the controller, when powered up at least for a first time, is programmed to drive the carriage until halted by each of the travel barriers.

133. The gauge system of paragraph 131 or 132, wherein the controller is programmed to drive the carriage until halted by a travel barrier, after the controller is powered on and before driving the stop according to entered target dimensions.

134. The gauge system of any of paragraphs 131-133, wherein the controller is programmed to turn off the motor temporarily when the carriage is halted by a travel barrier, and wherein, optionally, a sensed position of the motor when the motor is turned off is assigned by the controller as an end of the range of travel.

135. The gauge system of any preceding paragraph, further comprising one or more bracket assemblies configured to mount the rail to a frame that supports the tool, and wherein each bracket assembly provides at least one support surface that projects forward of the rail for contact with an underside of a workpiece such that the one or more bracket assemblies are capable of supporting the workpiece in front of the rail.

136. The gauge system of paragraph 135, wherein the bracket assembly includes an upper connector that mounts the rail on the bracket assembly and a lower connector that mounts the bracket assembly on the frame.

137. The gauge system of paragraph 135 or 136, wherein the bracket assembly is adjustable to change a height of the upper connector above the lower connector.

138. The gauge system of any of paragraphs 135-137, wherein the bracket assembly is adjustable to move the upper connector forward and/or rearward with respect to the lower connector.

139. The gauge system of any of paragraphs 135-138, wherein the rail includes a dovetail projection, and wherein the upper connector mounts the rail on the bracket assembly by engagement of the dovetail projection.

140. The gauge system of any preceding paragraph, wherein the rail includes a beam having opposing ends, wherein the drive assembly includes a motor that supplies motive power to the stop, and wherein the motor is configured to be operatively connected to the stop near each of the opposing ends of the beam.

141. The gauge system of any preceding paragraph, wherein the drive assembly includes a motor, wherein the rail has opposing end regions, and wherein the motor is operatively connectable to the rail at each end region to couple operation of the motor, from either end region, to driven motion of the stop back and forth along the rail.

142. The gauge system of paragraph 141, further comprising a rail assembly and a power head, wherein the rail assembly includes a beam that forms the rail and also includes a first member and a second member each mounted rotatably to the beam, wherein the motor is included in the power head, and wherein the power head engages the first member when the motor is operatively connected to a leftward position of the rail assembly and engages the second member when the motor is operatively coupled to a rightward position of the rail assembly.

143. The gauge system of paragraph 142, wherein each of the first and second members is a pulley, wherein the rail assembly includes a belt that couples rotation of the pulleys to one another, and wherein the belt coverts rotation of the pulleys to motion of the stop along the beam.

144. The gauge system of any of paragraphs 141-143, further comprising a rail assembly including the rail, wherein the rail assembly has a top side and a bottom side, and wherein the motor is operatively connectable to the rail assembly at leftward and rightward sites formed on and/or in the top side.

145. The gauge system of any of paragraphs 141-144, further comprising a power head forming at least part of the drive assembly and including the motor, and wherein each end region of the rail includes a socket with which the power head mates to couple operation of the motor to driven motion of the stop.

146. The gauge system of any of paragraphs 141-145, wherein the controller is programmed (i) to receive an input that indicates whether the tool has a leftward position or a rightward position with respect to the rail and (ii) to select rotational directions for operation of the motor that drive the stop toward and away from the tool based on whether a leftward or rightward position is indicated by the input.

147. The gauge system of any of paragraphs 141-146, further comprising a power head, wherein the motor and the controller are both included in the power head.

148. A gauge system for cutting workpieces for use in miter joints, comprising: (A) a saw defining a cutting path and being pivotable about a pivot axis to orient the cutting path for miter cuts; and (B) a positioning apparatus including a rail extending parallel to a measurement axis that intersects the cutting path at the pivot axis to define an origin, a stop connected to the rail and configured to abut ends of workpieces, a drive assembly that drives the stop back and forth along the measurement axis to different separations from the origin, and a controller programmed (i) to calculate a set point based on a target length of a product to be generated from the workpiece, a width of the workpiece, and an angle of a miter cut at one or both ends of the product such that the set point corresponds to the target length modified with at least one miter offset to compensate for the miter cut, and (ii) to control the drive assembly such that the stop is driven to and held at a target position spaced from the origin according to the set point, thereby enabling the saw to form a product having the miter cut and the target length.

149. A gauge system for cutting workpieces for use in miter joints, comprising: (A) a miter saw pivotable about an origin of a measurement axis to orient the saw for performing miter cuts; and (B) a positioning apparatus including a longitudinal fence extending parallel to the measurement axis and configured to abut sides of workpieces, a transverse fence connected movably to the longitudinal fence and configured to abut ends of workpieces, a drive assembly that drives the transverse fence back and forth along the measurement axis to achieve different separations from the origin, and a controller programmed (i) to receive a width of a workpiece and a target length of a product to be generated from the workpiece, (ii) to calculate an adjusted length based on the target length and the width such that the adjusted length introduces at least one miter offset to the target length to compensate for a difference in length on opposing sides of the product caused by a miter cut at one or both ends of the product, and (iii) to control the drive assembly such that the transverse fence is driven to and held at an adjusted position spaced from the origin according to the adjusted length, thereby enabling generation by the saw of a product having the miter cut, and the target length and the adjusted length on opposing sides of the product.

150. A positioning apparatus to enable cutting workpieces with a miter saw that is pivotable about an origin of a measurement axis to orient the miter saw for performing miter cuts, comprising: (A) a rail extending parallel to the measurement axis, (B) a stop connected to the rail and configured to abut ends of workpieces, (C) a drive assembly that drives the stop back and forth along the rail to different separations from the origin, and (C) a controller programmed (i) to receive a width of a workpiece and a target length of a product to be generated from the workpiece, (ii) to calculate an adjusted length based on the target length and the width such that the adjusted length introduces at least one miter offset into the target length to compensate for a difference in length on opposing sides of the product caused by a miter cut at one or both ends of the product, and (iii) to control the drive assembly such that the stop is driven to and held at an adjusted position spaced from the origin according to the adjusted length, thereby enabling generation by the saw of a product having the miter cut, the target length, and the adjusted length.

151. The apparatus of paragraph 150, wherein the stop provides a datum for abutment with ends of workpieces, and wherein workpieces abutted with the datum and extending across a cutting path of the miter saw can be cut to generate products.

152. A positioning apparatus to enable modification of workpieces using a tool and with the workpieces aligned with a measurement axis having an origin defined by action of the tool, comprising: (A) a fence module including a longitudinal fence extending parallel to the measurement axis and a transverse fence connected to the longitudinal fence, the fence module also including a first member connected rotatably to the longitudinal fence such that rotation of the first member in opposing rotational directions causes reciprocative motion of the transverse fence along the measurement axis to achieve different separations of the transverse fence from the origin; (B) a power module including a motor and a second member driven to rotate by operation of the motor, the power module detachably mating with the fence module by fitting the first and second members together, to couple operation of the motor to motion of the transverse fence; and (C) a controller programmed (i) to receive a target dimension of a product to be generated from a workpiece with the tool and (ii) to control the power module such that the transverse fence is driven to and held at a target position that is spaced from the origin according to the target dimension, thereby allowing the workpiece to be abutted with the fence module and then modified by action of the tool to generate the product.

153. A method of processing a workpiece, comprising: (A) providing a workpiece, a tool having a site of action, and a positioning apparatus including (i) a rail defining a longitudinal axis that is parallel to a measurement axis intersecting the processing site, (ii) a stop, (iii) a drive assembly that drives the stop back and forth along the measurement axis to different separations from the processing site, and (iv) a controller connected to and programmed to control the drive assembly; (B) entering into the controller a set point representing a distance from an end of a workpiece to a target site along the workpiece where the tool will modify the workpiece; (C) instructing (commanding) the controller to initiate movement of the stop to a spacing from the processing site that corresponds to the set point; (D) disposing the workpiece such that an end of the workpiece is engaged with the stop and the workpiece extends along the measurement axis; and (E) modifying the workpiece with the processing tool after the step of disposing and with the stop at the spacing from the processing site.

154. The method of paragraph 153, wherein the step of instructing results from the step of entering.

155. A method of processing a workpiece, comprising: (A) providing (1) a tool to modify workpieces and having a site of action, and (2) a positioning apparatus connected to the tool and including (i) a rail, (ii) a stop connected to the rail and configured to be abutted with workpieces, (iii) a drive assembly connected to the rail and capable of driving the stop back and forth along the rail to different separations from the site of action, and (iv) a controller programmed to control operation of the motor; (B) entering into the controller a target value for a target dimension of a product to be generated from a workpiece; (C) causing the controller to operate the motor such that the stop is driven to a target position spaced along the rail from the site of action according to the target value; and (D) modifying the workpiece with the tool to generate the product, with the workpiece aligned with the rail and disposed against the stop at the target position.

156. The method of paragraph 155, wherein the step of providing includes a step of mounting the rail on a frame for supporting the tool, and wherein the step of mounting is performed with one or more bracket assemblies, and wherein the one or more bracket assemblies include a shelf to support workpieces by contact with an underside of the workpieces.

157. The method of paragraph 155 or 156, wherein the step of causing includes a step of pressing a start button.

158. The method of paragraph 155 or 156, wherein the step of causing results from the step of entering.

159. A method of processing a workpiece, comprising: (A) providing (1) a tool to modify workpieces and having a site of action, and (2) a positioning apparatus connected to the tool and including (i) a rail module including a beam and a first member connected rotatably to the beam, (ii) a stop connected or connectable to the rail module such that rotation of the first member drives the stop back and forth along the beam, (iii) a power module including a motor and a second member driven to rotate by operation of the motor, and (iv) a controller in communication with and programmed to control operation of the motor; (B) mating the power module with the rail module by fitting the first and second members together such that the operation of the motor transmits motive power to the first member; (C) entering into the controller a target dimension of a product to be generated from the workpiece; (D) causing the controller to operate the motor such that the stop is driven to a target position spaced along the beam from the site of action according to the target dimension; and (E) modifying the workpiece with the tool to generate the product, with the workpiece aligned with the beam and disposed against the stop at the target position.

160. The method of paragraph 159, wherein the step of mating includes a step of disposing a shaft in a socket.

161. The method of paragraph 160, wherein the step of mating includes a step of mating a shaft provided by the power module with a socket defined by the rail module.

162. The method of any of paragraphs 159-161, wherein the step of mating is performed without the use of tools.

163. The method of any of paragraphs 159-162, wherein the beam defines a longitudinal axis, and wherein the step of mating brings the power module into mated engagement with the rail module by motion of the power module in a direction orthogonal to the longitudinal axis.

164. The method of any of paragraphs 159-163, wherein the rail module includes a pair of pulleys rotatably mounted to the beam, and wherein the step of mating is performed while both of the pulleys remain mounted to the beam.

165. The method of any of paragraphs 159-164, wherein the rail module includes opposing left and right end regions, and wherein the drive unit is capable of mating alternatively with the rail module at each of the opposing end regions.

166. The method of any of paragraphs 159-165, wherein the step of mating creates a mated connection of the power module to the rail module by bringing the power module and the rail module together along a mating axis, wherein the mated connection permits separation of the drive unit from the rail unit by urging the power module and the rail module apart along the mating axis, further comprising a step of attaching the power module to the rail module such that separation of the power module from the rail module along the mating axis is blocked.

167. The method of paragraph 166, wherein the step of attaching blocks rotation of a body of the power module with respect to the beam when the motor rotatably drives the mated connection.

168. The method of paragraph 167 or 168, wherein the step of attaching includes a step of manually attaching the power module to the rail module with a cam-based latch, without the use of tools.

169. The method of any of paragraphs 159-168, wherein the controller is included in the power module such that the step of mating connects the controller to the rail module.

170. The method of any of paragraphs 159-169, wherein the step of mating disposes the first and second members in a meshed configuration.

171. A method of positioning a stop for workpiece processing, the method comprising: (A) receiving a target dimension of a product to be generated from a workpiece using a tool having a site of action; (B) calculating a plurality of drive signal values to execute at least a portion of a drive sequence that drives the stop to a target position spaced from the site of action of the tool according to the target dimension, each drive signal value being associated with a measured speed of a motor that supplies motive power to the stop; and (C) supplying power to the motor according to the drive signal values, wherein each drive signal value that exceeds a predefined limit is reduced before such drive signal value is implemented to supply power to the motor.

172. The method of paragraph 171, wherein the predefined limit increases at least once as the measured speed increases.

173. The method of paragraph 171 or 172, wherein the predefined limit increases linearly with the measured speed.

174. The method of any of paragraphs 171-173, further comprising a step of receiving a slope value, wherein the predefined limit increases linearly according to the slope value.

175. The method of any of paragraphs 171-174, further comprising a step of receiving a value for the predefined limit to be applied when the measured motor speed is zero.

176. The method of any of paragraphs 171-175, wherein the at least a portion of the drive sequence is performed in a plurality of time segments, and wherein the step of calculating includes a step of calculating a drive signal value for each time segment.

177. The method of any of paragraphs 171-176, wherein each drive signal value is set to the predefined limit for a measured speed associated with such drive signal value if such drive signal value exceeds the predefined limit.

178. The method of any of paragraphs 171-177, wherein step of supplying power includes a step of supplying power by pulse width modulation.

179. The method of any of paragraphs 171-178, further comprising a step of monitoring data from a sensor associated with the motor, determining whether the data meet a predefined condition indicating that the drive sequence is proceeding abnormally; and aborting execution of the drive sequence before the stop reaches the target position if the data meet the predefined condition.

180. The method of paragraph 179, wherein the sensor is a rotary encoder.

181. An article comprising at least one computer readable storage medium containing instructions executable by a computer to perform any of the methods and/or any combination of the method steps set forth in the present disclosure.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. An apparatus for linear positioning of workpieces, comprising:
   a fence module including a rail defining a long axis, and also including a first coupling member mounted in the rail on a rotation axis that is orthogonal to the long axis;
   a stop connected or connectable to the fence module such that rotation of the first coupling member about the rotation axis drives the stop along a travel path parallel to the long axis;
   a power module including a motor and a second coupling member, the first and second coupling members having complementary structures configured to become meshed with one another when the coupling members are mated with one another parallel to the rotation axis, such that rotation of the second coupling member, driven by the motor, is coupled to rotation of the first coupling member about the rotation axis; and
   a controller programmed to receive a set point that corresponds to a position in the travel path and to control the motor to drive the stop such that the stop halts at the position.

2. The apparatus of claim 1, wherein the first coupling member is a pulley defining an opening, and wherein the second coupling member is a splined shaft that is configured to be received in the opening such that complementary structures of the splined shaft and the opening of the pulley mesh with one another.

3. The apparatus of claim 2, wherein the pulley is a first pulley and the rotation axis is a first rotation axis, wherein the fence module includes a second pulley mounted in the rail on a second rotation axis, and wherein the fence module also includes a belt that couples rotation of the first and second pulleys to one another.

4. The apparatus of claim 1, wherein the power module includes the controller and is configured to be mated with the fence module as a unit.

5. The apparatus of claim 1, wherein the rail defines a pair of longitudinal channels, and wherein the power module includes a pair of jaws configured to be received in the pair of longitudinal channels.

6. An apparatus for linear positioning of workpieces, comprising:
- a fence module including a rail defining a long axis, and a first coupling member mounted in the rail on a rotation axis that is orthogonal to the long axis;
- a stop connected or connectable to the fence module such that rotation of the first coupling member about the rotation axis drives the stop along a travel path parallel to the long axis;
- a power module including a motor and a second coupling member, the power module being configured to be mated, as a unit, with the fence module, as a unit, while the first coupling member remains mounted in the rail on the rotation axis, such that complementary structures of the first and second coupling members become meshed with one another, thereby coupling rotation of the second coupling member, driven by the motor, to rotation of the first coupling member about the rotation axis; and
- a controller programmed to receive a set point that corresponds to a position in the travel path and to control the motor to drive the stop such that the stop halts at the position.

7. The apparatus of claim 6, wherein the first coupling member is a pulley defining an opening, and wherein the second coupling member is a splined shaft that is configured to be received in the opening such that complementary structures of the splined shaft and the opening of the pulley mesh with one another.

8. The apparatus of claim 6, wherein the power module includes the controller and a user interface for the controller.

9. The apparatus of claim 6, wherein the rail defines a pair of longitudinal channels, and wherein the power module includes a pair of jaws configured to be received in the pair of longitudinal channels.

10. A gauge system for workpiece processing using a tool having a site of action, comprising:
- a fence module including a rail defining a long axis, and a first coupling member mounted in the rail on a rotation axis that is orthogonal to the long axis;
- a stop connected or connectable to the fence module and configured to be abutted with an end of a workpiece; and
- a power module including a motor, a second coupling member, and a controller, the motor and the controller being substantially contained by a same housing,
- wherein the power module is configured to be mated, as a unit, with the fence module, as a unit, along a vertical axis from above the rail while the first coupling member remains mounted in the rail on the rotation axis, such that complementary structures of the first and second coupling members become meshed with one another, thereby coupling rotation of the second coupling member, driven by the motor, to rotation of the first coupling member about the rotation axis, and
- wherein the controller is programmed (i) to receive and/or calculate a target dimension of a product to be generated from the workpiece with the tool and (ii) to control operation of the motor such that the stop is driven to a target position spaced from the site of action according to the target dimension, thereby allowing the workpiece abutted with the stop to be modified by the tool to generate the product.

11. The gauge system of claim 10, wherein the tool is a miter saw defining a cutting path, wherein the stop is driven back and forth along a linear measurement axis that intersects the cutting path to define an origin, and wherein the controller is programmed (i) to receive a width and a target dimension of a product to be generated from the workpiece, and (ii) to control operation of the motor based on the width and the target dimension such that the stop is driven to an adjusted position spaced from the origin by an adjusted dimension produced at least in part by modifying the target dimension with at least one miter offset, to compensate for a miter at one or both ends of the product.

12. The gauge system of claim 10, wherein the first coupling member is a first pulley, wherein the fence module includes a second pulley and a belt that couples rotation of the first and second pulleys to one another, and wherein each of the pulleys is mounted in the rail for rotation about a respective rotation axis.

13. The gauge system of claim 12, wherein the pulleys are configured to remain mounted in the rail on the respective rotation axes, as the power module is being mated with either of the pulleys along a vertical axis.

14. The gauge system of claim 10, further comprising a travel barrier connected to the rail,
- wherein the stop has a range of travel along the rail, wherein at least one end of the range of travel is determined by the travel barrier, and
- wherein the controller is programmed, if a current location of the stop within the travel path is not certain, to drive the stop until movement of the stop is halted by the travel barrier, thereby defining the current location of the stop.

15. The gauge system of claim 10, further comprising a carriage configured to connect the fence module to the stop, wherein the rail supports the carriage and forms a pair of longitudinal channels on opposite lateral sides of the rail, and wherein the carriage is driven along the rail guided by the pair of longitudinal channels.

16. The gauge system of claim 10, wherein operation of the motor holds the stop at the target position.

17. The gauge system of claim 10, wherein the controller is programmed (i) to receive an input that indicates whether the tool has a leftward position or a rightward position with respect to the rail and (ii) to select rotational directions for operation of the motor that drive the stop toward and away from the tool based on whether a leftward or rightward position is indicated by the input.

18. The gauge system of claim 10, wherein the power module includes a graspable handle located opposite the second coupling member.

19. The gauge system of claim 18, wherein the handle is located at or near a top of the power module.

* * * * *